(12) United States Patent
Christensen et al.

(10) Patent No.: US 12,219,051 B2
(45) Date of Patent: Feb. 4, 2025

(54) DOUBLY-ENCRYPTED SECRET PARTS ALLOWING FOR ASSEMBLY OF A SECRET USING A SUBSET OF THE DOUBLY-ENCRYPTED SECRET PARTS

(71) Applicant: tZERO IP, LLC, Salt Lake City, UT (US)

(72) Inventors: Stephen Christensen, Salt Lake City, UT (US); Denny Becker, Salt Lake City, UT (US); Tron Black, Sandy, UT (US); Michael Calcano, South Salt Lake, UT (US); Tyler Perkins, West Jordan, UT (US)

(73) Assignee: tZERO IP, LLC, Salt Lake City, UT (US)

( * ) Notice: Subject to any disclaimer, the term of this patent is extended or adjusted under 35 U.S.C. 154(b) by 0 days.

(21) Appl. No.: 18/468,252

(22) Filed: Sep. 15, 2023

(65) Prior Publication Data
US 2024/0007275 A1    Jan. 4, 2024

Related U.S. Application Data

(63) Continuation of application No. 17/889,205, filed on Aug. 16, 2022, now Pat. No. 11,764,951, which is a
(Continued)

(51) Int. Cl.
*H04L 9/08*    (2006.01)
*H04L 9/14*    (2006.01)
(Continued)

(52) U.S. Cl.
CPC ............ *H04L 9/085* (2013.01); *H04L 9/0894* (2013.01); *H04L 9/14* (2013.01); *H04L 9/30* (2013.01);
(Continued)

(58) Field of Classification Search
CPC ...................................................... H04L 9/085
See application file for complete search history.

(56) References Cited

U.S. PATENT DOCUMENTS 6,311,171 B1   10/2001   Dent
7,003,667 B1    2/2006   Slick et al.
(Continued)

FOREIGN PATENT DOCUMENTS

JP    2005316782 A    11/2005
JP    2006128869 A     5/2006
(Continued)

OTHER PUBLICATIONS

"Authenticated encryption", Dec. 7, 2017, pp. 1-8.
(Continued)

*Primary Examiner* — Bradley W Holder
(74) *Attorney, Agent, or Firm* — Fogg & Powers LLC

(57) ABSTRACT

A system includes at least one processor and at least one memory communicatively coupled to the at least one processor. The at least one processor is configured to receive a plurality of doubly-encrypted secret parts that were encrypted using at least a public key belonging to a public/private keypair. The at least one processor is also configured to decrypt each of the plurality of doubly-encrypted secret parts into a corresponding singly-encrypted secret part using a private key belonging to the public/private keypair. The at least one processor is also configured to decrypt each corresponding singly-encrypted secret part into a corresponding secret part. A secret is reconstructed from a quantity of corresponding secret parts that is a subset of a total number of secret parts. The public key, the private key, or both are rotated by creating a new version of the public key, the private key, or both.

20 Claims, 39 Drawing Sheets

Related U.S. Application Data continuation of application No. 16/595,004, filed on Oct. 7, 2019, now Pat. No. 11,444,755.

(60) Provisional application No. 62/853,231, filed on May 28, 2019, provisional application No. 62/830,272, filed on Apr. 5, 2019, provisional application No. 62/744,886, filed on Oct. 12, 2018.

(51) Int. Cl.
*H04L 9/30* (2006.01)
*H04L 9/32* (2006.01)
*H04L 9/00* (2022.01)

(52) U.S. Cl.
CPC .......... *H04L 9/3073* (2013.01); *H04L 9/3252* (2013.01); *H04L 9/50* (2022.05)

(56) References Cited

U.S. PATENT DOCUMENTS

| | | | |
|---|---|---|---|
| 7,142,676 | B1 | 11/2006 | Hillier et al. |
| 7,548,621 | B1 | 6/2009 | Smith et al. |
| 9,602,508 | B1 | 3/2017 | Mahaffey et al. |
| 9,667,416 | B1 | 5/2017 | Machani et al. |
| 9,673,975 | B1 | 6/2017 | Machani |
| 9,892,460 | B1 | 2/2018 | Winklevoss et al. |
| 9,954,680 | B1 | 4/2018 | Machani et al. |
| 11,050,724 | B2 | 6/2021 | De Gaspari et al. |
| 11,444,755 | B2 | 9/2022 | Christensen et al. |
| 11,601,264 | B2 | 3/2023 | Christensen et al. |
| 2002/0071566 | A1 | 6/2002 | Kurn |
| 2004/0039924 | A1 | 2/2004 | Baldwin et al. |
| 2008/0205637 | A1 | 8/2008 | Kurihara et al. |
| 2010/0091995 | A1* | 4/2010 | Chen ................ H04L 9/0869 380/278 |
| 2011/0246766 | A1 | 10/2011 | Orsini et al. |
| 2014/0229386 | A1 | 8/2014 | Tervo et al. |
| 2014/0351910 | A1 | 11/2014 | Tenenboym et al. |
| 2015/0326547 | A1* | 11/2015 | Carlson ............. H04L 63/061 713/171 |
| 2016/0182495 | A1 | 6/2016 | Stuntebeck et al. |
| 2016/0241405 | A1 | 8/2016 | Jeong et al. |
| 2017/0142082 | A1 | 5/2017 | Qian |
| 2017/0207917 | A1 | 7/2017 | Davis |
| 2017/0222805 | A1* | 8/2017 | Telford ............... H04L 9/085 |
| 2018/0013728 | A1 | 1/2018 | Carlson |
| 2018/0367316 | A1 | 12/2018 | Cheng et al. |
| 2018/0375653 | A1* | 12/2018 | Setty ................ H04L 9/3218 |
| 2019/0007205 | A1 | 1/2019 | Corduan et al. |
| 2019/0238323 | A1 | 8/2019 | Bunch et al. |
| 2019/0342084 | A1 | 11/2019 | Mehedy et al. |
| 2022/0399992 | A1 | 12/2022 | Christensen et al. |

FOREIGN PATENT DOCUMENTS

| | | |
|---|---|---|
| JP | 2007104660 A | 4/2007 |
| JP | 2008203720 A | 9/2008 |
| JP | 2009103774 A | 5/2009 |
| JP | 2014022920 A | 2/2014 |
| JP | 2014509753 A | 4/2014 |
| JP | 2015102692 A | 6/2015 |
| KR | 20140072188 A | 6/2014 |
| KR | 1020170015280 A | 2/2017 |
| WO | 2010113522 A1 | 10/2010 |

OTHER PUBLICATIONS

"Divide and Manage Secret Data Securely With Shamir's Secret Sharing", Nov. 11, 2017, pp. 1-5.
"Public-key signatures", Nov. 16, 2018, pp. 1-9.
"Sealed Boxes", Sep. 28, 2019, pp. 1-3.
"Shamir39 Mnemonic Code Splitter", Oct. 3, 2017, pp. 1-3.
"Shamir's Quest: Collect Any 3 Keys to Unlock the Secret!", The blog at the bottom of the sea, Apr. 30, 2016, pp. 1-9.
Armstrong, "How Coinbase Builds Secure Infrastructure To Store Bitcoin In The Cloud", The Coinbase Engineering Blog, Oct. 21, 2017, pp. 1-8.
European Patent Office, "Extended European Search Report from EP Application No. 19871695.3", from Foreign Counterpart to U.S. Appl. No. 16/595,020, Jul. 11, 2022, pp. 1 through 9, Published: EP.
European Patent Office, "Extended European Search Report from EP Application No. 19871585.6", from Foreign Counterpart to U.S. Appl. No. 16/595,004, Jun. 8, 2022, pp. 1 through 9, Published: EP.
Flecther-Hill, "Kimono—trustless secret sharing using time-locks on Ethereum", medium.com, May 30, 2018, pp. 1-8.
Gray, "How to split a private key to create a "shared secret" and secure your XRP in the event of death/theft/natural disaster/etc. using Shamir's Secret Sharing Scheme", XRP Chat, Jul. 5, 2017, pp. 1-14, Invision Community.
Intellectual Property Office of Singapore, "Invitation to Respond to Written Opinion and the Written Opinion" from SG Application No. 2023/00014540PF12V, Jan. 27, 2023, from Foreign Counterpart to U.S. Appl. No. 17/595,020, pp. 1 through 11, Published: SG.
Intellectual Property Office of Singapore, "Invitation to Respond to Written Opinion and the Written Opinion", from SG Application No. 2023/00014526PF12W, from Foreign Counterpart to U.S. Appl. No. 16/595,004, filed Jan. 27, 2023, pp. 1 through 10, Published: SG.
International Searching Authority, "International Search Report and Written Opinion from PCT Application No. PCT/US2019/055032", from Foreign Counterpart to U.S. Appl. No. 16/595,004, filed Jan. 22, 2020, pp. 1-10, Published: US.
International Searching Authority, "International Search Report and Written Opinion from PCT Application No. PCT/US2019/055034", from Foreign Counterpart to U.S. Appl. No. 16/595,020, filed Jan. 23, 2020, pp. 1-11, Published: WO.
Japanese Patent Office, "Office Action from JP Application No. 2021-545356", Dec. 24, 2021, from Foreign Counterpart to U.S. Appl. No. 16/595,020, pp. 1 through 7, Published: JP.
Miller, "Simple Security with Shamir Secret Sharing", GridPlus, Aug. 16, 2017, pp. 1-7.
Nandakumar et al., "Secure One-time Biometric Tokens for Non-repudiable Multi-party Transactions", 2017 IEEE Workshop on Information Forensics and Security (WIFS), IEEE, Dec. 4, 2017, Rennes France, pp. 1 through 6, Published: FR.
Olimid, "Secret Sharing-based Group Key Establishment", Faculty of Mathematics and Computer Science, 2013, pp. 1-116, University of Bucharest.
Poettering, "What is 'Secret Sharing?'", Shamir's Secret Sharing Scheme, Jan. 2, 2018, pp. 1-3, point-at-infinity.org/ssss/.
Stetsyuk, "Never store your secrets in one place again", PassGuardian, Oct. 26, 2017, pp. 1-4.
Team nChain, "Keys to Secure the Digital Future: nChains's Inventions for Security of Bitcoin, Digital Assets & Digital Resources", nChain, Aug. 3, 2017, pp. 1-7.
U.S. Patent and Trademark Office, "Final Office Action", U.S. Appl. No. 16/595,020, Feb. 11, 2022, pp. 1 through 68, Published: US.
U.S. Patent and Trademark Office, "Notice of Allowance", U.S. Appl. No. 16/595,004, May 10, 2022, pp. 1 through 23, Published: US.
U.S. Patent and Trademark Office, "Notice of Allowance", U.S. Appl. No. 16/595,020, Oct. 20, 2022, pp. 1 through 49, Published: US.
U.S. Patent and Trademark Office, "Notice of Allowance", U.S. Appl. No. 17/889,205, May 8, 2023, pp. 1 through 35, Published: US.
U.S. Patent and Trademark Office, "Office Action", U.S. Appl. No. 16/595,004, Nov. 26, 2021, pp. 1 through 45, Published: US.
U.S. Patent and Trademark Office, "Office Action", U.S. Appl. No. 16/595,020, Jul. 21, 2021, pp. 1 through 125, Published: US.
Wikipedia, "Secret Sharing", Feb. 19, 2018, pp. 1-8.
Wikipedia, "Message authentication code", Mar. 8, 2018, pp. 1-5, Wikipedia.
Wikipedia, "Shamir's Secret Sharing Scheme", as downloaded Mar. 18, 2019 from http://point-at-infinity.org/ssss/, pp. 1 through 3.

(56) References Cited

OTHER PUBLICATIONS

Wikipedia, "Shamir's Secret Sharing", Oct. 20, 2017, pp. 1-6.
Japanese Patent Office, "Notice of Allowance" from JP Application No. 2021-545355, Oct. 18, 2023, from Foreign Counterpart to U.S. Appl. No. 16/595,004, pp. 1 through 3, Published: JP.
Korean Intellectual Property Office, "Office Action" dated Oct. 19, 2024, from KR Application No. 10-2021-7012377, from Foreign Counterpart to U.S. Appl. No. 16/595,004, pp. 1 through 16, Published: KR.

* cited by examiner

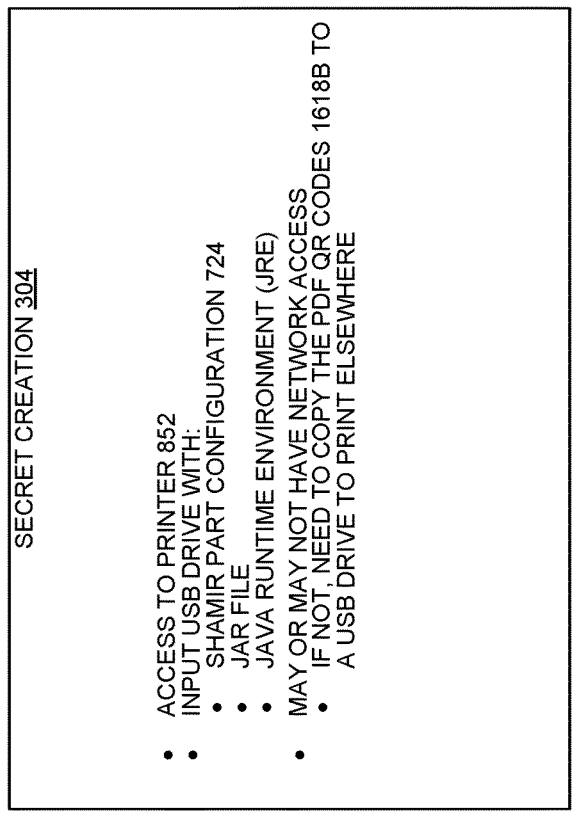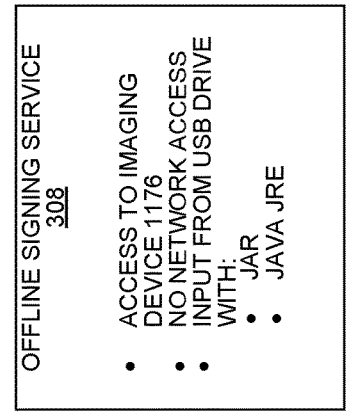
FIG. 17

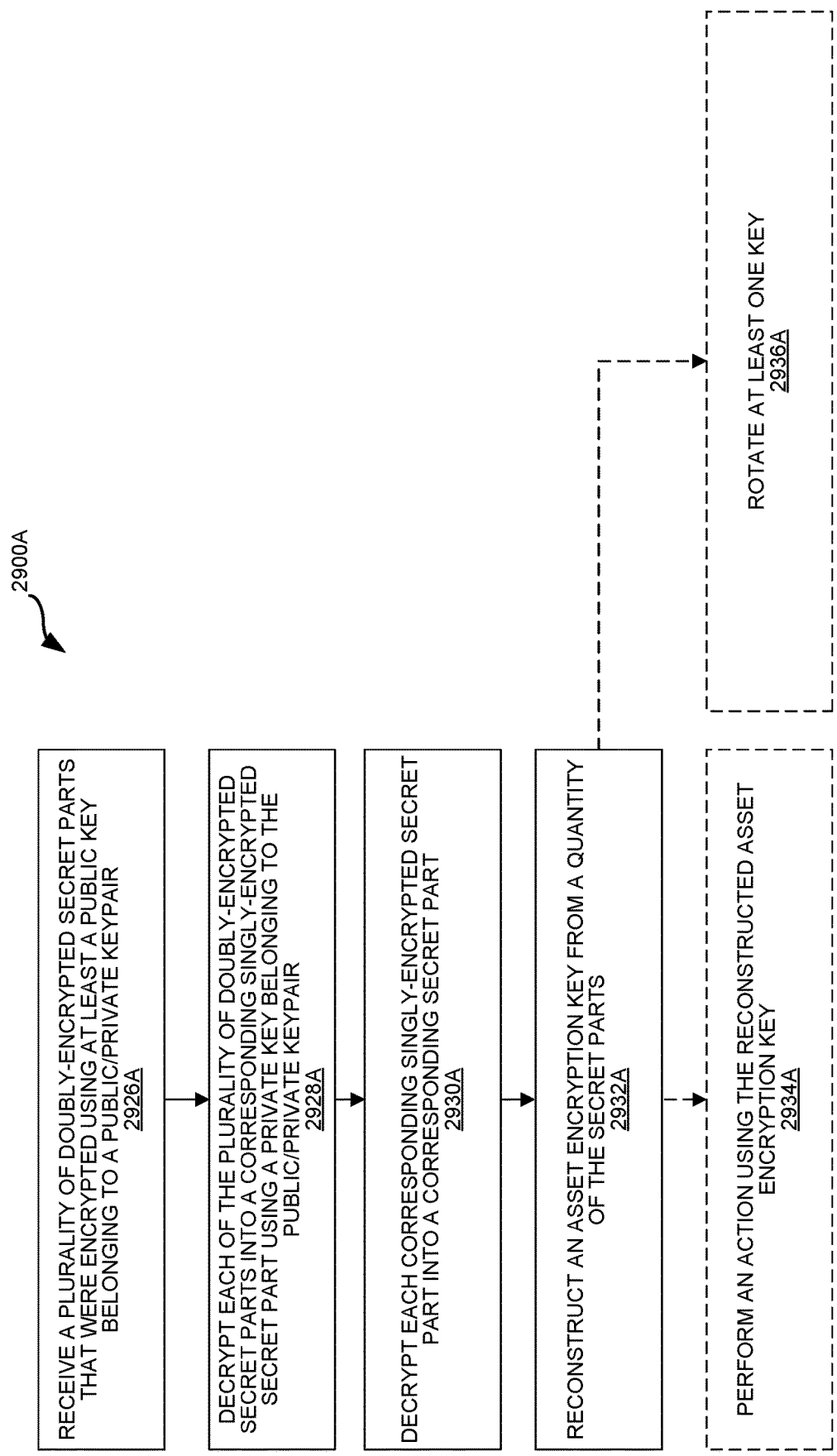

DOUBLY-ENCRYPTED SECRET PARTS ALLOWING FOR ASSEMBLY OF A SECRET USING A SUBSET OF THE DOUBLY-ENCRYPTED SECRET PARTS

CROSS-REFERENCE TO RELATED APPLICATIONS

This application is a continuation of U.S. patent application Ser. No. 17/889,205 filed on Aug. 16, 2022, entitled "DOUBLY-ENCRYPTED SECRET PARTS ALLOWING FOR ASSEMBLY OF A SECRET USING A SUBSET OF THE DOUBLY-ENCRYPTED SECRET PARTS" which is a continuation of U.S. patent application Ser. No. 16/595,004 filed on Oct. 7, 2019, entitled "DOUBLY-ENCRYPTED SECRET PARTS ALLOWING FOR ASSEMBLY OF A SECRET USING A SUBSET OF THE DOUBLY-ENCRYPTED SECRET PARTS" which claims the benefit of U.S. Provisional Patent Application Ser. No. 62/744,886 filed on Oct. 12, 2018, entitled "SPLITTING ASSET KEY ENCRYPTION KEY USED TO ENCRYPT ASSET KEY INTO COMPONENTS ALLOWING ASSEMBLY OF ASSET KEY ENCRYPTION KEY WITH SUBSET OF KEY COMPONENTS TO DECRYPT ENCRYPTED ASSET KEY"; U.S. Provisional Patent Application Ser. No. 62/830,272 filed on Apr. 5, 2019, entitled "ENCRYPTED ASSET ENCRYPTION KEY PARTS ALLOWING FOR ASSEMBLY OF AN ASSET ENCRYPTION KEY USING A SUBSET OF THE ENCRYPTED ASSET ENCRYPTION KEY PARTS"; and U.S. Provisional Patent Application Ser. No. 62/853,231 filed on May 28, 2019, entitled "ENCRYPTED ASSET ENCRYPTION KEY PARTS ALLOWING FOR ASSEMBLY OF AN ASSET ENCRYPTION KEY USING A SUBSET OF THE ENCRYPTED ASSET ENCRYPTION KEY PARTS"; all of which are hereby incorporated herein by reference.

This application is related to the following United States patent application, which is hereby incorporated herein by reference:

U.S. patent application Ser. No. 16/595,020, filed Oct. 7, 2019 entitled "ENCRYPTED ASSET ENCRYPTION KEY PARTS ALLOWING FOR ASSEMBLY OF AN ASSET ENCRYPTION KEY USING A SUBSET OF THE ENCRYPTED ASSET ENCRYPTION KEY PARTS".

BACKGROUND

Cryptography can be used to securely store and transmit data. Keys can be used to encrypt and decrypt data or to sign transactions.

SUMMARY

A system includes at least one processor and at least one memory communicatively coupled to the at least one processor. The at least one processor is configured to encrypt each secret part of at least one set of secret parts into a corresponding singly-encrypted secret part. The at least one processor is also configured to encrypt each corresponding singly-encrypted secret part into a corresponding doubly-encrypted secret part using a corresponding at least one public key, each public key belonging to a corresponding one of at least one public/private keypair. At least a subset of the secret parts of the at least one set of secret parts are used to reconstruct a secret.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which:

FIG. 17 is a block diagram illustrating more details about where/how example systems/methodologies run;

FIG. 29A is a flow diagram illustrating a method for securely reconstructing an asset encryption key;

Figure 1:
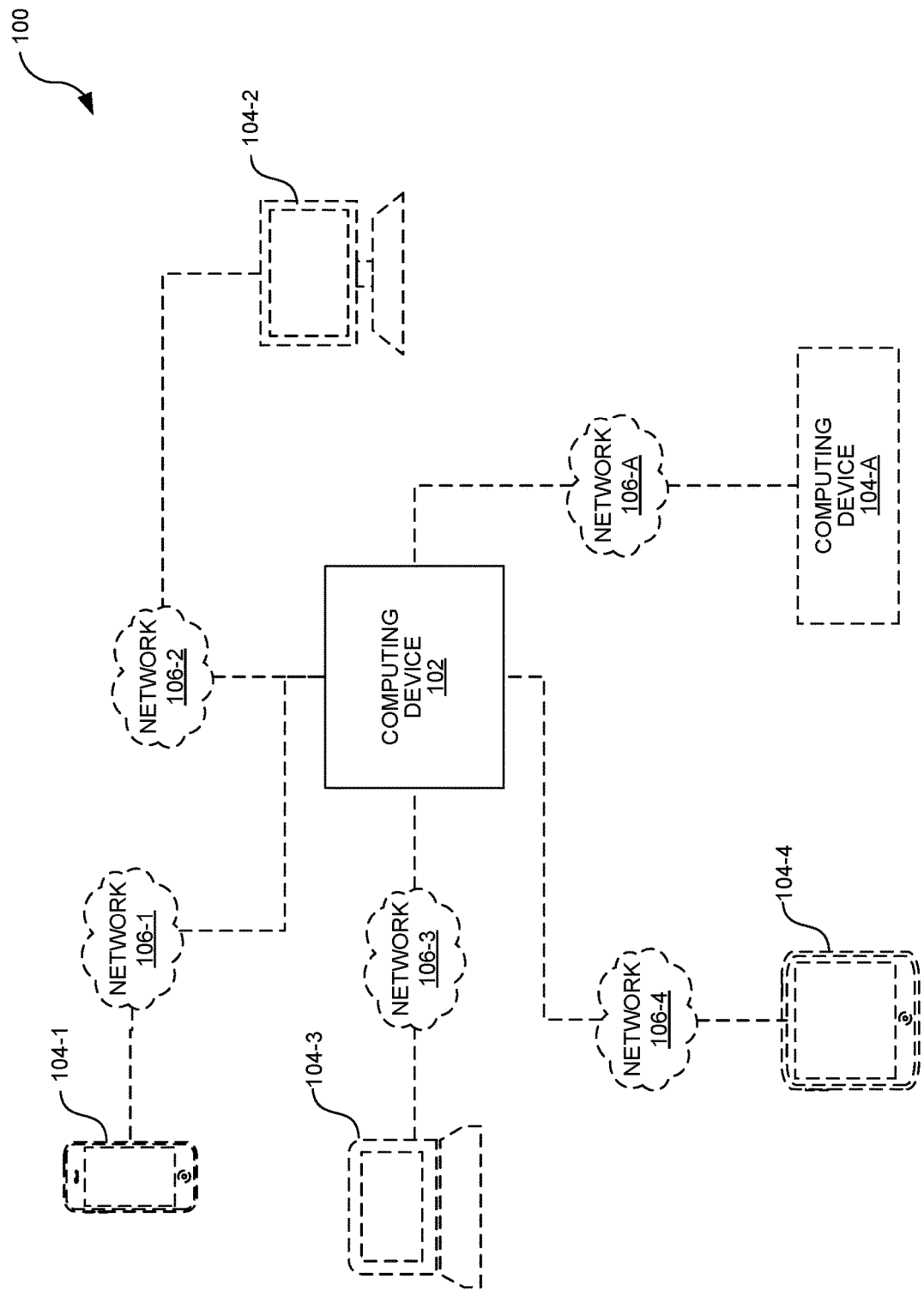
FIG. 1 is block diagram of an example system for securely generating, splitting, and/or reconstructing keys.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Keys, including cryptographic keys, can be used to encrypt and decrypt data as well as to sign transactions. Keys can include (but are not limited to) private keys, public keys, encryption keys, signing keys, and other cryptographic keys as well as passwords and secrets. In examples, a key may be embodied as a string of characters.

In some configurations, one or more symmetric encryption keys may be used. A symmetric encryption key (or simply "symmetric key") may be used to encrypt and/or decrypt data. This is referred to as "symmetric" encryption/decryption because the same key can be used to encrypt and decrypt, e.g., to encrypt and decrypt one or more private keys for different blockchain addresses, accounts, and/or wallets. Without limitation, symmetric keys may operate according to any of the following encryption: Twofish, Serpent, Advanced Encryption Standard (AES), Blowfish, CASTS, Kuznyechik, RC4, Data Encryption Standard (DES), Triple DES (3DES), Skipjack, Safer+/++ (Bluetooth), IDEA and/or other cypher block coding (CBC) variations. Accordingly, even though AES keys are used in some examples below, any other symmetric keys could alternatively be used.

In some configurations, asymmetric encryption may be used. A "public/private keypair," which includes a private key and a corresponding public key, may be used in asymmetric encryption. The private key and public key may alternatively be referred to as an decrypting private key and an encrypting public key. The public key can be used to encrypt data, which can only be decrypted using the private key corresponding to the public key that was used for encryption. In examples, a public key may be used to generate a transaction address (e.g., in a customer wallet), and only the corresponding private key can sign a transaction that spends funds from the transaction address. This may be referred to as "asymmetric" encryption/decryption because the same key is not used to encrypt and decrypt (or sign transactions). It is generally desirable to keep a private key (and sometimes the public key) secure. However, there is often a tradeoff between keeping keys secure and accessible when needed. Without limitation, asymmetric keys may operate according to any of the following encryption: Rivest-Shamir-Adleman (RSA) and Elliptic Curve Cryptography (ECC) (e.g., Curve25519), Edwards-curve Digital Signature Algorithm (EdDSA) (e.g., Ed25519), etc.

In some configurations, messages may be cryptographically signed. In examples, the optional cryptographic signatures described herein may be applied using Libsodium signatures that utilize Ed25519, although other protocols may be used. Cryptographic signatures may use a signing keypair with a signing public key and a signing private key. Specifically, a private signing key may be used to first sign a message (at the message sender), after which a receiver of the message can verify that the message was sent by the creator of the signing public key, assuming the receiving/verifying device already knows the signing public key. In other words, signing can be used to verify that a message was received from a trusted source. In some configurations, cryptographic signing (or simply "signing") may be used in addition to symmetric and/or asymmetric encryption.

In examples, a transmitting device may encrypt (or doubly-encrypt) a key part, including signing it using the transmitting device's signing private key, before transmitted it to a receiving device. The receiving device may then verify that the received encrypted (or doubly-encrypted) key part came from a trusted source by verifying the signature (on the encrypted key or key part) using the transmitting device's signing public key that the receiving device knows in advance. In some configurations, applying a signature may include determining at least one hash (using a hashing function or other cryptographic function) based on at least a message and a signing private key. In some configurations, verifying a signature may include applying at least one cryptographic function based on at least the received, signed message and a signing public key.

In some configurations, the same asymmetric keypair may be used to (1) encrypt (or doubly-encrypt) or decrypt a key or key part; and (2) sign or verify the key or key part, e.g., where the public key is used to encrypt and the private key is used to sign (at the transmitting device), while the public key is used to verify the signature and the private key is used to decrypt (at the receiving device). Alternatively an encrypting keypair may be different from a signing keypair. Furthermore, where different keys or key parts are sent to different part holders, each part holder may have its own unique signing keypair, which may or may not be the same as its unique encrypting keypair. In some configurations, encryption (symmetric or asymmetric) and an optional signature may be applied together, e.g., using a single function call to a Libsodium SealedBox or CryptoBox library of functions.

In some instances, it is not desirable to give a single person full access to a key. Instead, it may be desirable that more than one person be required to use a key. In examples, this could be useful in cases where multiple directors, officers, partners, and/or employees of an organization are required to participate when a key is used. A key can be split into multiple parts where a subset of the parts can be used to reconstruct the key. In examples, the generation of the components of the key can be configured to require a particular quantity of components in order to reconstruct the key. For example, a particular key may be split up into N key components, such that M of the N key components are required to reconstruct the particular key. In examples, the N key components can be distributed to various users. In examples, the key components can be electronically distributed to the devices of the users using at least one of email, Short Message Service (SMS), Multimedia Messaging Service (MMS), instant messaging, push notification (such as a push verify notification), by polling (or pulling) a notification, or by Bluetooth, Wi-Fi, or near field communication (NFC) transmission. In examples, the key components can be displayed on a screen and written down or otherwise physically distributed through printing (such as into a Quick Response (QR) code, barcode, etc.) or stored on USB keys/memory sticks (or other solid state drives), or optical or magnetic disks. In examples, the key is split into the set of key components through at least one of polynomial interpolation or Shamir secret sharing. The terms "key component," "key part," and "part" are used interchangeably herein to refer to a portion of a larger cryptographic key. Key components may be encrypted (or doubly-encrypted) after key splitting.

In one configuration, an asset key may be a private key (e.g., for signing transactions) associated with a custodial account with a large balance, a cryptographic key for decrypting particularly high-value data, etc. An additional layer of security and flexibility can be added by encrypting the asset key with an asset encryption key, then splitting the encryption key into asset encryption key parts. The asset encryption key parts may be further encrypted with a symmetric key to produce encrypted asset encryption key parts (e.g., singly-encrypted parts). Optionally, the encrypted asset encryption key parts may be further encrypted with a public key to form doubly-encrypted secret parts. Each of the singly-encrypted or doubly-encrypted parts is provided to one of a group of people. While more than one of the encrypted parts could be provided to the same person or entity, typically each encrypted part would go to a different person or entity. To perform an action using the asset key, at least M of N encrypted parts must be collected, decrypted, then reconstructed into the asset encryption key, e.g., where 1<=M<=N (and 1<M<N in some configurations). The asset encryption key can then be used, for example, to encrypt or decrypt one or more private keys for different blockchain addresses, accounts, and/or wallets.

Accordingly, the present systems and methods improve systems requiring multiple individuals/entities to hold cryptographic keys (or key parts) in order to perform an action. Specifically, the present systems and methods improve such systems by securely generating and distributing the different keys/key parts in a way that minimizes the possibility of malicious attacks because M of N keys/parts are required and, therefore, collusion between at least M part holders would be required to reconstruct the asset encryption key (and therefore access the asset key) for an unauthorized purpose, while still making them accessible when needed.

Furthermore, the present systems and methods are more secure than conventional key splitting because the various parts of the asset encryption key are further encrypted (with a symmetric key and optionally a public key) before distribution to part holders. Therefore, even if the key parts are intercepted, the asset encryption key could only be reconstructed from the Shamir parts with the symmetric key (and the private key corresponding to the public key, if double encryption was used on the key parts). In other words, this extra layer of symmetric encryption (or double encryption with a public key) of the key parts reduces the possibility of a malicious actor reconstructing the asset encryption key because the symmetric key is known only to a part distributor, not the part holders.

FIG. 1 is block diagram of an example system 100 for securely generating, splitting, and/or reconstructing keys. System 100 includes a computing device 102 and a plurality of optional computing devices 104 (such as optional computing devices 104-1 through optional computing devices 104-A). Each of computing device 102 and computing devices 104 can be implemented as any of a mobile computing device, such as a mobile phone, tablet computer, mobile media device, mobile gaming device, laptop computer, vehicle-based computer, etc.; or a non-mobile device such as a dedicated terminal, a public terminal, a kiosk, a server, or a desktop computer. Each computing device 104 is communicatively coupled to the computing device 102 using at least one network 106 (such as network 106-1 through network 106-A). In examples, the at least one network 106 includes at least one wired network and/or at least one wireless network. In examples, any combination of wired and wireless networks is used to couple the computing devices 104 to the computing device 102. In examples, the at least one network 106 includes at least one of at least one local area network (LAN), at least one wide area network (WAN), or the Internet. In examples, any combination of local area networks, wide area networks, or the Internet is used as the at least one network 106 to couple the computing devices 104 to the computing device 102. In examples, each of computing device 102 and computing devices 104 includes at least one memory, at least one processor, at least one optional network interface, at least one optional display device, at least one optional input device, and at least one power source.

Figure 2:
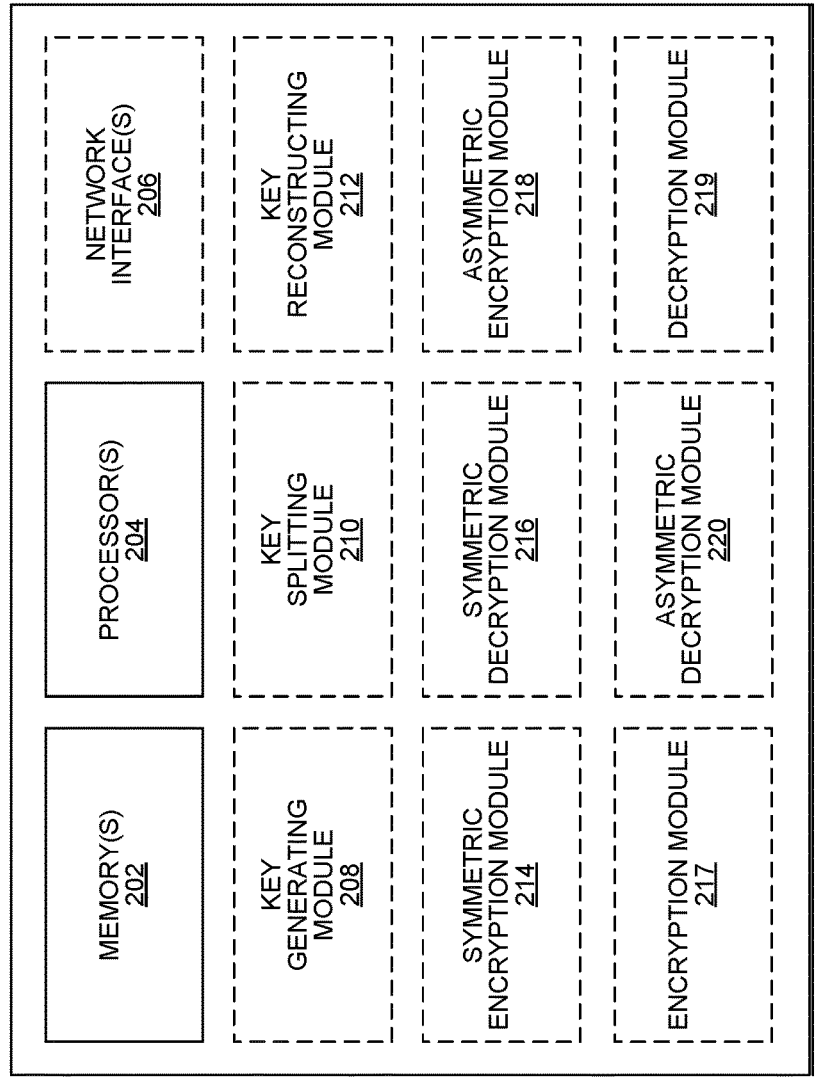
FIG. 2 is a block diagrams of an example computing device used in the system of FIG. 1 for securely generating, splitting and/or reconstructing keys.

FIG. 2 is a block diagram of an example computing device 102 used in system 100 for securely generating, splitting and/or reconstructing keys. Computing device 102 includes at least one memory 202, at least one processor 204, optional at least one network interface 206, optional key generating module 208, optional key splitting module 210, optional key reconstructing module 212, optional symmetric encryption module 214, optional symmetric decryption module 216, optional asymmetric encryption module 218, and optional asymmetric decryption module 220. Furthermore, the computing device 102 may also include various other modules and/or hardware, e.g., optional display device, optional input device, and optional power source.

In examples, the at least one memory 202 can be any device, mechanism, or populated data structure used for storing information. In examples, the at least one memory 202 can be or include any type of volatile memory, non-volatile memory, and/or dynamic memory. For example, the at least one memory 202 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the at least one memory 202 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as the at least one memory 202. The at least one memory 202 may be used to store instructions for running one or more applications or modules on the at least one processor 204. For example, the at least one memory 202 could be used in one or more examples to house all or some of the instructions needed to execute the functionality of the optional key generating module 208, optional key splitting module 210, and optional key reconstructing module 212.

The at least one processor 204 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the at least one key generating module 208, key splitting module 210, and/or key reconstructing module 212 are implemented by the at least one processor 204 and the at least one memory 202.

In examples, the at least one optional network interface 206 and/or the at least one optional network interface 206 includes or is coupled to at least one optional antenna for communication with a network (such as one of the at least one networks 106 of system 100). In examples, the at least one optional network interface 206 and/or the at least one optional network interface 206 includes at least one of an Ethernet interface, a cellular radio access technology (RAT) radio, a Wi-Fi radio, a Bluetooth radio, or a near field communication (NFC) radio. In examples, the at least one optional network interface 206 and/or the at least one optional network interface 206 includes a cellular radio access technology radio configured to establish a cellular data connection (mobile internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 206 and/or the at least one optional network interface 206 includes a Wi-Fi (IEEE 802.11) radio configured to communicate with a wireless local area network that communicates with the remote server, rather than a wide area network. In examples, the at least one optional network interface 206 and/or the at least one optional network interface 206 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device. In examples, the same at least one optional network interface 206 and/or the at least one optional network interface 206 is also used for communication with an external gateway device to a network (such as an NFC payment terminal).

In examples, the optional at least one display device includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device include at least one of a touchscreen (including capacitive and resistive touchscreens), a touchpad, a capacitive button, a mechanical button, a switch, a dial, a keyboard, a mouse, a camera, a biometric sensor/scanner, etc. In examples, the optional at least one display device and the optional at least one input device are combined into a human machine interface (HMI) for user interaction with the computing device 102. In examples, at least one optional power source is used to provide power to the various components of the network node 102.

The at least one processor 204 of the computing device 102 is configured to securely generate at least one key, e.g., an asset key and/or an asset encryption key. In examples, this is implemented in the key generating module 208. The at least one processor 204 of the computing device 102 may be configured to securely generate the at least one key randomly. In examples, the at least one processor 204 of the computing device 102 may implement a key generator to securely generate the at least one key. In examples, the key generator includes at least one of linear feedback shift register (LFSR), Solitaire cipher, and/or Pontifex cipher. In examples, the at least one processor 204 of the computing device 102 is configured to generate the at least one key by generating a sequence having many pseudo-random characteristics. In examples, the at least one key can be used to encrypt and/or decrypt data.

The at least one processor 204 is further configured to split the key into a parts where at least a subset of the parts can be used to reconstruct the key. In examples, this is implemented in the key splitting module 210. In examples, the split of the key into the parts is configurable, such that a particular quantity of parts may be required to reconstruct the key. For example, a particular key may be split up into N parts, such that M of the N parts are required to reconstruct the particular key. In examples, the parts are distributed to various users. In examples, the parts can be electronically distributed to user devices using the at least one network interface 206, such as by at least one of email, Short Message Service (SMS), Multimedia Messaging Service (MMS), instant messaging, push notification, or push verify notification. In examples, the key is split into the parts through at least one of polynomial interpolation or Shamir secret sharing. In examples, the parts can be displayed, printed, or otherwise fixed on a medium provided to users that could then input the key component into their corresponding computing device 104. In examples, an additional layer of security and flexibility can be added by splitting an asset encryption key such that a subset of asset encryption key parts are required to reconstruct the asset encryption key.

In examples, the at least one processor 204 is configured to apply symmetric encryption to a key or key parts. In examples, this symmetric encryption is implemented in a symmetric encryption module 214. In examples, an AES key is used to encrypt asset encryption key parts into encrypted asset encryption key parts. In examples, the symmetric encryption includes applying at least one exclusive or (XOR) operation to each asset encryption key part such that the resulting encrypted asset encryption key part includes a one in each bit position where bits in a corresponding bit position in both the asset encryption key part and the AES key are different; and the encrypted asset encryption key part includes a zero in each bit position where bits in a corresponding bit position in both the asset encryption key part and the AES key are the same.

In examples where a plurality of AES keys are used to encrypt each asset encryption key part, the at least one processor 204 is configured to apply a first exclusive or (XOR) between each asset encryption key part and the first of the plurality of AES keys, then a second exclusive or (XOR) between the result of the first XOR and a second of the plurality of AES keys, and so forth until all of the plurality of AES keys have been used. In examples, only one symmetric key is used by the at least one processor 204 to encrypt the asset encryption key parts, where the asset encryption key may be a symmetric key itself.

Optionally, the at least one processor 204 is configured to apply asymmetric encryption to a key or key parts. In examples, this asymmetric encryption is implemented in an asymmetric encryption module 218. In examples, the asymmetric encryption module 218 may use a public key (that corresponds to a private key in a keypair) to public-key encrypt encrypted asset encryption key parts into doubly-encrypted asset encryption key parts before distribution to part holders. In examples, the public key in a keypair is used to encrypt, then only the corresponding private key in the keypair can be used to decrypt.

In examples, the at least one processor 204 of the computing device 102 is further configured to reconstruct the key from a subset of the parts, e.g., M of N parts. In examples, this is implemented in the key reconstructing module 212. In examples, the computing device 102 may receive the parts (e.g., symmetrically-encrypted or doubly-encrypted using symmetric and asymmetric encryption) by scanning QR codes (physically printed or electronically displayed) from the part holders. Alternatively, the parts may be received at the computing device 102 using the at least one network interface 206, such as by at least one of email, Short Message Service (SMS), Multimedia Messaging Service (MMS), instant messaging, push notification, or push verify notification.

In examples, the at least one processor 204 is configured to decrypt a symmetrically-encrypted key or key parts. In examples, this symmetric decryption is implemented in a symmetric decryption module 216 using the same symmetric key used for symmetric encryption, e.g., in the symmetric encryption module 214. In examples, the (same) AES key used for encryption is also used to decrypt encrypted asset encryption key parts into asset encryption key parts. In examples, the AES decryption includes applying at least one exclusive or (XOR) operation to each encrypted asset encryption key part such that the resulting asset encryption key part includes a one in each bit position where bits in a corresponding bit position in both the encrypted asset encryption key part and the AES key are different; and the asset encryption key part includes a zero in each bit position where bits in a corresponding bit position in both the encrypted asset encryption key part and the AES key are the same.

Optionally, the at least one processor 204 is configured to decrypt a public-key encrypted key or key parts using a private key. In examples, this asymmetric decryption is implemented in an asymmetric decryption module 220 using the private key corresponding to the public key used for the asymmetric encryption, e.g., in the asymmetric encryption module 218. In examples, the private key is used to decrypt doubly-encrypted asset encryption key parts into encrypted asset encryption key parts.

Additionally, where an encryption module 217 is illustrated in the Figures, it can be configured to operate as a symmetric encryption module 214 or an asymmetric encryption module 218, depending on the configuration. Similarly, where a decryption module 219 is illustrated in the Figures, it can be configured to operate as a symmetric decryption module 216 or an asymmetric decryption module 220, depending on the configuration. Where an encryption module 217 is illustrated, it is assumed it has access to the appropriate symmetric or asymmetric keys necessary for the symmetric or asymmetric encryption it performs, even if those keys are not illustrated. Where a decryption module 219 is illustrated, it is assumed it has access to the appropriate symmetric or asymmetric keys necessary for the symmetric or asymmetric decryption it performs, even if those keys are not illustrated.

In examples, an additional layer of security is provided by distributing asset encryption key parts to various part holders, which can help with the situation where some of the parts become lost, comprised, etc. without having the change the asset key itself. In examples, it may make sense to generate new asset encryption key parts to be provided to individuals when key part(s) are lost, compromised, etc. or when the group of individuals who have the key parts should be changed (such as when an executive, other employee, or director departs or changes their position). In such cases, a sufficient quantity of parts are received back at the at least one processor 204 and the at least one processor 204 is configured to regenerate the asset encryption key. One or more new asset encryption key parts can be generated, symmetrically encrypted (and optionally public-key encrypted) before distributing to part holders.

Figure 3:
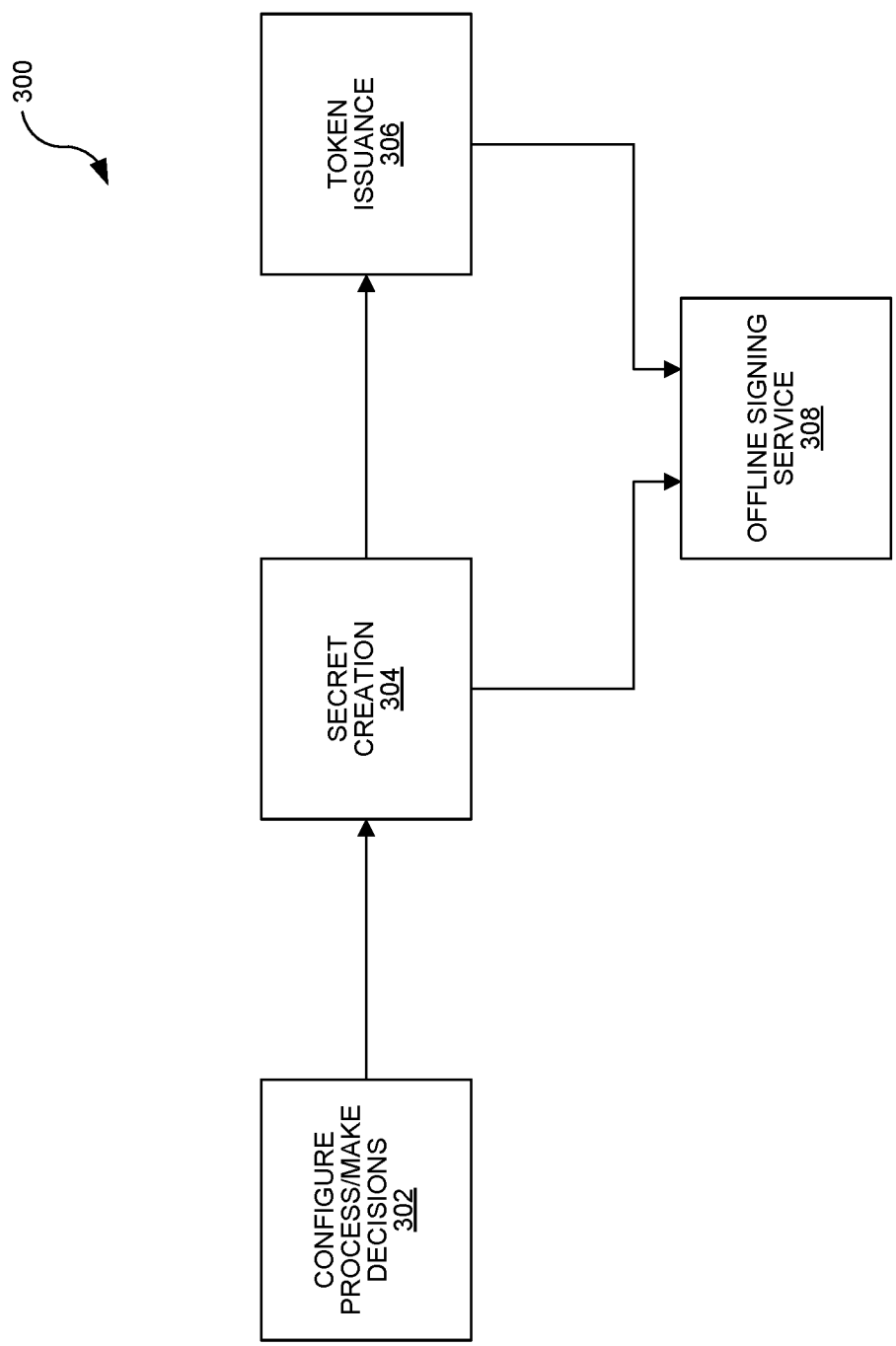
FIG. 3 is a block diagram illustrating an example system/methodology for securing at least one asset key (or other secret) using an asset encryption key that is split into parts to be provided to a plurality of individuals/entities where a subset of the parts can be used to reconstruct the asset encryption key to gain access to asset key.

FIG. 3 is a block diagram illustrating an example system/methodology 300 for securing at least one asset key (or other secret) using an asset encryption key that is split into parts to be provided to a plurality of individuals/entities (part holders) where a subset of the parts can be used to reconstruct the asset encryption key (or simply "secret" or "encryption key") that can be used to gain access to an asset key. The terms "part" and "component," in the context of keys, may be used interchangeably herein to refer to a portion of a key.

The asset key may be a private key (e.g., for signing transactions) associated with a custodial account with a large balance, a cryptographic key for decrypting particularly high-value data, etc. Accordingly, the system/methodology 300 may be used to keep the asset key secure, while still providing access to approved individuals, e.g., requiring M of N individuals to act (e.g., where M is less than or equal to N).

The system/methodology of FIG. 3 is designed to meet a number of goals, including but not limited to the following. First, it is desired that all secrets are encrypted, e.g., on disk or during transmission. Ideally, a secret will be public-key-encrypted. Where it's not possible to public-key encrypt the secret, the secret should be password encrypted. Second, it is desired that public-key encryption is used to identify senders and recipients of payloads. Only the intended recipient is able to decrypt the message. The recipient can authenticate that the message came from the expected sender. Third, it is desired to isolate critical secrets to the services that need them. Fourth, it is desired to minimize interaction with an offline system. For example, it is preferable to use QR codes to transfer data into and out of the system (rather than plugging in USB devices). If the platform's security user experience is too cumbersome, it may be circumvented for administrative ease, which would be undesirable.

There are four main parts to the example system/methodology 300, including: (1) configuring the process/making decisions 302; (2) creating secrets 304; (3) token issuance 306; and (4) an offline signing service 308. Each of elements 302-908 may represent a step, a computing device 102, and/or a person/people performing the step. If a computing device 102 is used to perform a step, it may include at least one processor in the computing device 102 configured to perform the step.

While the description herein is focused on splitting asset encryption key(s) into parts, it is understood that similar systems/methodologies can be used to split and/or distribute other secrets (particularly those that are critical), whether the secret is an asset encryption key or something else. Furthermore, while asset encryption key(s) may be split apart and encrypted as described herein to protect the asset key(s), the present systems and methods can also be used to more generally protect any secret that's split into parts and distributed to a plurality of part holders. For example, the secret being split could be a critical password, account/routing numbers, etc. that is split into parts, then encrypted with a symmetric key, and distributed via public-key cryptography to many part holders. That is, decrypting and reconstructing the secret from parts could be the end goal of the tool, rather than the case where the reconstructed secret is a symmetric key used for other encryption in the system. In examples, the double layer encryption described herein can optionally be used to protect the parts.

With reference to the configuration/decision making 302 in FIG. 3, various decisions may be made to split a secret (e.g., an asset encryption key) into parts, encrypt the secret parts, and/or distribute the secret parts. These decisions may include determining: (1) how many parts each secret will be split into; (2) the identity of the part holders; and (3) who receives and/or retains important passwords. In examples, the following may be used to implement the example system/methodology 300: (1) portable storage drives (e.g., USB or other flash memory) for data transfer and/or back-ups; (2) secure laptop (air gapped without radios such as Wi-Fi and/or Bluetooth and/or including encrypted disks, etc.), though it may have a webcam or other imaging device for capturing/scanning QR codes or other codes/data; (3) secure storage for QR code print-outs (such as tamper tracking evidence bags to be provided to part holders to confirm that they have not been opened while in the possession of the part holder, which could then be placed in a secure location controlled by the part holder, such as a safe); (4) secure storage for laptop and portable storage drive (such as a safe); and/or (5) a printer if necessary to print QR code print-outs (which may be destroyed after QR codes are printed to destroy printer memory that had key parts on it).

The secret creation 304 in FIG. 3 may include securely generating secrets, e.g., using a computing device 102 with at least one processor 204 implementing a Shamir part generator. A part generator may generate a secret (e.g., an asset encryption key, such as the SYM1 key discussed below), a symmetric key (such as a second symmetric key SYM2 discussed below, alternatively referred to as an "encryption key"), and/or an offline signing service keypair (including a private key and a public key). The asset encryption key may be subsequently split into parts (e.g., Shamir parts SYM1 parts 1-N). Each asset encryption key part (e.g., SYM1 part) is encrypted using a symmetric key SYM2. This SYM2 symmetric key can be the same for each SYM1 part or it can be different for the various SYM1 parts. Password encryption may also be applied to the private key of the offline signing service keypair and/or the SYM2 symmetric key. The public key of the offline signing service keypair is used to encrypt each of the SYM2-encrypted SYM1 parts.

In examples, the SYM2-encrypted SYM1 parts (encrypted asset encryption key parts) may be distributed to part holders, e.g., printed as QR code print-outs. Additionally or alternatively, the SYM2-encrypted SYM1 parts may be further encrypted using public key of the offline signing service keypair, and these doubly-encrypted secret parts distributed to part holders, e.g., printed as QR code print-outs.

With reference to token issuance 306 in FIG. 3, the token issuance 306 may include: (1) creating Ethereum addresses for custodian(s), broker dealer(s), and/or a custodial broker dealer account; (2) creating a Hierarchal Deterministic (HD) key for investor addresses and (Ethereum addresses are generated for investors); (3) deploying a smart contract and issuing tokens to investor addresses. In examples, an administrator address may be created in the offline signing service 308. In examples, ownership of contracts may be transferred to administrator address.

The present systems and methods may utilize an offline signing service 308 and/or an online signing service to, among other things, reconstruct asset encryption keys from secret parts. The offline signing service may receive secret parts via offline pathways, e.g., by scanning a printed (or electronically displayed) QR code or reading a portable storage drive. In contrast, an online signing service may receive secret parts via a network connection, e.g., the Internet.

The offline signing service 308 may be implemented on a computing device 102 (e.g., a secure air-gapped laptop) with at least one processor. Various actions may be taken with respect to the offline signing service 308. For example, the following information, without limitation, may be loaded onto the offline signing service 308: a Shamir part configuration (such as roles, e-mails, etc.); the password-protected private key of the offline signing service keypair and SYM2 key(s) for the offline signing service; and/or the public key of the online signing service keypair are provided. The various information may be loaded onto the offline signing service 308, e.g., via a portable storage drive plugged directly into the air-gapped laptop. The air-gapped laptop may be password-protected. The password-protected private key of the offline signing service keypair and SYM2 keys for the offline signing service and/or the public key of the online signing service keypair may be stored as persistent data on the secure air-gapped laptop implementing the offline signing service 308. The Shamir parts (created in 304) may be accepted from the part holders, e.g., by scanning the QR codes provided to the part holders earlier. In one configuration, the offline signing service 308 uses the private key of the offline signing service keypair to remove the asymmetric (e.g., public-key) encryption and stores the SYM2-encrypted SYM1 parts (or doubly-encrypted secret parts) into memory of the laptop until enough of the Shamir parts have been received to reconstruct the SYM1 asset encryption key.

In examples, the offline signing service 308 may also create a smart contract administrator account, as described below. In examples, the offline signing service 308 may be shut down after the system/methodology 300 is initialized and configured. During shutdown of the offline signing service 308, the persistent data on the laptop may be backed up and saved separately in secure locations, such as in safes, safety deposit boxes, or lock boxes.

Figure 4:
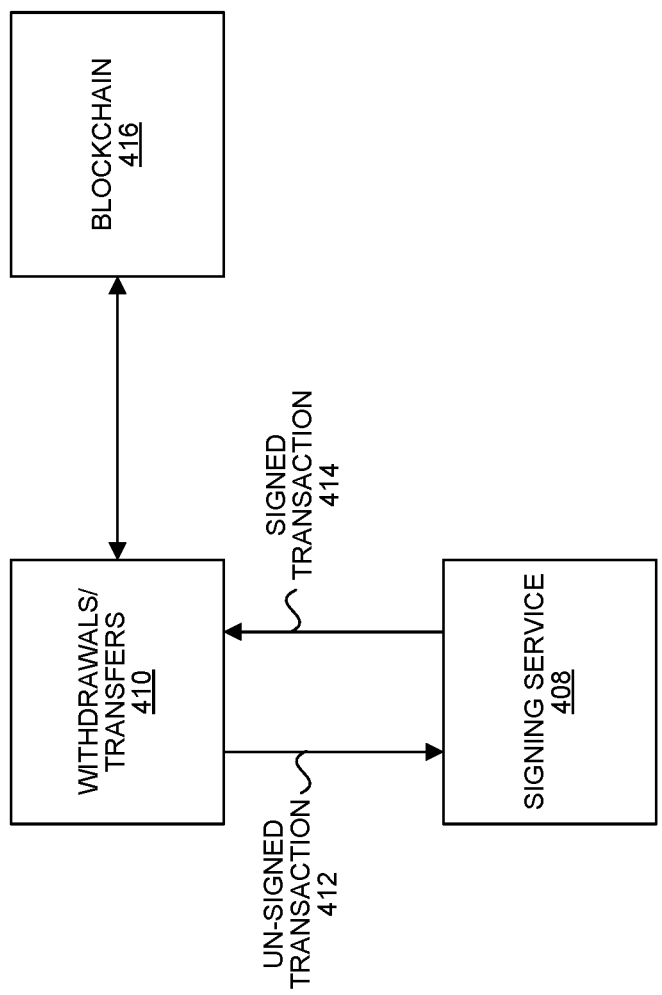
FIG. 4 is a block diagram illustrating an example signing service, such as the signing service shown in FIG. 3.

FIG. 4 is a block diagram illustrating an example signing service 408, e.g., similar to the offline signing service 308 shown in FIG. 3. The signing service 408 can hold the various keys, for example, SYM2-encrypted SYM1 parts (encrypted asset encryption key parts), doubly-encrypted secret parts, a public key of the signing service 408 keypair, and/or a private key of the signing service 408 keypair, etc. The signing service 408 may sign transactions (e.g., withdrawals or transfers 410) as a service. For example, the signing service 408 may receive un-signed transactions 412 and send a signed transaction 414 for recording on a blockchain 416, e.g., Ethereum, Bitcoin, Ravencoin, etc.

Similar signing service implementations can be used for hot and cold wallet secret storage. While both hot wallets and cold wallets are protected and secure, a hot wallet is frequently accessed, but must be available through network interface(s). In contrast, a cold wallet is infrequently accessed and not available through network interface(s).

Figure 5A:
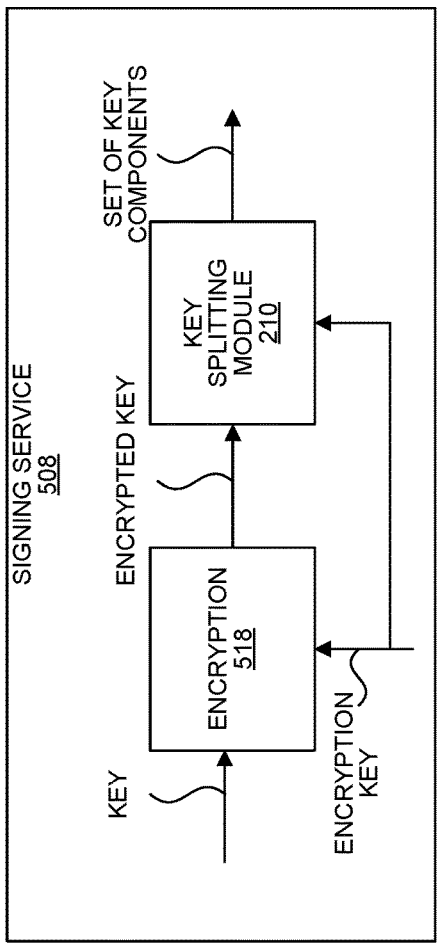
FIG. 5A is a block diagram illustrating an example signing service, such as the signing services shown in FIGS. 3-4.

FIG. 5A is a block diagram illustrating an example signing service 408, e.g., similar to the offline signing service 308 shown in FIGS. 3-4. In order to protect the secret key(s) for an asset(s), the key(s) themselves are not split into parts (such as Shamir secret parts). Rather, the key(s) are encrypted 518 with another encryption key(s) (such as a symmetric key), and the encryption key(s) and the encrypted key(s) are split (by a key splitting module 210) into parts (such as Shamir secret parts) to form a set(s) of key components. Each set(s) of key components is provided to a respective part holder. In examples, a subset of all the set(s) of key components can be used to reconstruct the encryption key(s)

Figure 5B:
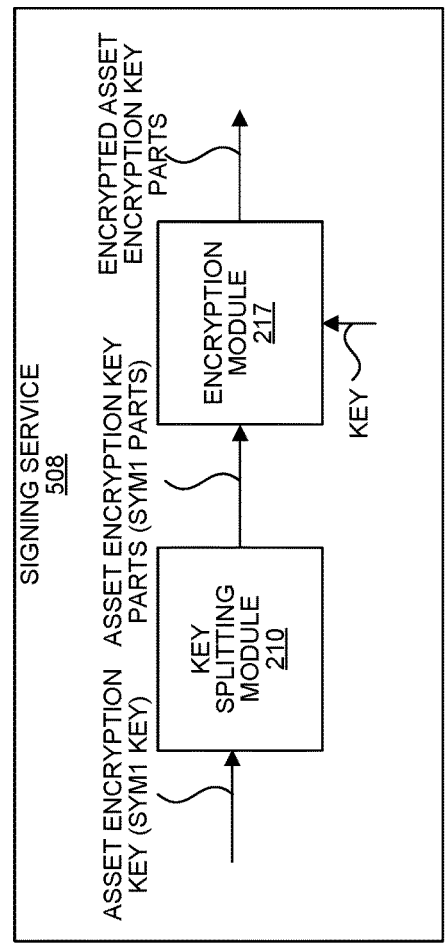
FIG. 5B is a block diagram illustrating another example signing service, such as the signing services shown in FIGS. 3-4.

FIG. 5B is a block diagram illustrating another example signing service 408, e.g., similar to the offline signing service 308 shown in FIGS. 3-4. In contrast to FIG. 5A, an asset encryption key (SYM1 key) may be split (by a key splitting module 210) into asset encryption key parts (such as Shamir secret parts) before encryption in an encryption module 217 with a key (either a symmetric key or an asymmetric key, depending on what type of encryption is performed). The result may be encrypted asset encryption key parts (or singly-encrypted secret parts), which can optionally be further encrypted with a public key of a signing service keypair (not shown) to produce doubly-encrypted secret parts. Each encrypted asset encryption key part (or doubly-encrypted secret part) may be provided to a respective part holder. In examples, a subset of the parts can be used to reconstruct the asset encryption key without requiring all of the parts.

Figure 6:
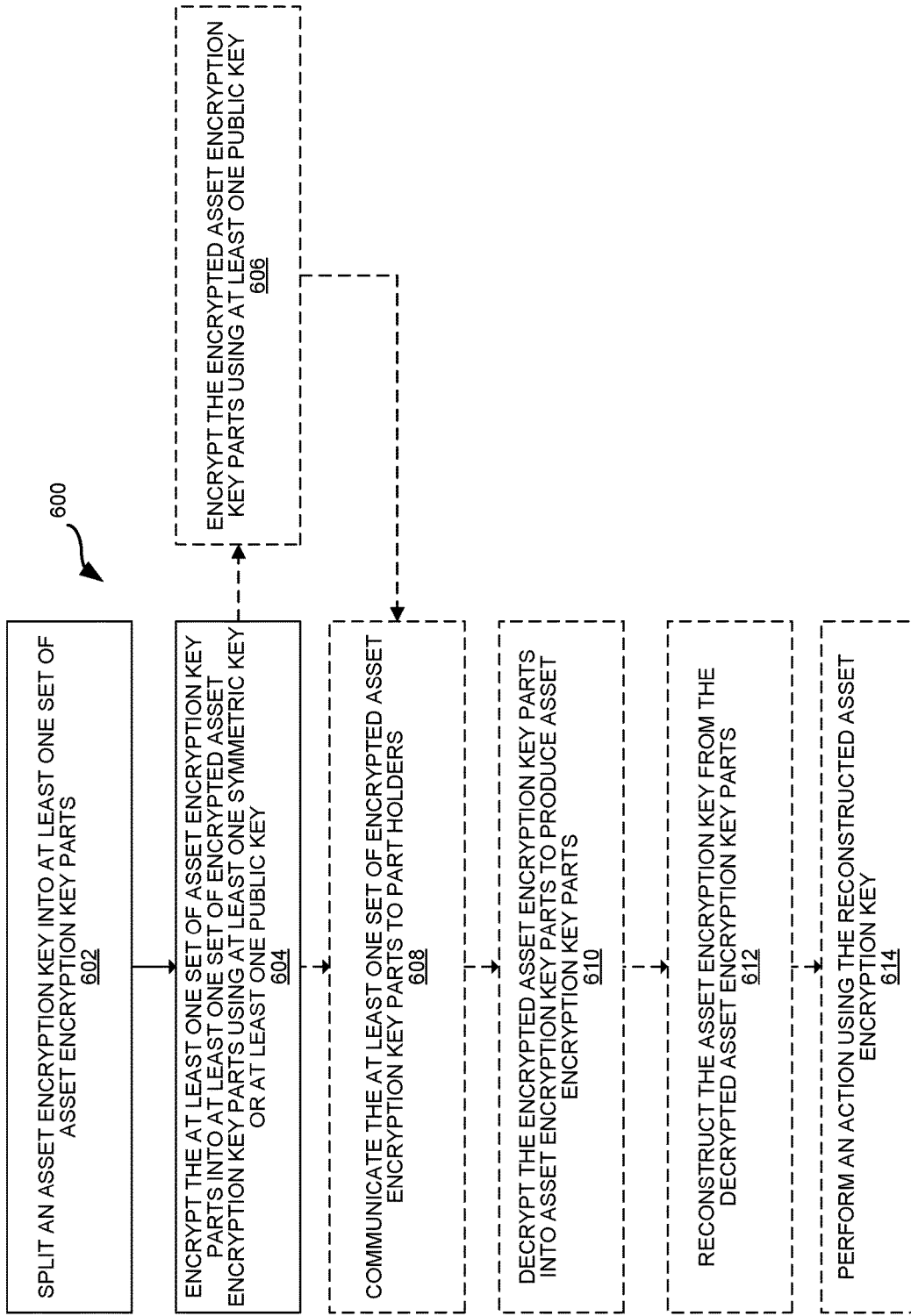
FIG. 6 is a flow diagram illustrating a method for splitting an asset encryption key.

FIG. 6 is a flow diagram illustrating a method 600 for splitting an asset encryption key. The method 600 may be performed by at least one computing device 102, each implemented with at least one processor. For example, the method 600 may be performed by a computing device 102 implementing the offline signing service 308. Accordingly, the method 600 may, at least partially, implement secret creation 304 and/or the offline signing service 308 shown in FIG. 3.

The method 600 begins at step 602 where the at least one processor splits an asset encryption key into at least one set of asset encryption key parts. The splitting may include at least one of polynomial interpolation or Shamir secret sharing.

If reconstructed (e.g., using at least M of N asset encryption key parts), the asset encryption key may be used to gain access to an asset key (or multiple asset keys). Each asset key may be a cryptographic (e.g., private) key, e.g., of high importance to a person or organization. In examples, each asset key is a blockchain (e.g., Ethereum, Bitcoin) private key (for a wallet address or smart contract on the blockchain 416), in which case the asset encryption key is used to encrypt/decrypt at least one blockchain private keys. In one configuration, a single asset encryption key (SYM1 key) may be used to symmetrically encrypt/decrypt multiple private keys for different blockchain addresses, accounts, and/or wallets. In another configuration, a different asset encryption key may be used for each blockchain private key. Furthermore, the asset key may be a non-cryptographic-key string of important data, e.g., a password or 15-word mnemonic phrase for a cryptocurrency wallet.

The method 600 proceeds at step 604 where the at least one processor encrypts the at least one set of asset encryption key parts into at least one set of encrypted asset encryption key parts (e.g., SYM2-encrypted SYM1 parts or "singly-encrypted" secret parts) using at least one symmetric key 732 (e.g., SYM2 key) or at least one public key. The SYM2 symmetric key can be the same for each SYM1 part or it can be different for each asset encryption key part (SYM1 part). The SYM2 encryption may include XORing the SYM2 key with each SYM1 parts. Alternatively, the encryption performed in step 604 may be asymmetric encryption using an encrypting public key, e.g., belonging to a generating device or a part holder. In examples, each public key 736 belongs to a corresponding public/private keypair, e.g., of an offline signing service 308 or an online signing service 1809.

Optionally, Shamir metadata may be added during step 604. Shamir metadata may provide instructions and/or requirements for reconstituting the asset encryption key (SYM1 key) from the asset encryption key parts (SYM1 parts), e.g., that M of N asset encryption key parts are required to reconstitute the asset encryption key. Shamir metadata for a particular part (encrypted or not) may also indicate which part holder the part is intended for.

The method 600 proceeds at optional step 606 where the at least one processor encrypts the encrypted asset encryption key parts (SYM2-encrypted SYM1 parts) using at least one public key. If optional step 606 is performed, the resulting parts may be referred to as doubly-encrypted secret parts. This may include applying public-key encryption using a public key of an offline signing service keypair. Alternatively, a public key unique to each part holder may be used to encrypt each of the SYM2-encrypted SYM1 parts.

While not shown in FIG. 6, the at least one set of encrypted asset encryption key parts (singly-encrypted resulting from step 604 or doubly-encrypted resulting from optional step 606) can optionally be signed using a signing private key belonging to the generating device (that performed steps 602 and 604).

The method 600 proceeds at optional step 608 (proceeding from step 604 or optional step 606) where the at least one processor communicates the at least one set of encrypted asset encryption key parts (singly or doubly-encrypted) to part holders (e.g., N part holders, each receiving one set of encrypted asset encryption key parts). In examples, this may include printing QR codes representing the singly or doubly-encrypted parts or storing them on a portable storage drive.

If the at least one set of encrypted asset encryption key parts was signed before communication (in step 608), the receiving device may verify that the at least one set of encrypted asset encryption key parts was received from a trusted source, e.g., using a signing public key belonging to the generating device and corresponding to the signing private key used to sign the at least one set of encrypted asset encryption key parts.

The method 600 proceeds at optional step 610 where the at least one processor decrypts the encrypted asset encryption key parts (singly or doubly-encrypted) to produce asset encryption key parts (SYM1 parts). In examples, parts (singly or doubly-encrypted) may be received from at least some (e.g., M of N) the part holders.

If the encrypted asset encryption key parts are doubly-encrypted (optional step 606 was performed for the parts), each decryption may include (1) decrypting the doubly-encrypted secret part using the private key (e.g., of the offline signing service keypair, online signing service, or a respective part holder keypair) to produce singly-encrypted asset encryption key parts; and (2) decrypting the singly-encrypted asset encryption key parts into asset encryption key parts (SYM1 parts) using the symmetric key (e.g., that is specific to the encrypted asset encryption key) or a private key of a respective part holder, an offline signing service 308 or an online signing service.

If the encrypted asset encryption key parts are singly-encrypted (optional step 606 was not performed for the parts), the decryption may include decrypting the encrypted asset encryption key parts (SYM2-encrypted SYM1 parts) using the symmetric key or a private key of a respective part holder, an offline signing service 308 or an online signing service.

The method 600 proceeds at optional step 612 where the at least one processor reconstructs the asset encryption key (SYM1 key) from the decrypted asset encryption key parts (SYM1 parts). In examples, at least M of N decrypted asset encryption key parts are required to reconstruct the asset encryption key (SYM1 key). Step 612 may utilize the optional Shamir metadata to know whether enough asset encryption key parts have been collected to reconstruct the asset encryption key.

The method 600 proceeds at optional step 614 where the at least one processor performs an action using the reconstructed asset encryption key. In examples, the asset encryption key may be used to gain access to an asset key (or multiple asset keys). If the asset key is a blockchain (e.g., Ethereum, Bitcoin) private key (for a wallet address or smart contract on the blockchain 416), the asset encryption key is used to encrypt/decrypt the blockchain private key. In examples, the asset encryption key is used to sign a sweeping transaction during customer wallet recovery or generate a transaction address for a high-balance account. Alternatively, the asset key may be a non-cryptographic-key string, such as a password or 15-word seed mnemonic phrase for a cryptocurrency wallet. Therefore, the action may include encrypting or decrypting a private blockchain key or other password-like data to access a cryptocurrency address/wallet/account or a smart contract on a blockchain 416.

Figure 7A:
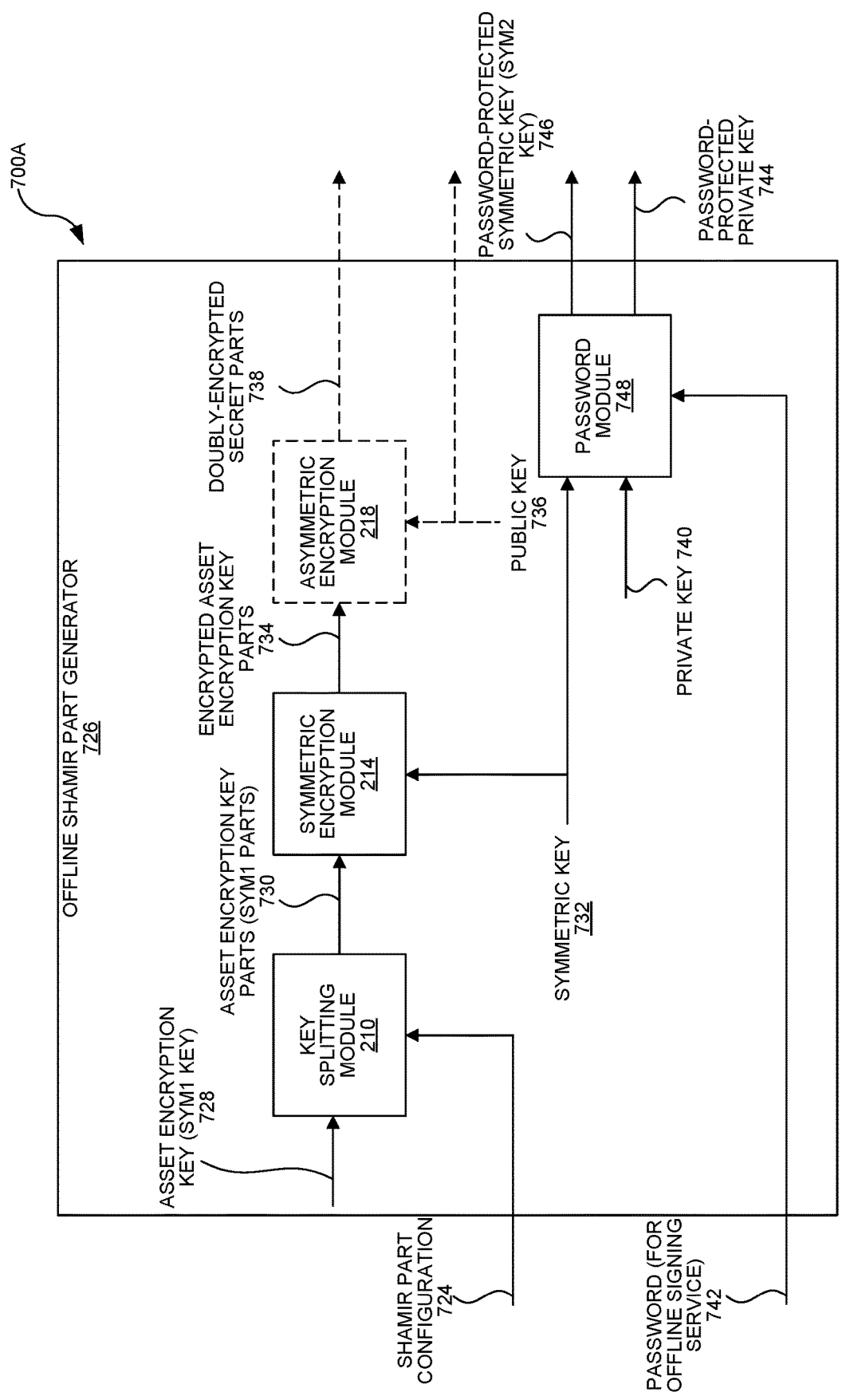
FIG. 7A is a block diagram illustrating an example system/methodology for creating secrets using an Offline Shamir Part Generator.
Figure 7B:
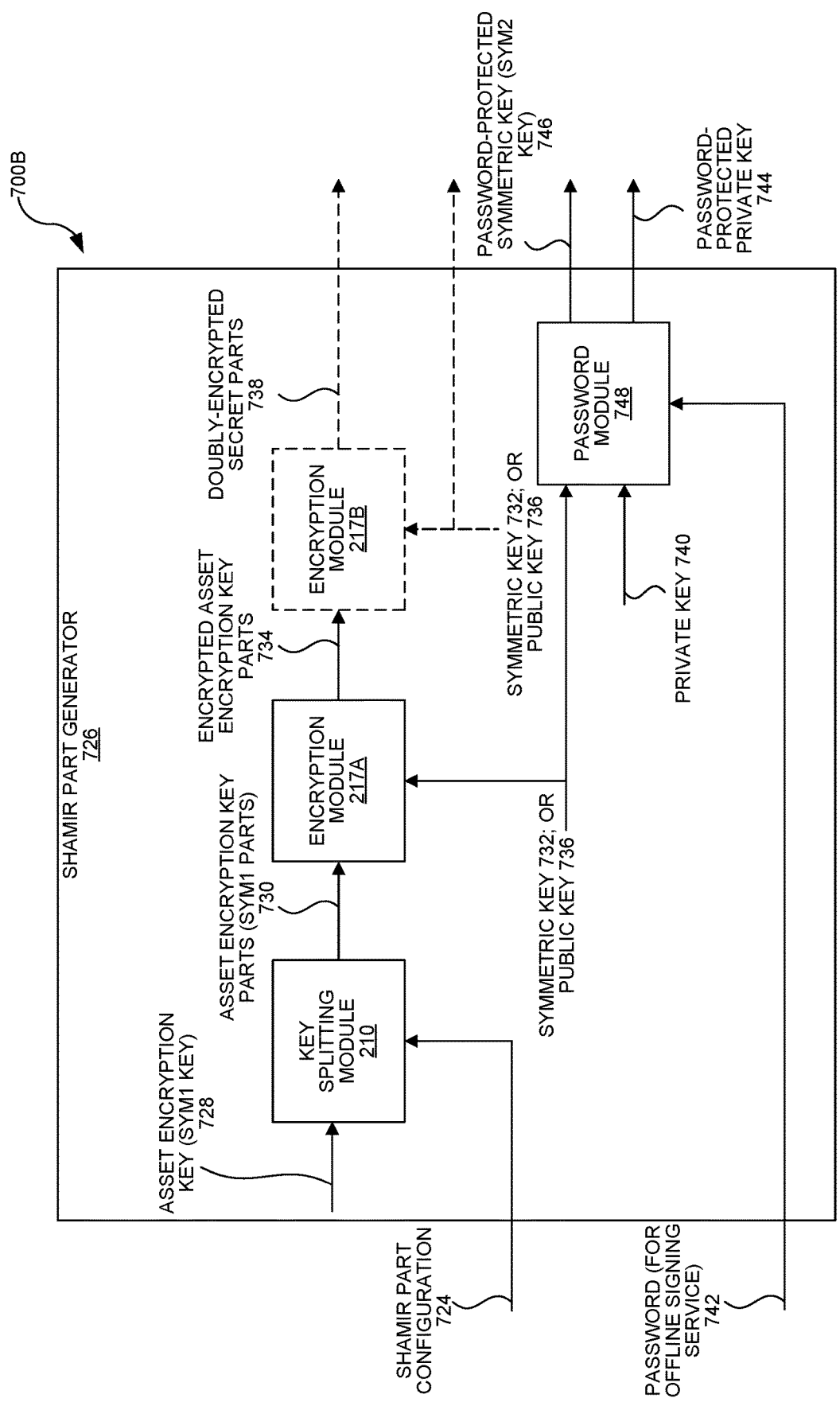
FIG. 7B is a block diagram illustrating another example system/methodology for creating secrets using a Shamir part generator.
Figure 8:
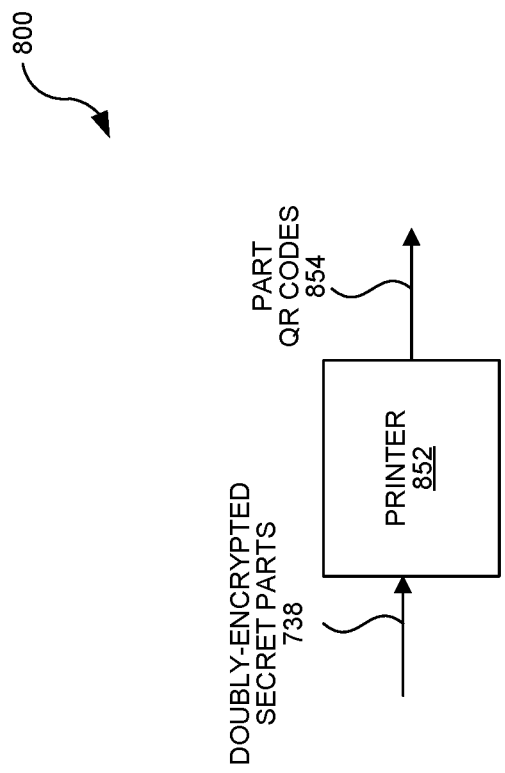
FIG. 8 is a block diagram illustrating an example system/methodology for generating QR codes for each of the SYM1 parts that has been encrypted by the SYM2 symmetric key and the public key of a public/private keypair.
Figure 9:
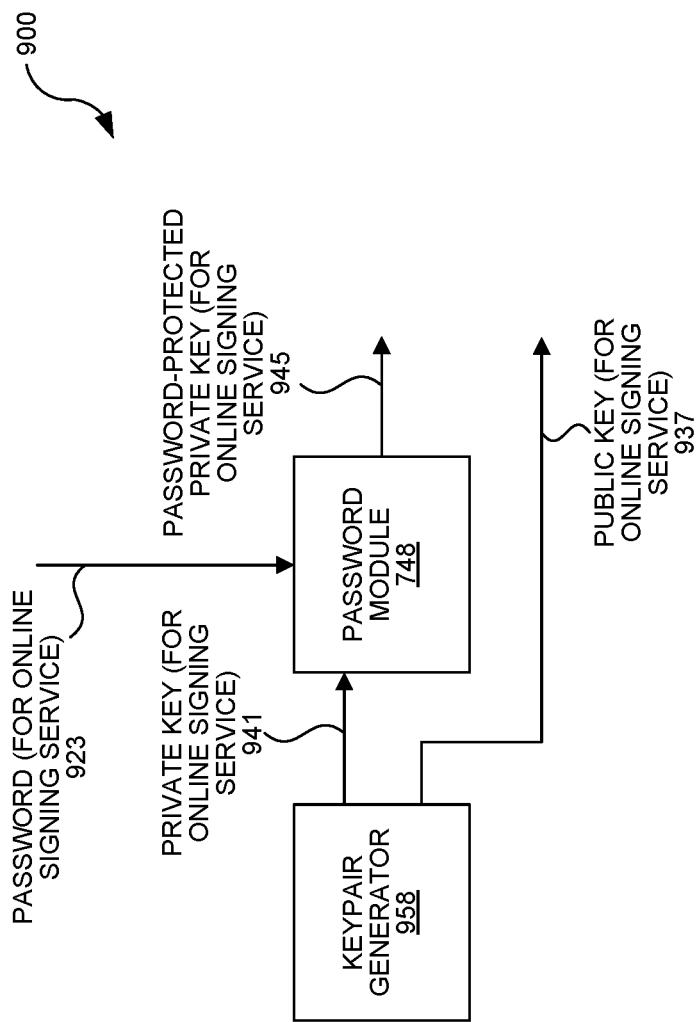
FIG. 9 is a block diagram illustrating an example system/methodology for creating a keypair for the online signing service.

FIGS. 7-9 illustrate various aspects of the secret creation 304 illustrated in FIG. 3. Specifically, FIG. 7A is a block diagram illustrating an example system/methodology 700A for creating secrets using an offline Shamir part generator 726. A user provides a password 742 and a Shamir part configuration 724 (such as roles, email, etc.) regarding the Shamir parts to the offline Shamir part generator 726. The offline Shamir part generator 726 generates an asset encryption key 728 (SYM1 key), which is split (by a key splitting module 210) into asset encryption key parts 730 (SYM1 parts).

In examples, information from the Shamir part configuration 724 may optionally be included in the encrypted asset encryption key parts 734 and/or the doubly-encrypted secret parts 738 in the form of Shamir metadata. The Shamir metadata may provide instructions and/or requirements for reconstituting the asset encryption key 728 (SYM1 key) from the asset encryption key parts 730 (SYM1 parts), e.g., that M of N asset encryption key parts 730 are required to reconstitute the asset encryption key 728. Shamir metadata for a particular part (encrypted or not) may also indicate which part holder the part is intended for.

The offline Shamir part generator 726 also generates a symmetric key 732 (SYM2 key) that is used to encrypt the asset encryption key parts 730 (SYM1 parts) into encrypted asset encryption key parts 734 (SYM2-encrypted SYM1 parts, or singly-encrypted secret parts), e.g., using at least one exclusive OR (XOR) operation in a symmetric encryption module 214. This SYM2 symmetric key 732 can be the same for each SYM1 part 730 or it can be different for the various SYM1 parts 730. If Shamir metadata is added, each encrypted asset encryption key parts 734 may be a respective asset encryption key part 730 with Shamir metadata, both of which are symmetrically encrypted together. During the first stage of encryption (in the symmetric encryption module 214), a first signature may optionally be applied to the encrypted asset encryption key parts 734 using a distributor signing private key (not shown).

In some configurations, the offline Shamir part generator 726 also generates a keypair (e.g., for the offline signing service 308) that includes a private key 740 and a public key 736. In examples, the private key 740 is known only to a distributor of encrypted parts (and optionally an assembler/reconstructor of the parts, discussed below), while the public key 736 may be shared more freely, e.g., with part holders 1620.

The public key 736 is used (in an optional asymmetric encryption module 218) to encrypt each of the encrypted asset encryption key parts 734 (SYM2-encrypted SYM1 parts) into doubly-encrypted secret parts 738. Optionally, during the optional second stage of encryption (in the asymmetric encryption module 218), a second signature may optionally be applied to the doubly-encrypted secret parts 738, using the distributor signing private key (not shown). Each public key 736 may be distributed to the respective part holder, along with a doubly-encrypted secret part 738 associated with the respective part holder.

Password encryption is applied to the private key 740 (e.g., of the distributor keypair) as well as the symmetric key 732 (SYM2 key). In other words, following the password module 748, a password 742 may be required to access the private key 740 and the symmetric key 732 (SYM2 key) from the password-protected private key 744 and the password-protected symmetric key 746, respectively. The password-protected private key(s) 744 (along with password-protected symmetric key(s) 746 (SYM2 key) 744) may be stored at a part assembler, e.g., to subsequently reconstruct the asset encryption key 728.

FIG. 7B is a block diagram illustrating another example system/methodology 700B for creating secrets using a Shamir part generator 726. FIG. 7B may include many of the same devices, modules, and data as in FIG. 7A. Unless otherwise noted, the devices, modules, and data in FIG. 7B operate in a similar manner to the devices, modules, and data in FIG. 7A.

Instead of a symmetric encryption module 214 and an optional asymmetric encryption module 218, the Shamir part generator 726 may use a first encryption module 217A and a second encryption module 217B. Each encryption module 217 may be a symmetric encryption module 214 (that uses a symmetric key, such as a symmetric key 732) or an asymmetric encryption module 218 (that uses an asymmetric key, such as the public key 736 or a part holder encrypting public key).

Accordingly, the doubly-encrypted secret parts 738 may be encrypted using any two stages of encryption, each stage being symmetric or asymmetric. For example, even though doubly-encrypted secret parts 738 are often described herein as being generated using a first asymmetric encryption followed by a second symmetric encryption, they may be generated using (1) two stages of asymmetric encryption; (2) two stages of symmetric encryption; (3) a first stage of asymmetric encryption and a second stage of symmetric encryption; or (4) a first stage of symmetric encryption and a second stage of asymmetric encryption. Furthermore, where two stages of encryption are described herein, it is understood that more than two stages could alternatively be used, each stage being symmetric or asymmetric.

Optionally, Shamir metadata may be added to the encrypted asset encryption key parts 734. If Shamir metadata is added, each encrypted asset encryption key part 734 may be a respective asset encryption key part 730 with Shamir metadata, both of which are encrypted (symmetrically or asymmetrically) together. Additionally, the encrypted asset encryption key parts 734 and/or the doubly-encrypted secret parts 738 (if generated) may be signed using a distributor signing private key.

FIG. 8 is a block diagram illustrating an example system/methodology 800 for generating part QR codes 854 for each of the SYM1 parts 730 that has been encrypted by the SYM2 symmetric key 732 and the public key 736 of the offline signing service keypair. Each public-key-encrypted SYM2-encrypted SYM1 part (i.e., doubly-encrypted secret part 738) is provided to a printer 852 to print a part QR code 854. Each part QR code 854 is distributed to a part holder. Each part holder may be an individual or entity that is trusted to keep their respective part QR code 854 safe. If the asset encryption key 728 needs to be reconstructed, each respective part holder may present their part QR code 854 to be scanned, after which their public-key-encrypted SYM2-encrypted SYM1 part (i.e., doubly-encrypted secret part 738) can be decrypted into their secret part 730 (and reconstructed as the asset encryption key 728, if M secret parts 730 are gathered).

FIG. 9 is a block diagram illustrating an example system/methodology 900 for creating a keypair, e.g., for an online signing service. A keypair generator 958 may generate an online signing service keypair that includes a private key 941 and a public key 937. A password 923 (for the online signing service) is provided by a user (to a computing device) to password-protect the private key 941 for the online signing service. Accordingly, each private key 941 may be protected with the password 923 from the user to produce a password-protected private key (for the online signing service) 945, e.g., using a password module 748. The password-protected private key 945 (along with password-protected symmetric key (SYM2 key) 746) may be stored at a part assembler, e.g., to subsequently reconstruct the asset encryption key 728.

Figure 10:
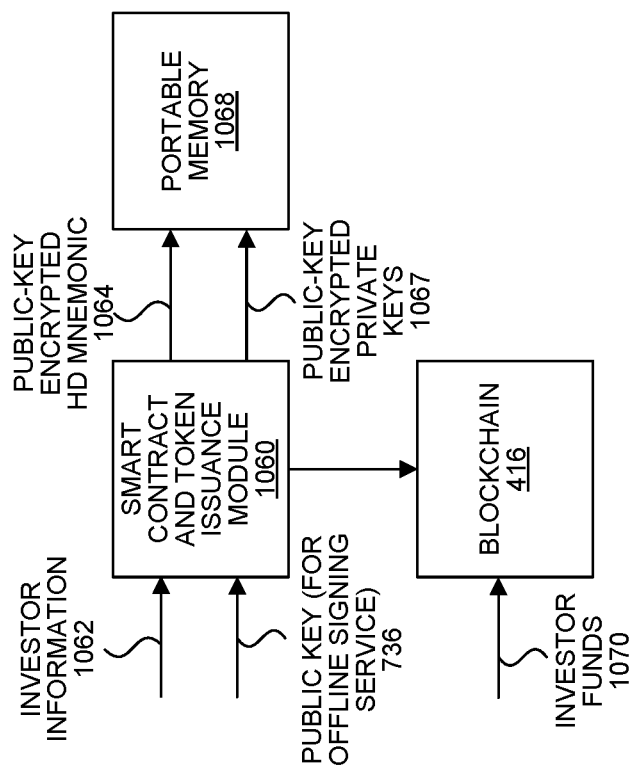
FIG. 10 is a block diagram illustrating an example system/methodology for issuing tokens. In examples, investors provide funds to buy tokens using their Ethereum wallets.

FIG. 10 is a block diagram illustrating an example system/methodology 306 for issuing tokens, e.g., FIG. 10 illustrates aspects of the token issuance 306 in FIG. 3. The token issuance 306 may have prerequisites of: (1) collecting investor information 1062 (e.g., including Personally Identifiable Information (PII) hash); and (2) creating a deployment address and funding with ETH (ether) if using the Ethereum blockchain 416 or some other fuel if using a different chain. In examples, the following Ethereum addresses may be created: (1) custodian(s); (2) broker dealer (s); and (3) custodial broker dealer account. In examples, a Hierarchal Deterministic (HD) key is created for investor addresses and Ethereum addresses are generated for investors. In examples, a contract is deployed and tokens are issued to investor addresses. In examples, administrator address may be created in an offline signing service 308. In examples, ownership of contracts may be transferred to administrator address.

In examples, investors provide funds 1070 to buy tokens, e.g., using their Ethereum wallets. The investor PII hashes and other configuration information 1062 are provided with a public key 736 to enable the smart contract and token issuance module 1060. The token issuance 306 results in a public-key-encrypted Hierarchical Deterministic (HD) mnemonic 1064 and public-key-encrypted (Ethereum) private keys 1067 for custodian, Broker Dealer (BD), and BD-account addresses, e.g., using the public key 736 for security. Alternatively, the HD mnemonic and the private keys may be encrypted in other ways or not encrypted at all. Whether encrypted or not, the HD mnemonic and private keys may optionally be stored in portable memory 1068, e.g., a portable storage drive.

Figure 11:
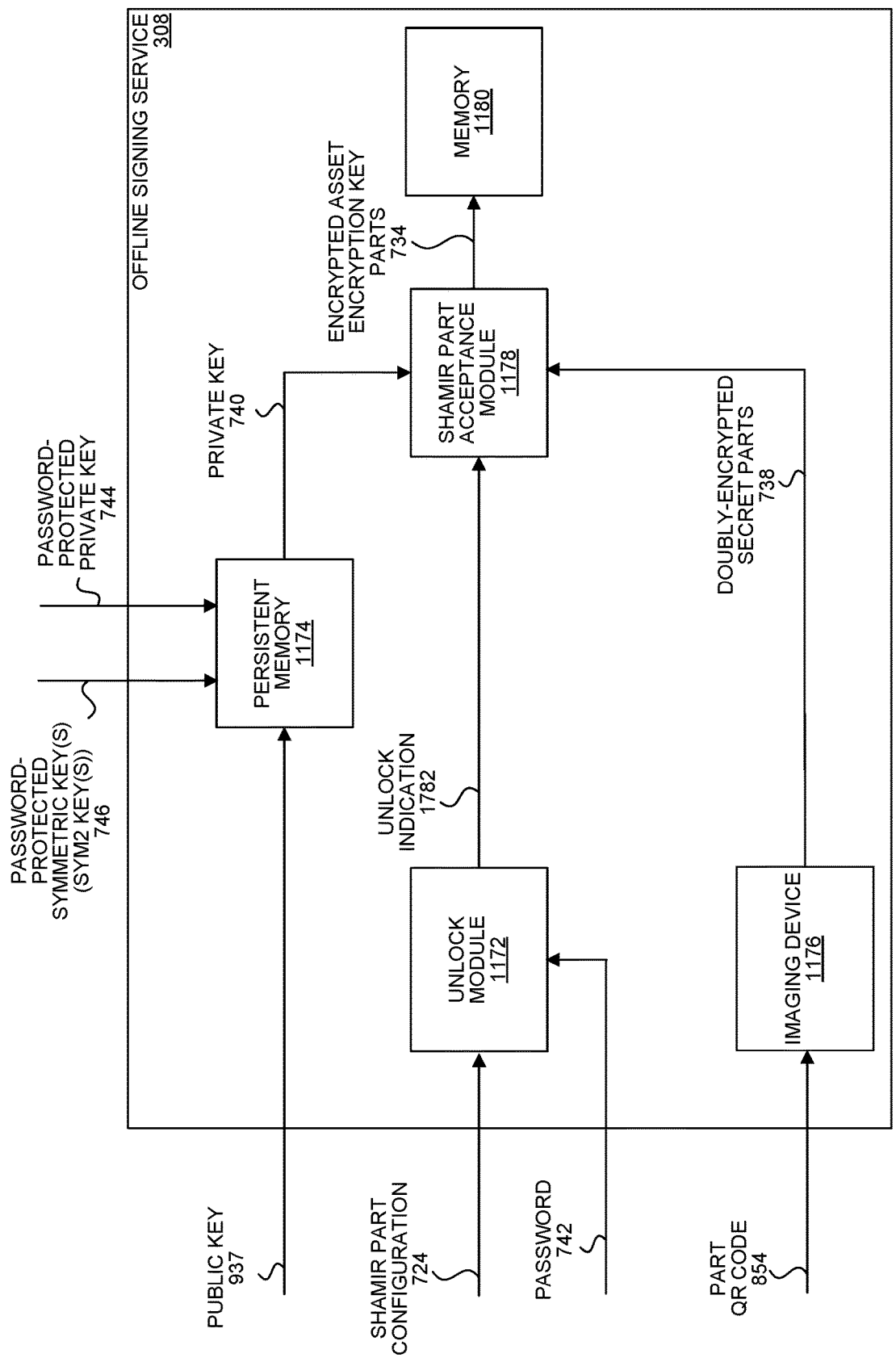
FIG. 11 is a block diagram illustrating an example system/methodology for initializing the offline signing service.

FIGS. 11-18 illustrate aspects of an offline signing service 308, e.g., in FIG. 3. Specifically, FIG. 11 is a block diagram illustrating an example system/methodology for initializing the offline signing service 308. The offline signing service 308 may be implemented by a computing device 102 that includes at least one processor configured to execute instructions, e.g., in a secure air-gapped laptop.

The offline signing service 308 may receive various information, e.g., from part holders, and/or other systems. In examples, the Shamir part configuration 724 (such as roles, e-mails, etc.); the password-protected private key 744 of the offline signing service keypair and password-protected symmetric key 746 (password-protected SYM2 key) for the offline signing service; and/or the public key 937 of the online signing service keypair are provided (e.g., by portable storage drive) to a secure air-gapped laptop. Where password-protected keys are received at the offline signing service 308, A password 742 is provided (to unlock module 1172) to unlock the laptop and/or the password-protected private key 744 of the offline signing service keypair and password-protected symmetric key 746 (password-protected SYM2 key) for the offline signing service keypair. Upon unlocking (e.g., verifying the password in the unlock module 1172), the password-protected private key 744 of the offline signing service keypair, password-protected symmetric key(s) 746 (password-protected SYM2 key(s)) for the offline signing service, and/or the public key 937 of the online signing service keypair are stored as persistent data (in persistent memory 1174) on the secure air-gapped laptop.

It should be noted that any of the keys described herein as being stored in the persistent memory 1174 could be stored in their respective password-protected or their non-password-protected forms. For example, the unprotected private key 740 and unprotected symmetric key 732 (SYM2 key) may be stored in the persistent memory 1174.

A Shamir part acceptance module 1178 may accept a doubly-encrypted secret part 738 (SYM2-encrypted SYM1 part) and the public key 937 (for the online signing service) from each of at least one part holder by scanning the part QR codes 854 (provided to the part holders), e.g., using at least one imaging device 1176, such as a camera or scanner. In examples, the Shamir part acceptance module 1178 may operate in response to an unlock indication 1782. The offline signing service 308 uses the private key 740 to remove the asymmetric (e.g., pubkey) encryption and stores the encrypted asset encryption key parts (SYM2-encrypted SYM1 parts) 734 into memory 1180 of the laptop until enough of the parts have been received to reconstruct the asset encryption key (SYM1 key) 728.

Figure 12A:
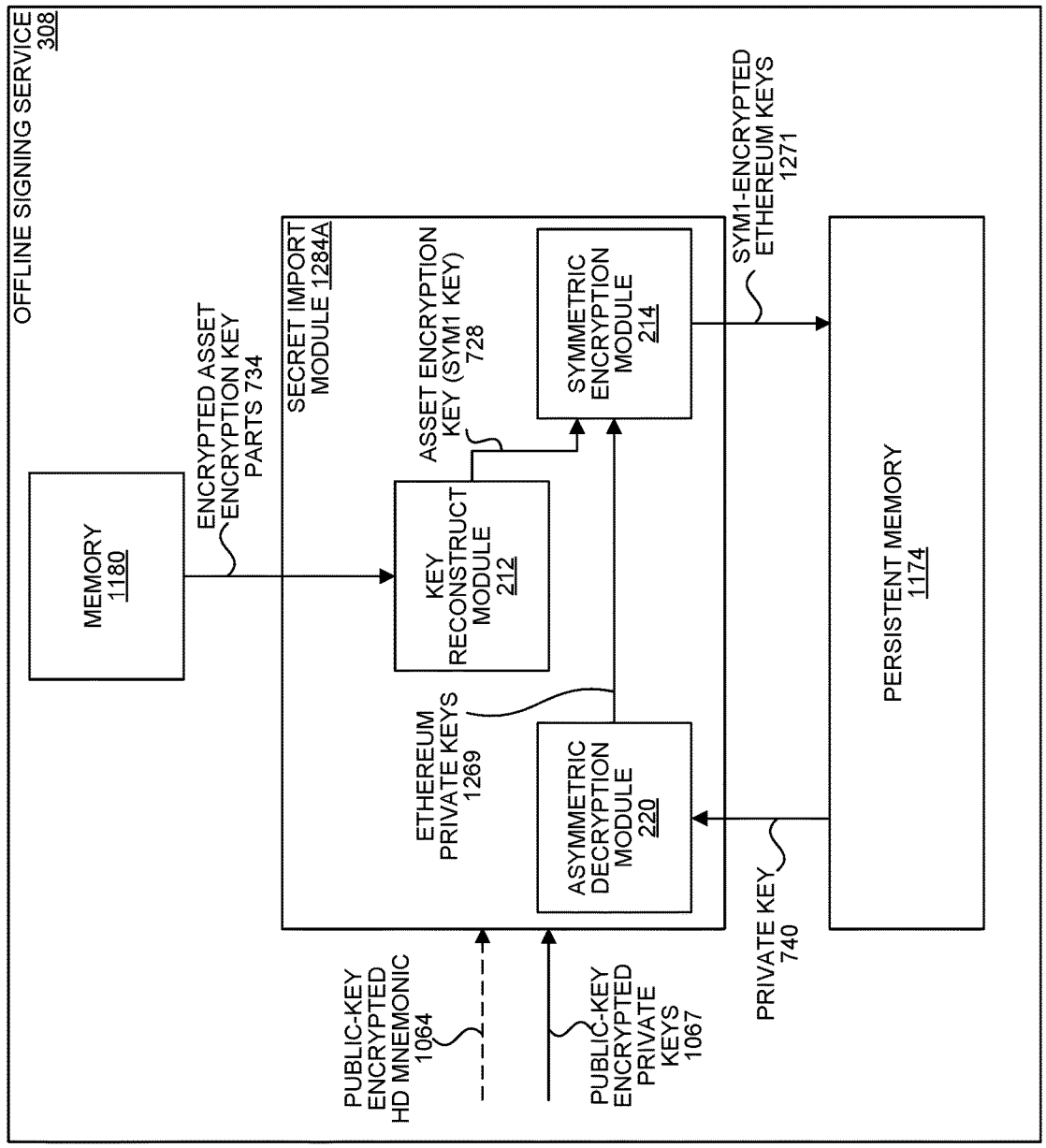
FIG. 12A is a block diagram illustrating an example system/methodology for importing the custodian token secrets into the offline signing service.

FIG. 12A is a block diagram illustrating an example system/methodology for importing the custodian token secrets into the offline signing service 308. To import the secrets, a secret import module 1284A may receive public-key-encrypted (Ethereum) private keys 1067 (encrypted with the offline signing services' public key) and optionally a public-key-encrypted HD mnemonic 1064. An asymmetric decryption module 220 may decrypt the public-key-encrypted (Ethereum) private keys 1067 into Ethereum private keys 1269 using the private key 740 (from persistent memory 1174).

A key reconstructing module 212 may then reconstruct the asset encryption key (SYM1 key) 728 from the encrypted asset encryption key parts (SYM2-encrypted SYM1 parts) 734 stored in memory 1180. In examples, the encrypted asset encryption key parts 734 may first be decrypted (to remove the SYM2 encryption) before reconstructing the asset encryption key (SYM1 key) 728. Alternatively, the memory 1180 may store the unprotected asset encryption key parts 730, in which case no SYM2 decryption is necessary before reconstructing the asset encryption key (SYM1 key) 728.

A token encryption module 214 may encrypt the tokens with the asset encryption key 728 and store the encrypted Ethereum private keys 1271 (e.g., SYM1-encrypted) in persistent memory 1174 on the laptop.

Figure 12B:
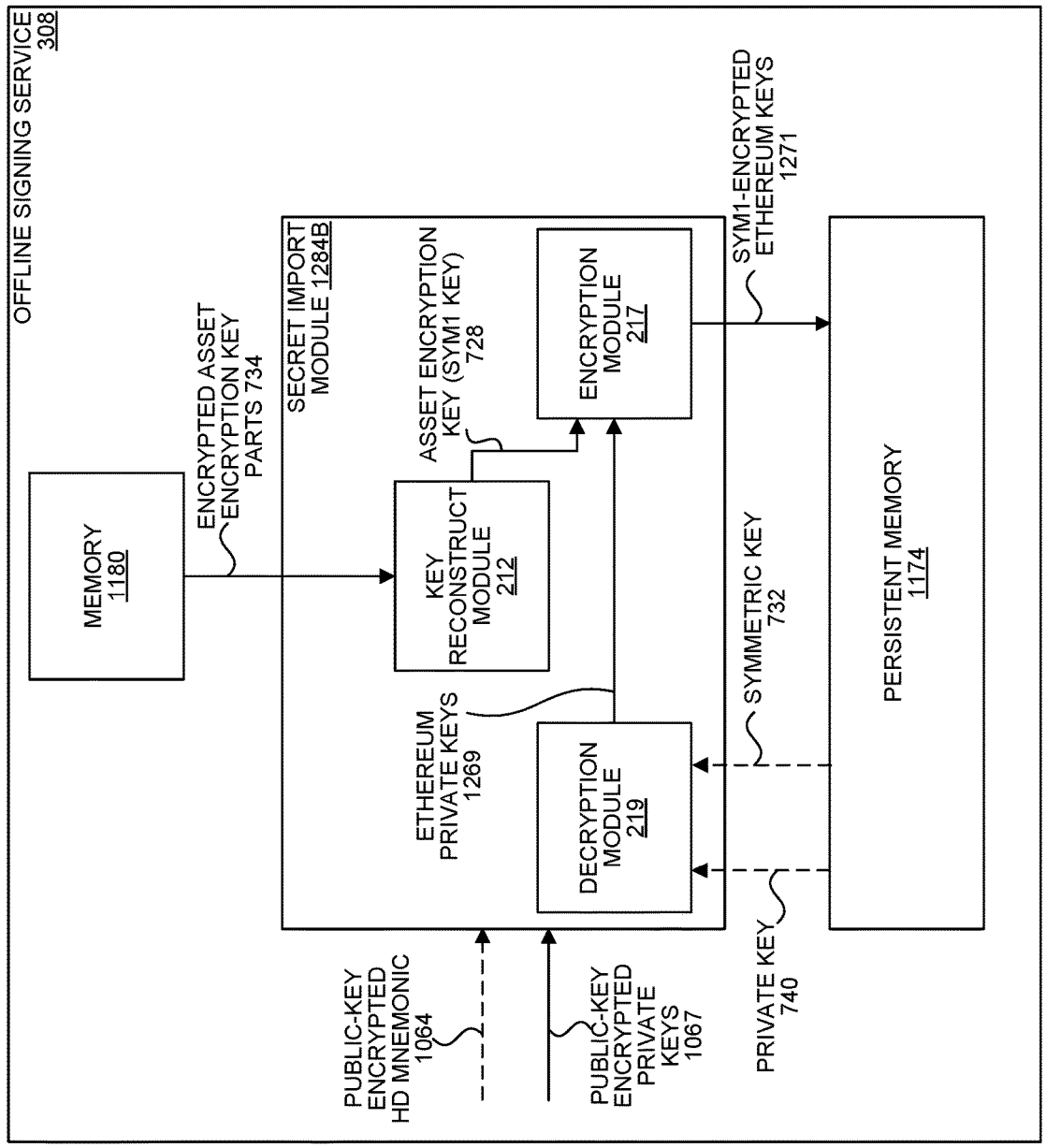
FIG. 12B is a block diagram illustrating another example system/methodology for importing the custodian token secrets into the offline signing service.

FIG. 12B is a block diagram illustrating another example system/methodology for importing the custodian token secrets into the offline signing service 308. FIG. 12B may include many of the same devices, modules, and data as in FIG. 12A. Unless otherwise noted, the devices, modules, and data in FIG. 12B operate in a similar manner to the devices, modules, and data in FIG. 12A. The secret import module 1284B in FIG. 12B may utilize a decryption module 219 utilizing symmetric or asymmetric decryption (instead of the asymmetric decryption module 220 in FIG. 12A). Similarly, secret import module 1284B in FIG. 12B may utilize an encryption module 217 utilizing symmetric or asymmetric decryption (instead of the symmetric encryption module 214 in FIG. 12A).

Figure 13:
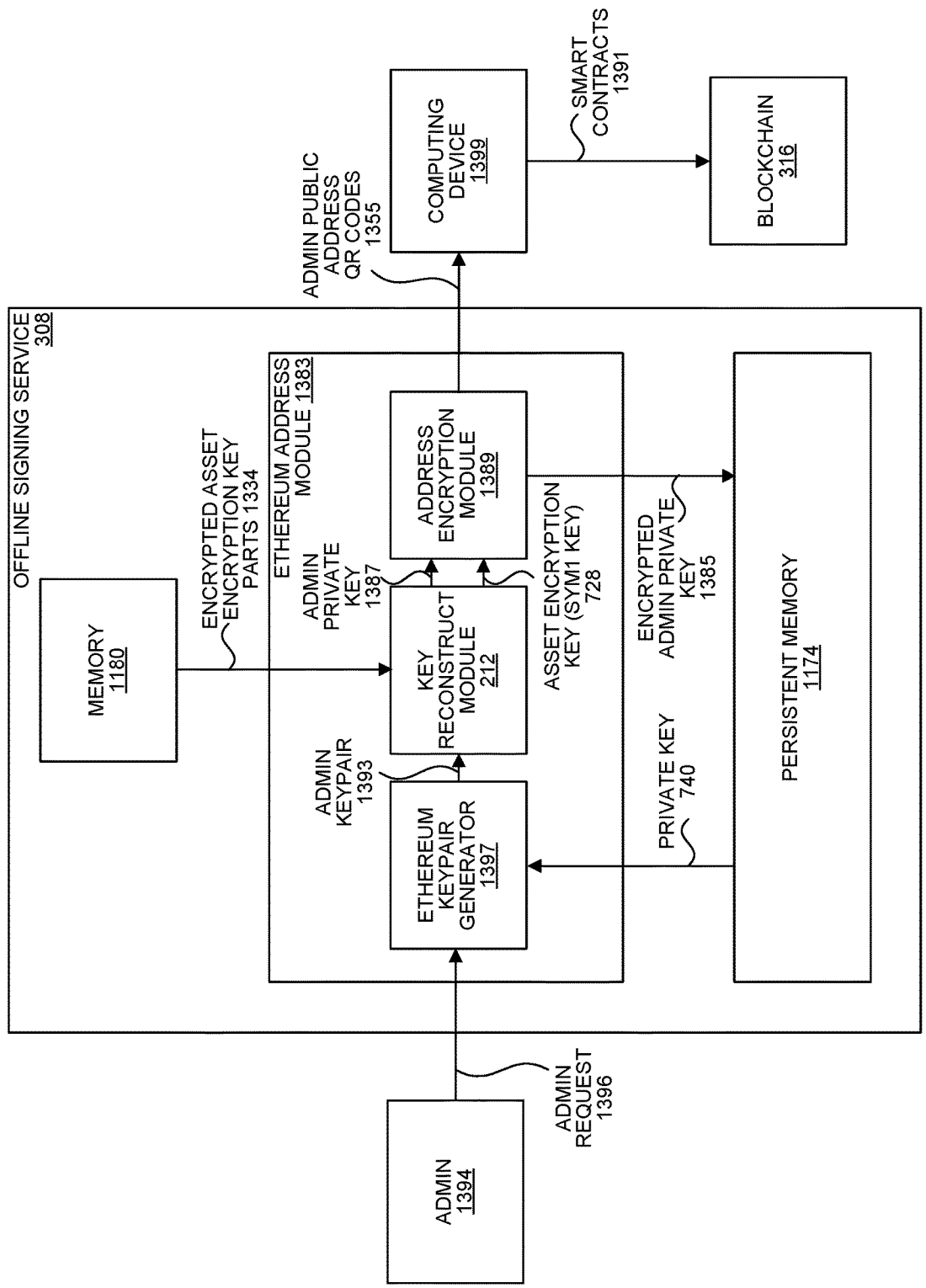
FIG. 13 is a block diagram illustrating an example system/methodology for creating a smart contract administrator account using the offline signing service.

FIG. 13 is a block diagram illustrating an example system/methodology for creating a smart contract administrator account using an Ethereum address module 1383 in the offline signing service 308. An Ethereum keypair generator 1397 may create an Ethereum address per a request 1396 from an administrator 1394 by creating an Ethereum admin keypair 1393 for the smart contract administrator account.

A key reconstructing module 212 may then reconstruct the asset encryption key (SYM1 key) 728 from the encrypted asset encryption key parts (SYM2-encrypted SYM1 parts) 734 stored in memory 1180. In examples, the encrypted asset encryption key parts 734 may first be decrypted (to remove the SYM2 encryption) before reconstructing the asset encryption key (SYM1 key) 728. Alternatively, the memory 1180 may store the unprotected asset encryption key parts 730, in which case no SYM2 decryption is necessary before reconstructing the asset encryption key (SYM1 key) 728.

An address encryption module 1389 may encrypt the smart contract administrator account Ethereum private key 1387 using the asset encryption key (SYM1 key) 728 and stores the encrypted smart contract administrator account (Ethereum) private key 1385 in persistent memory 1174 on the laptop. The administrator public address can be turned into a QR code 1355 to be used to transfer the smart contracts 1391 to the administrator address on the Ethereum blockchain 416, e.g., via a computing device 102 1399, such as a mobile phone.

Figure 14:
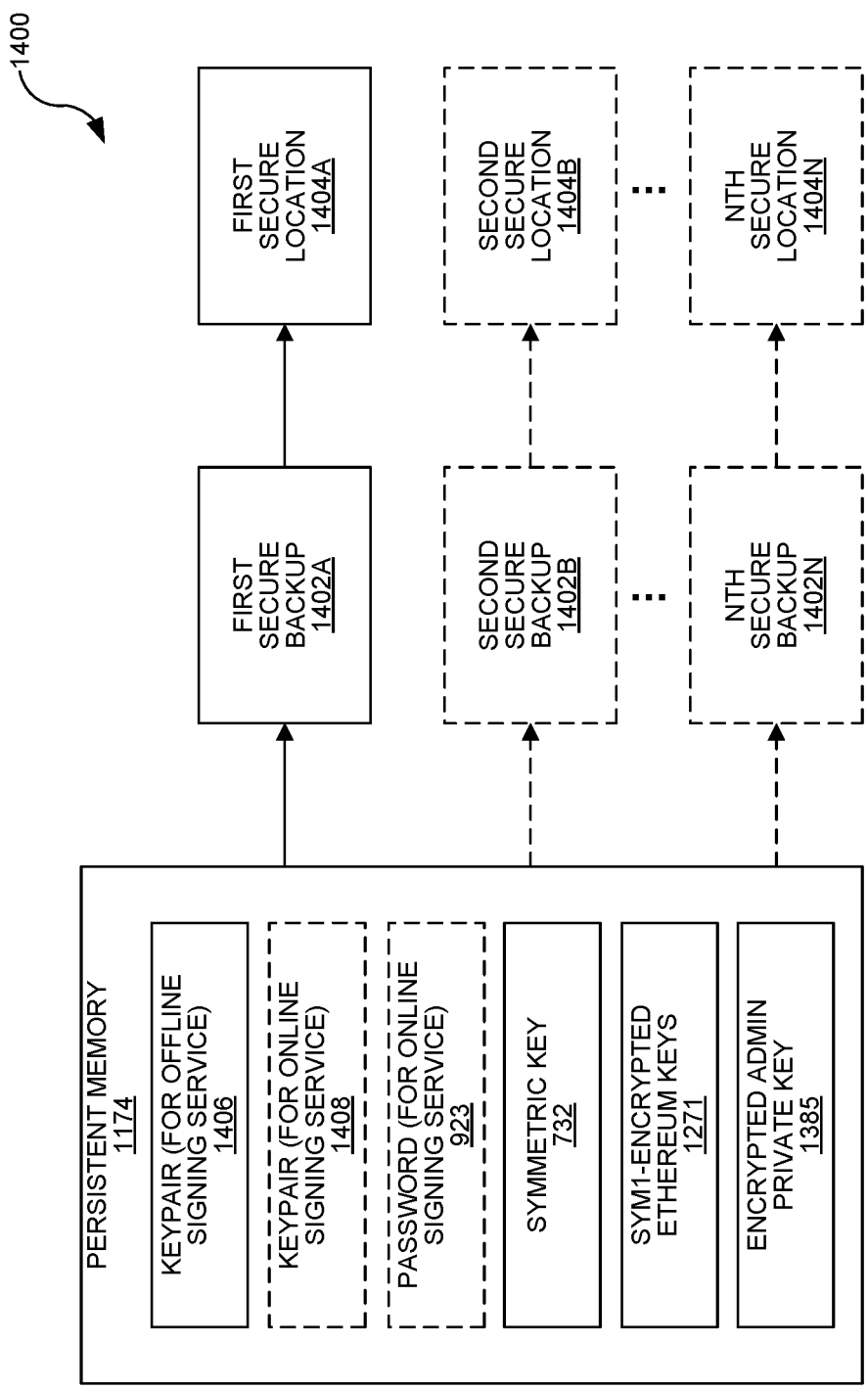
FIG. 14 is a block diagram illustrating an example system/methodology for shutting down the offline signing service and creating backups once the initial tasks are complete.

FIG. 14 is a block diagram illustrating an example system/methodology 1400 for shutting down the offline signing service 308 and creating backups once the initial tasks (e.g., those described in FIGS. 11-13) are complete. In examples, the offline signing service 308 is shut down and the persistent data (in the persistent memory 1174 on the laptop) is backed up in at least one separate secure backups 1402A-N. The persistent memory 1174 may include the keypair 1406 of the offline signing service (private key 740 and public key 736); the symmetric key (SYM2 key) 732; the SYM1-encrypted (Ethereum) private keys 1261 (or the unprotected Ethereum private keys 1269); and/or the encrypted Ethereum admin private key 1385 (or the unprotected Ethereum admin private key 1387). Optionally, the private key 941, public key 937, and/or password 923 of the online signing service are also included in the persistent memory 1174. However, there may alternatively be less, more, and/or different data in the persistent memory 1174.

Each secure backup 1402 may be stored in a portable memory (e.g., a portable storage drive) or as printed QR code, which is saved in a separate secure location 1404A-N. Examples of secure locations 1404 include, without limitation, a safe, a safety deposit box, or a lock box.

Figure 15:
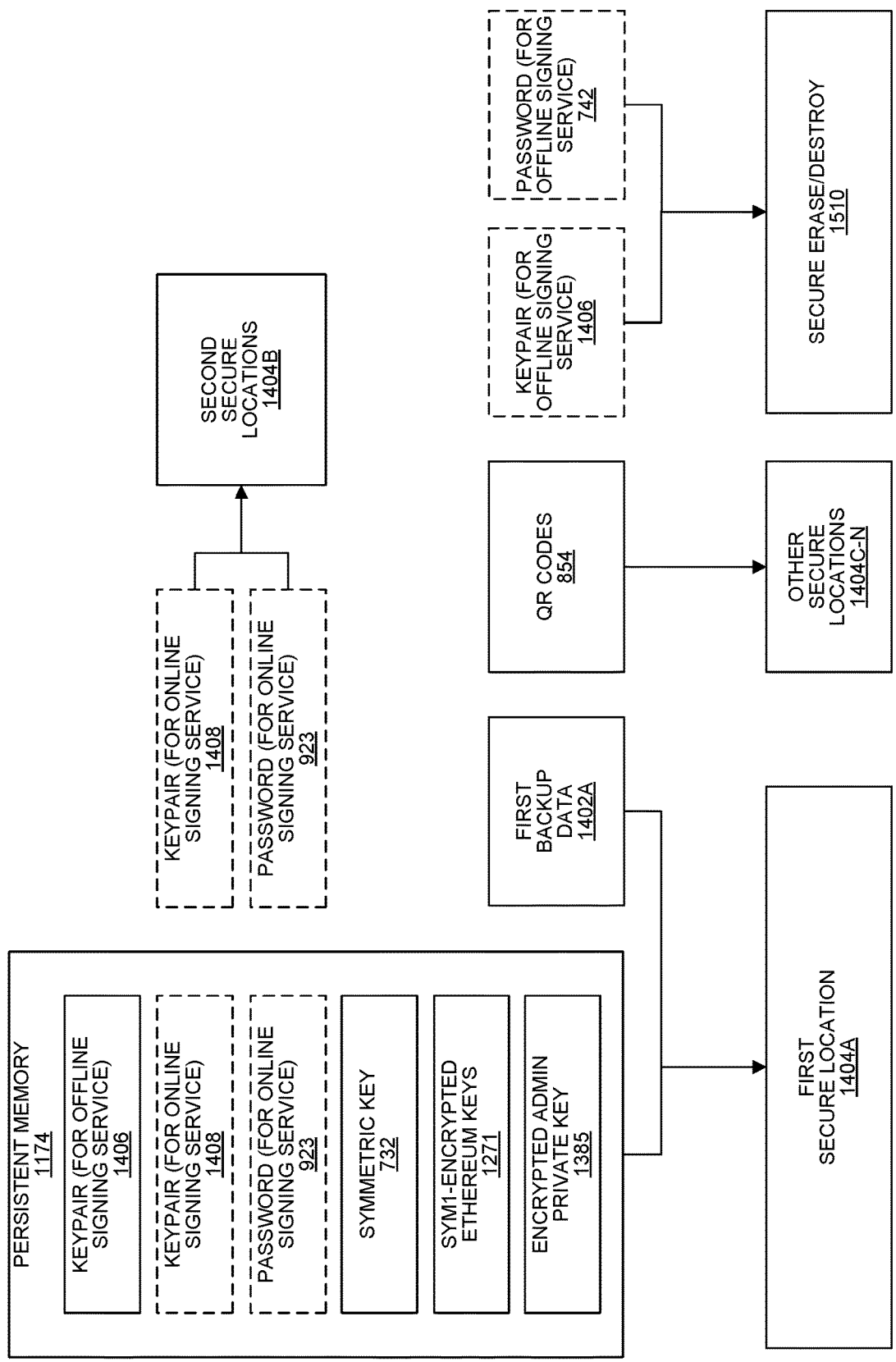
FIG. 15 is a block diagram illustrating potential things that need to be protected.

FIG. 15 is a block diagram illustrating potential data that needs to be protected after or during shutdown of the offline signing service 308. In examples, the laptop (implementing the offline signing service 308) and/or at least one secure backup 1402 of the data may be protected. The laptop and secure backup(s) 1402 may each contain: the keypair 1406 of the offline signing service 308 (private key 740 and public key 736); the SYM1-encrypted (Ethereum) private keys 1261 for a Custodian, BD, BD-Account, and all the investor accounts; and/or the encrypted Ethereum admin private key 1385 (or the unprotected Ethereum admin private key 1387) for the admin 1394. In examples, the persistent memory 1174 stored on the laptop and at least one secure backup 1402 may be preserved in a secure location 1404A during/following shutdown of the offline signing service 308.

In examples, the online signing service keypair 1408 (private key 941 and public key 937) and/or its password 923 also need to be protected in a secure location 1404B if not preserved as part of the persistent memory 1174. In examples, any copies of the keypair 1406 (private key 740 and public key 736) and password 742 of the offline signing service 308 that reside on the laptop may optionally be securely erased/destroyed 1510 during/following shutdown of the offline signing service 308.

The part holders need to securely store their part QR codes 854 (of their doubly-encrypted part 738 or encrypted asset encryption key part 734) in other respective secure locations 1404C-N. The encrypted parts (doubly-encrypted parts 738 or singly parts 734) may be the only store of the asset encryption key (SYM1 key) 728. Accordingly, when deciding the Shamir configuration (values for M and N), consideration will be made for keeping the security high while minimizing the risk that the asset encryption key (SYM1 key) 728 could not be regenerated because too many of the parts being lost.

Figure 16:
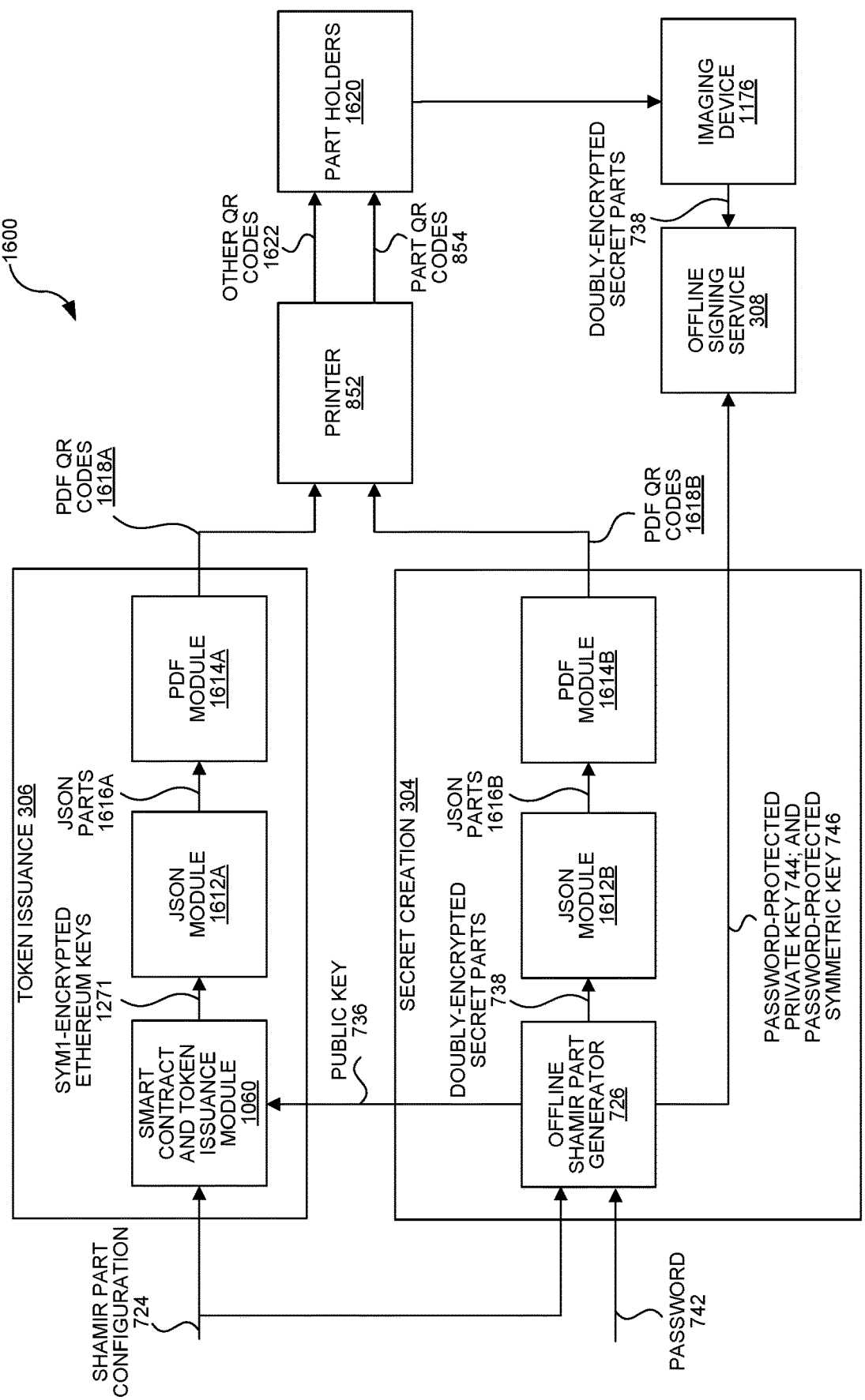
FIG. 16 is a block diagram illustrating more details about the data files.

FIG. 16 is a block diagram illustrating an example system/methodology 1600 for securely splitting an asset encryption key (SYM1 key) 728. Specifically, the example system/methodology 1600 illustrates the various data files for the secret creation 304, token issuance 306, and offline signing service 308.

The secret creation 304 may include an offline Shamir part generator 726 receiving a password (for the offline signing service 308) and a Shamir part configuration 724, which it uses to generate doubly-encrypted secret parts 738. The doubly-encrypted secret parts 738 are converted into JavaScript Object Notation (JSON) parts 1616B (using a JSON module 161B), after which a PDF module 1614B generates PDF QR codes 1618B that are printed (using a printer 852) as part QR codes 854 and distributed to part holders 1620. Additionally, the offline Shamir part generator 726 may generate a password-protected private key 744 and a password-protected symmetric key 746 that are sent to the offline signing service 308.

The part holder 1620 may represent a computing device 102 (e.g., a smartphone) and/or a user operating a computing device 102.

The token issuance 306 may include a smart contract and token issuance module 1060 generating SYM1-encrypted (Ethereum) private keys 1261 based on the Shamir part configuration 724 and the public key 736 (from the offline Shamir part generator 726). The SYM1-encrypted (Ethereum) private keys 1261 are converted into JSON parts 1616A (using a JSON module 1612A), after which a PDF module 1614A generates PDF QR codes 1618A that are printed (using a printer 852) as other QR codes 1622 and distributed to part holders.

The part QR codes 854 and/or the other QR codes 222 may be scanned by an imaging device 1176 (e.g., as part of the offline signing service 308). If the part QR codes 854 are scanned, doubly-encrypted secret parts 738 are produced. If the other QR codes 1622 are scanned, the SYM1-encrypted (Ethereum) private keys 1261 may be produced. The offline signing service 308 may use the doubly-encrypted secret parts 738 and/or the SYM1-encrypted (Ethereum) private keys 1261 as described above. Furthermore, various other keys described above (e.g., encrypted and/or password-protected) may be printed as QR codes and scanned for use in the offline signing service 308. Additionally, various other keys described above (e.g., encrypted and/or password-protected) may be loaded into a laptop for via a portable storage drive for use in the offline signing service 308.

In examples, each of the secret creation 304, token issuance 306, and offline signing service 308 may be implemented in a separate computing device 102 with at least one processor executing instructions (e.g., stored in at least one memory) to perform the functionality described herein. Optionally, the token issuance 306 and secret creation 304 may implemented on the same computing device 102 with the offline signing service 308 being implemented on an isolated computing device 102 separate from the computing device(s) implementing the token issuance 306 and secret creation 304. For example, the computing device 102 implementing the offline signing service 308 may be an air-gapped laptop or other computing device 102.

FIG. 17 is a block diagram illustrating more details about where/how example systems/methodologies run. The aspects illustrated in FIG. 17 are merely examples and should not be viewed as limiting. In examples, the token issuance 306 may use: access to the blockchain 416, e.g., the Ethereum blockchain; network access (on the computing device 102 implementing the token issuance 306); access to a printer 852; and/or the public key 736 from the secret creation 304.

In examples, the secret creation 304 may use: access to a printer 852; input portable storage drive with Shamir part configuration 724, a JAVA Archive (JAR) file, and JAVA Runtime Environment (JRE); and optionally network access. If no network access is available in the computing device 102 implementing the secret creation 304, a copy of the PDF QR codes 1618B may be stored on a portable storage drive to print elsewhere.

In examples, the offline signing service 308 may use: access to an imaging device 1176 (e.g., scanner or webcam); input from a portable storage drive with a JAR file and JAVA JRE; and no network access (on the computing device 102 implementing the offline signing service 308).

Figure 18A:
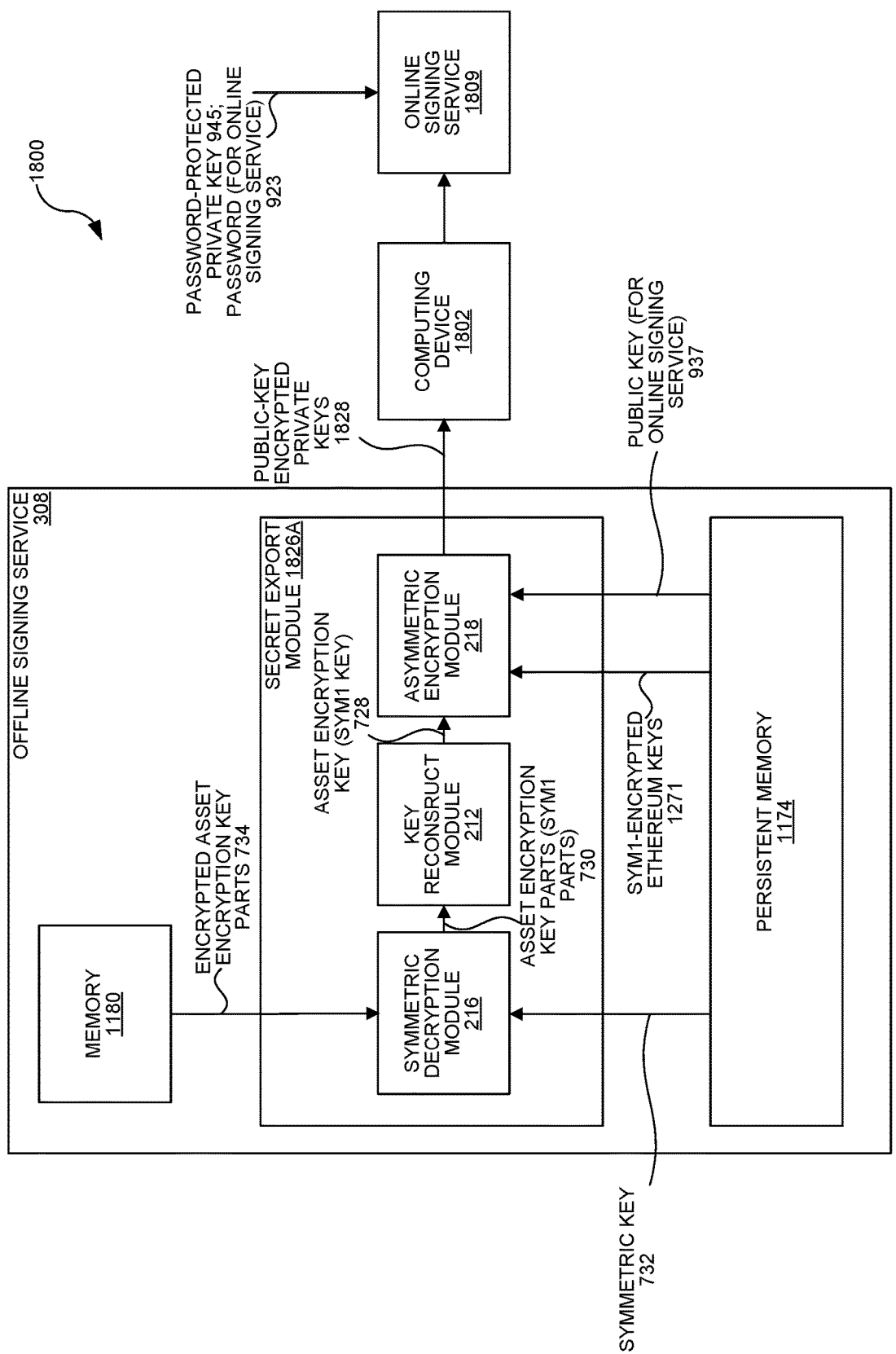
FIG. 18A is a block diagram illustrating an example system/methodology for exporting secrets from the offline signing service.

FIG. 18A is a block diagram illustrating an example system/methodology 1800A for exporting secrets from the offline signing service 308, e.g., using a secret export module 1826A. In examples, after secrets are secured and when the trading system is ready, the Investor and BD/Account keys are transferred from the offline signing service 308 to the online signing service 1809. The offline signing service 308 may receive the encrypted asset encryption key parts (SYM2-encrypted SYM1 parts) 734 from the memory 1180. Optionally, the encrypted asset encryption key parts (SYM2-encrypted SYM1 parts) 734 may be received via part QR codes 854 provided by part holders 1620.

To transfer secrets to the online signing service 1809, the encrypted asset encryption key parts (SYM2-encrypted SYM1 parts) 734 are decrypted (in a symmetric decryption module 216 using the symmetric key 732) to produce asset encryption key parts (SYM1 parts) 730, which are then reconstructed (in a key reconstructing module 212) to produce the SYM1 asset encryption key 728.

The desired SYM1-encrypted Ethereum key(s) 1261 from the persistent memory 1174 on the laptop may be decrypted using the SYM1 asset encryption key 728. The decrypted Ethereum key(s) are then encrypted, in the asymmetric encryption module 218, with the public key (for the online signing service) 937 into public-key-encrypted private keys 1828. The public-key-encrypted private keys 1828 are transmitted to the online signing service 1809, e.g., via a computing device 102 1802. A user may also provide the password-protected private key 945 (for the online signing service) and the password 923 (for the online signing service).

Figure 18B:
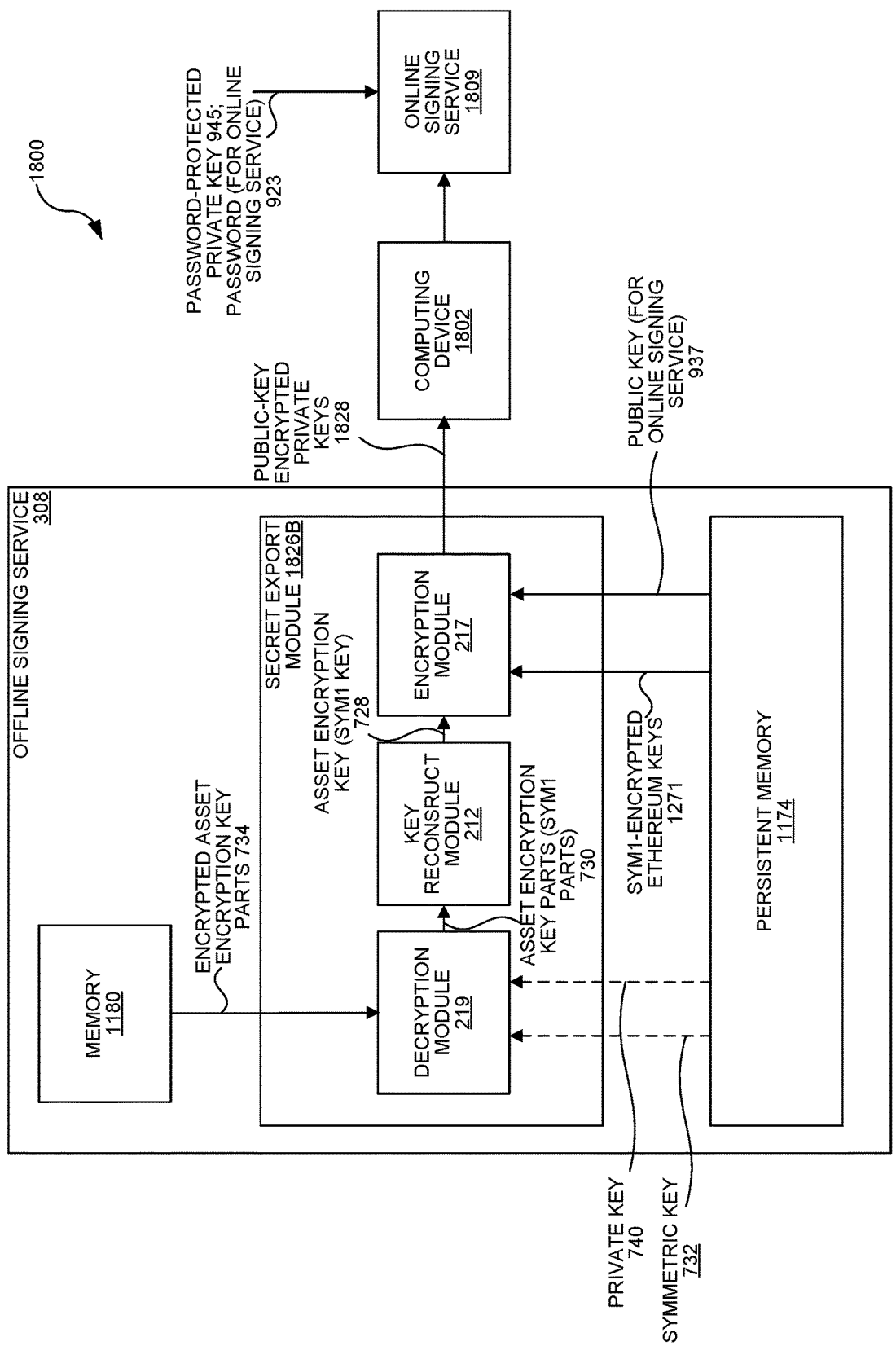
FIG. 18B is a block diagram illustrating another example system/methodology for exporting secrets from the offline signing service.

FIG. 18B is a block diagram illustrating an example system/methodology 1800B for exporting secrets from the offline signing service 308, e.g., using a secret export module 1826B. FIG. 18B may include many of the same devices, modules, and data as in FIG. 18A. Unless otherwise noted, the devices, modules, and data in FIG. 18B operate in a similar manner to the devices, modules, and data in FIG. 18A. The secret export module 1826B in FIG. 18B may utilize a decryption module 219 utilizing symmetric or asymmetric decryption (instead of the symmetric decryption module 216 in FIG. 18A). Similarly, secret export module 1826B in FIG. 18B may utilize an encryption module 217 utilizing symmetric or asymmetric decryption (instead of the asymmetric encryption module 218 in FIG. 18A).

Figure 19:
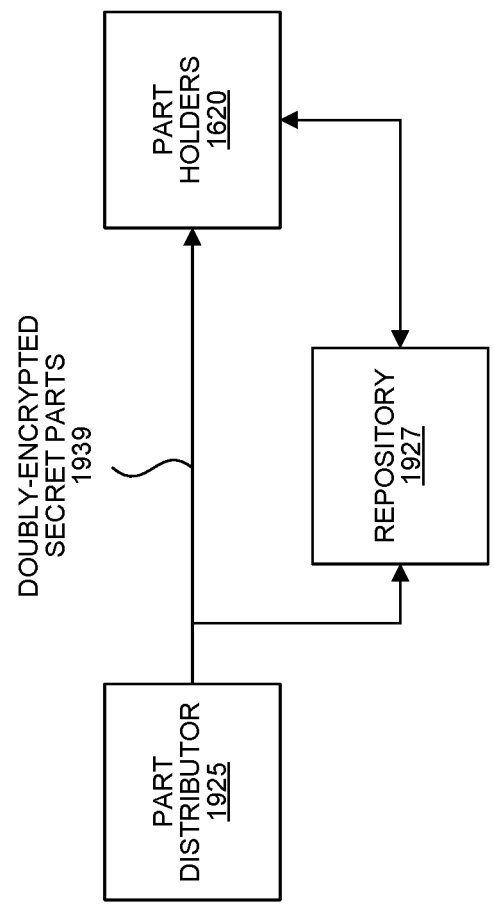
FIG. 19 is a block diagram illustrating an example system/methodology for distribution of parts using a part distributor.

FIG. 19 is a block diagram illustrating an example system/methodology 1900 for distribution of parts using a part distributor 1925. In some configurations, the part distributor 1925 may be or may implement a Shamir part generator 726. It may be unreasonable to expect to gather a executives together in a room to scan a QR code anytime a cluster goes down. Accordingly, it is desirable to have a better way to distribute Shamir parts, update parts, create unique keypairs for every holder, and help them manage their keys.

A part distributor 1925 can be used to distributed Shamir parts to multiple (e.g., N) part holders 1620. Additionally or alternatively, a repository 1927 can be used to transmit the parts to part holders 1620, and/or receive the parts back from the part holders 1620. If a repository 1927 is used, the part holders 1620 can communicate with the repository 1927 (e.g., including authentication) to retrieve their respective part. The repository 1927 may allow for asynchronous transfer of data (e.g., keys, encrypted parts, etc.) from the part distributor 1925 to the part holders 1620 so that the part holders 1620 can retrieve their encrypted parts when needed. Optionally, the repository 1927 may implement authentication procedures for use with the part distributor 1925 and/or the part holders 1620.

In FIG. 19, the part distributor 1925 distributes doubly-encrypted secret parts 1939 to the part holders 1620 and/or the repository 1927. The doubly-encrypted secret parts 1939 are similar (but not identical) to the doubly-encrypted secret parts 738 described above. Specifically, the doubly-encrypted secret parts 1939 may be encrypted (1) with a symmetric key 732 (or a distributor decrypting private key); and (2) with the part holder encrypting public key. In contrast, the doubly-encrypted secret parts 738 may be encrypted (1) with a symmetric key 732 (or a distributor decrypting private key); and (2) with the distributor encrypting public key.

It should be noted that the doubly-encrypted secret parts 1939 may be encrypted using any two stages of encryption, each stage being symmetric or asymmetric. For example, even though doubly-encrypted secret parts 1939 are often described herein as being generated using a first asymmetric encryption followed by a second symmetric encryption, they may be generated using (1) two stages of asymmetric encryption; (2) two stages of symmetric encryption; (3) a first stage of asymmetric encryption and a second stage of symmetric encryption; or (4) a first stage of symmetric encryption and a second stage of asymmetric encryption. Additionally, the singly-encrypted secret parts 734 may be encrypted using symmetric or asymmetric encryption.

Figure 20:
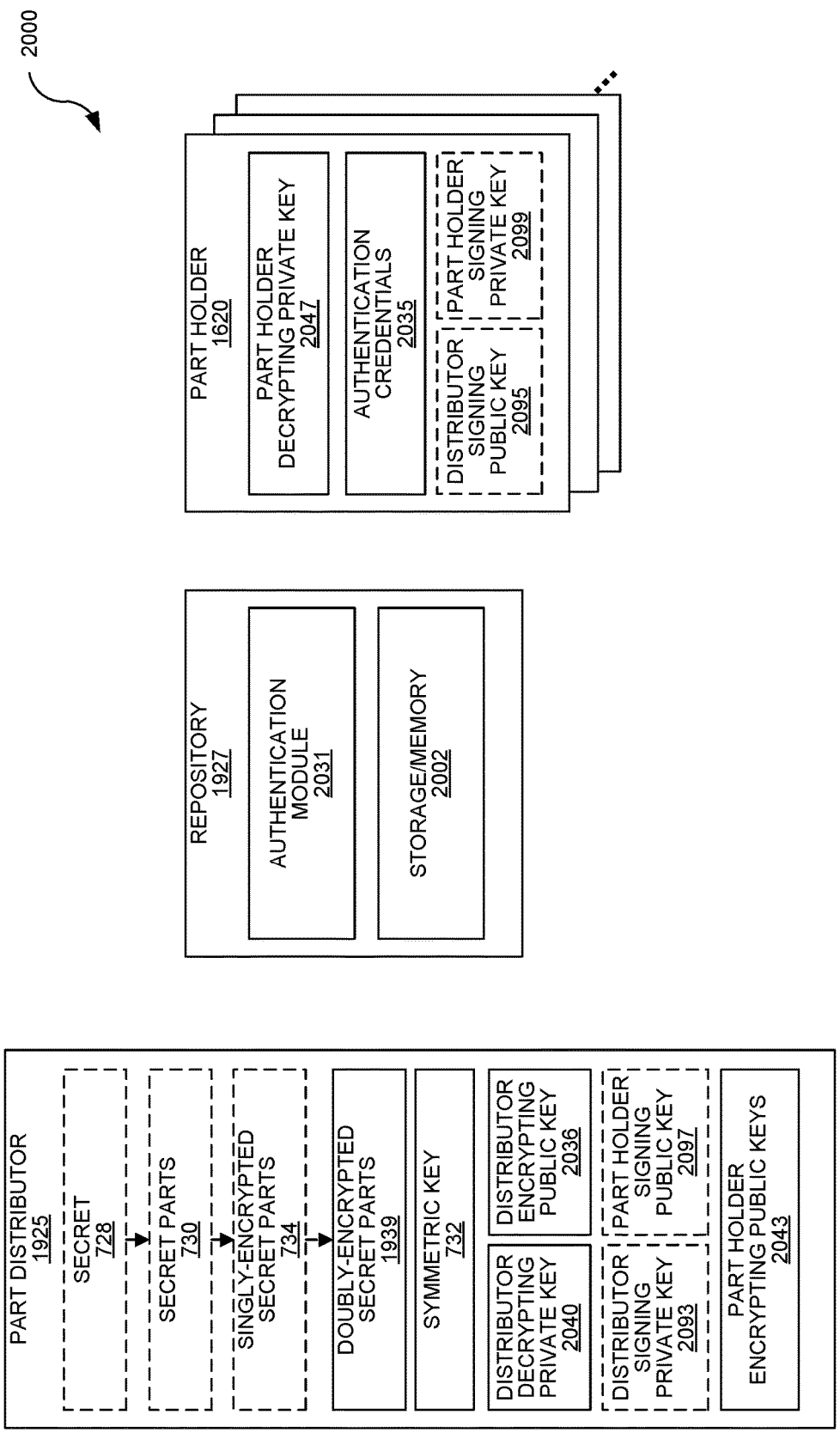
FIG. 20 is a block diagram illustrating an example system/methodology for an online implementation using a part distributor and a part repository for distribution of secret parts.

FIG. 20 is a block diagram illustrating an example system/methodology 2000 for an online implementation using a part distributor 1925 and a repository 1927 for distribution of secret parts 730. The part distributor 1925 creates the secret parts 730 from the asset encryption key (secret) 728. In examples, the secret parts 730 may also be referred to as the asset encryption key parts 730 and/or SYM1 parts 730. In examples, the terms secret 728, asset encryption key 728, and SYM1 key 728 may be used interchangeably.

The part distributor 1925 may store doubly-encrypted secret parts 1939. As described above, the doubly-encrypted secret parts 1939 may be encrypted (in the second stage) with the part holder encrypting public key 2043, while the doubly-encrypted secret parts 738 may be encrypted with the distributor encrypting public key 2036 of the distributor 1925.

In one configuration, the part distributor 1925 may generate the doubly-encrypted secret parts 1939 as follows. Each secret part 730 may be encrypted with a symmetric key 732 to produce singly-encrypted secret parts 734. In examples, the symmetric key 732 may also be referred to as the SYM2 key 732. A single symmetric key 732 may be used to encrypt all the secret parts 730 or a different symmetric key 732 may be used to encrypt each secret part 730. The singly-encrypted secret parts 734 may also be referred to as the encrypted asset encryption key parts (SYM2-encrypted SYM1 parts) 734. Each singly-encrypted secret part 734 may then be encrypted into a doubly-encrypted secret part 1939 using an encrypting public key 2043 for the particular part holder 1620 (where the part holder 1620 holds the decrypting private key 2047 corresponding to the encrypting public key 2043). In examples, the part holder decrypting private key 2047 and the part holder encrypting public key 2043 apply encryption using Elliptic Curve Cryptography (ECC), e.g., Curve25519.

In another configuration, the part distributor 1925 may (1) receive doubly-encrypted secret parts 738 (distributor encrypting public key 2036) from part holders 1620 via QR code 854; (2) re-wrap/re-encode the doubly-encrypted secret parts 738 into doubly-encrypted secret parts 1939, as described below; and (3) store the doubly-encrypted secret parts 1939.

In examples, the part holder keypair (with part holder encrypting public key 2043 and part holder decrypting private key 2047) may be generated on the part holder's computing device 1620 (e.g., a mobile phone). In examples, the part holder encrypting public key 2043 may be communicated from the part holder 1620 to at least the part distributor 1925, while the part holder decrypting private key 2047 is retained (and known) only at the respective part holder 1620.

The part distributor 1925 may also store a distributor encrypting keypair with a distributor encrypting public key 2036 and a distributor decrypting private key 2040. Without limitation, the distributor encrypting keypair (the distributor decrypting private key 2040 and distributor encrypting public key 2036) may be the same as the offline signing service 308 keypair (the public key 736 and the private key 740) and/or the online signing service 1809 keypair (the public key 937 and the private key 941). Alternatively, the distributor keypair may be different than both the offline signing service 308 keypair online signing service 1809 keypair. In examples, the distributor decrypting private key 2040 is known only to the part distributor 1925 (and optionally an assembler/reconstructor of the parts, discussed below), while the distributor encrypting public key 2036 may additionally be shared more freely, e.g., with part holders 1620. In examples, the distributor encrypting public key 2036 and the distributor decrypting private key 2040 apply encryption using Elliptic Curve Cryptography (ECC), e.g., Curve25519.

In this way, every part payload (e.g., doubly-encrypted secret part 1939) is encrypted with multiple layers of encryption so it can be stored anywhere with little security concern. For example, the part holders 1620 can use an online account with the file repository 1927 functionality (such as Google/Firebase) for retrieval of the encrypted part by the part holder 1620 when necessary. The repository 1927 may store the parts (e.g., doubly-encrypted secret part 1939) in a storage/memory 2002.

In examples, the repository 1927 may include an authentication module 2031 that authenticates a user based on authentication credentials 2035 provided by the part holder 1620. Examples of authentication credentials 2035 include password(s), time-sensitive code(s), and/or biometric data, such as fingerprint data (e.g., scan(s) of the customer's fingerprint(s)), retinal scan data (e.g., image(s) of the customer's retina(s)), facial recognition data (e.g., image(s) of the customer's face), and/or voice data (e.g., recording(s) of the customer's voice). Instead of raw biometric data (e.g., images and/or recordings), the authentication may use processed data derived from the raw biometric data, e.g., image features, voice features, etc. Additionally, two-factor authentication (2FA) may be used by the repository 1927.

Optionally, the part distributor 1925 may sign singly-encrypted secret parts 734 and/or doubly-encrypted secret parts 1939 using a distributor signing private key 2093 before transmitting to the repository 1927. If signing is used, the part holder 1620 may also verify that the singly-encrypted secret parts 734 and/or doubly-encrypted secret parts 1939 were stored on the repository 1927 by a trusted source (the part distributor 1925) using a distributor signing public key 2095, e.g., before decrypting the singly-encrypted secret parts 734 and/or doubly-encrypted secret parts 1939. In examples, the distributor signing private key 2093 and distributor signing public key 2095 operate according to the Edwards-curve Digital Signature Algorithm (EdDSA), e.g., Ed25519.

A similar optional signing and verification may take place if, as described below, encrypted (singly or doubly) secret parts are re-encrypted at the part holders 1620 and sent (e.g., via the repository 1927) back to the part distributor 1925 and/or an assembler of the secret parts. Specifically, the part holder 1620 can optionally sign the re-encrypted secret part(s) using a respective part holder signing private key 2099. If signing is used, the part distributor 1925 and/or assembler may also verify that the re-encrypted secret part(s) were stored on the repository 1927 by a trusted source (the part holder 1620) using a part holder signing public key 2097, e.g., before decrypting the re-encrypted secret part(s). In examples, the part holder signing private key 2099 and the part holder signing public key 2097 operate according to the Edwards-curve Digital Signature Algorithm (EdDSA), e.g., Ed25519.

In some configurations, the distributor encrypting public key 2036 is the same as the distributor signing public key 2095 or the distributor signing private key 2093. In some configurations, the distributor decrypting private key 2040 is the same as the distributor signing public key 2095 or the distributor signing private key 2093.

In some configurations, the part holder encrypting public key 2043 is the same as the part holder signing public key 2097 or the part holder signing private key 2099. In some configurations, the part holder decrypting private key 2047 is the same as the part holder signing public key 2097 or the part holder signing private key 2099.

Figure 21:
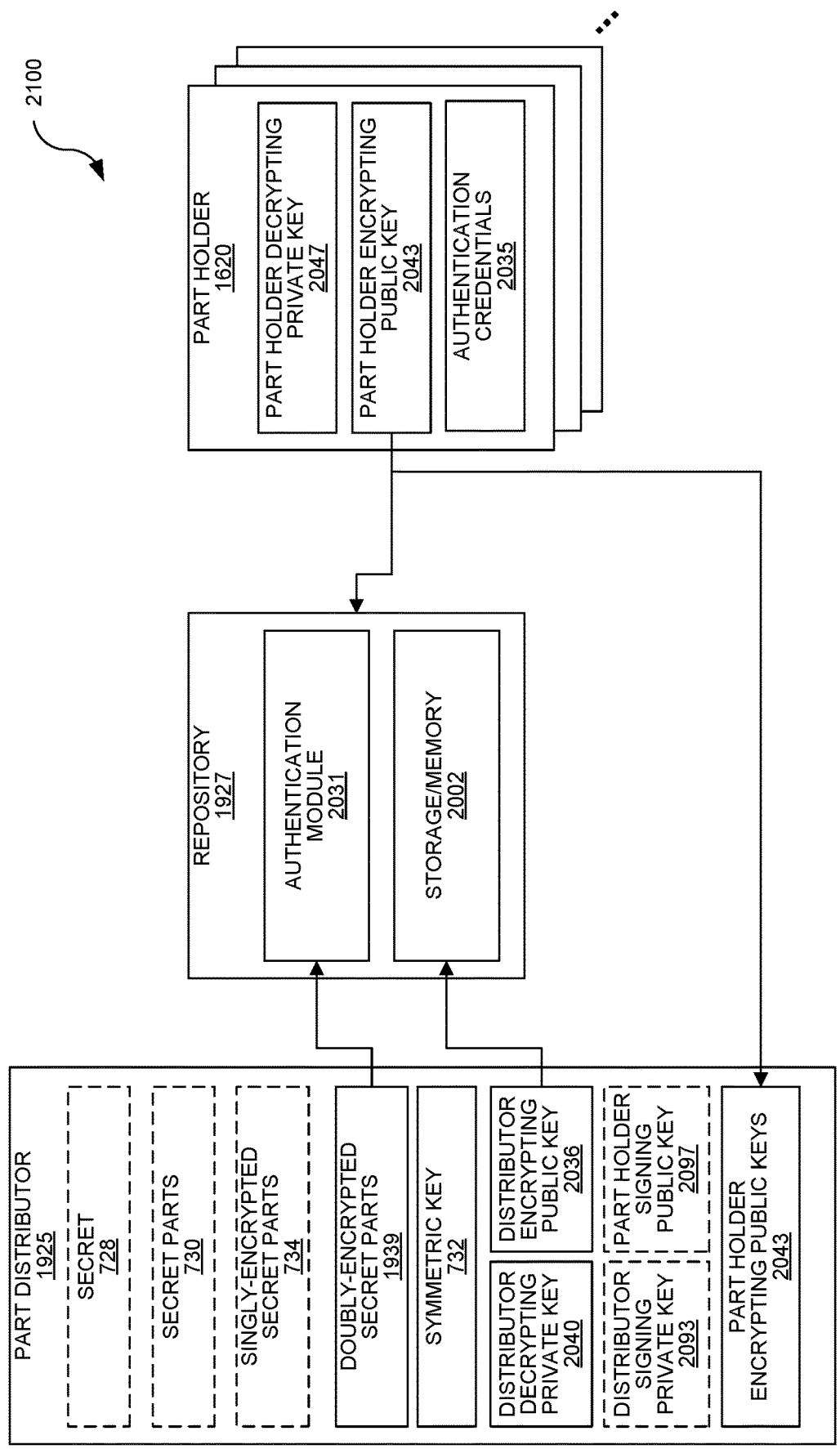
FIG. 21 is a block diagram illustrating an example system/methodology for an online implementation of key exchange using a part distributor and a part repository for distribution of parts.

FIG. 21 is a block diagram illustrating an example system/methodology 2100 for an online implementation of key exchange using a part distributor 1925 and a repository 1927 for distribution of parts (e.g., doubly-encrypted secret parts 1939). The part distributor 1925 can decide the number and identity of the part holders 1620 to which the parts will be distributed.

The part distributor 1925 may transmit its distributor encrypting public key 2036 and a secret part (e.g., doubly-encrypted secret parts 1939) into the repository 1927 (such as Google Firestore/Firebase) for safe keeping. The transmission(s) from the part distributor 1925 to the repository 1927 may include: sending data over a network, such as the internet (e.g., e-mail); printed at the part distributor 1925 as QR codes (or electronically displayed QR codes by the part distributor 1925) that are scanned at the repository 1927, loaded on a portable storage drive and physically inserted into the repository 1927, an SMS message, an MMS message, etc.

The part holders 1620 may install and run an application (app) on their computing device 102 (e.g., mobile device) and sign into their repository account (e.g., Google account). The mobile app may create a key and stores the part holder's public key 2043 that is communicated to the repository 1927 (such as Firestore/Firebase) and the part distributor 1925 (e.g., via e-mail). The part distributor 1925 may generate the doubly-encrypted secret parts 1939 from a secret 728 or by receiving doubly-encrypted secret parts 738 and re-wrapping them into doubly-encrypted secret parts 1939 using the part holder's public key 2043, as described below.

Figure 22:
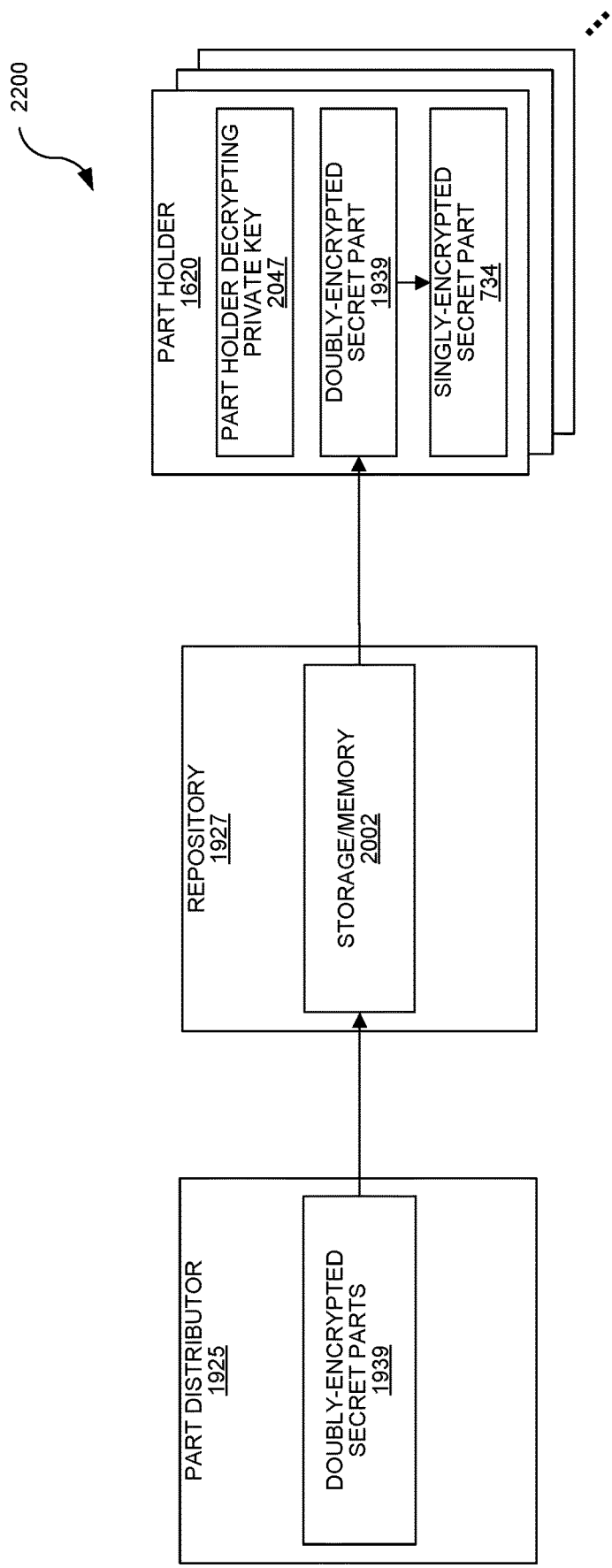
FIG. 22 is a block diagram illustrating an example system/methodology regarding part security for an online implementation of key exchange using a part distributor and a part repository for distribution of parts.

FIG. 22 is a block diagram illustrating an example system/methodology 2200 regarding part security for an online implementation of key exchange using a part distributor 1925 and a repository 1927 for distribution of parts (e.g., doubly-encrypted secret parts 1939). As described above, the part distributor 1925 may store the doubly-encrypted secret parts 1939 for the part holders 1620 in storage/memory of a repository 1927. Each doubly-encrypted secret part 1939 may be sent to the respective part holder 1620, e.g., when requested by the part holder 1620.

Each part holder 1620 can then decrypt its respective doubly-encrypted secret part 1939 into a singly-encrypted secret part 734 using its private key 2047. Each part holder 1620 can only decrypt the parts for which they have the corresponding private key 2047. Even if the part holder 1620 (or a hacker) decrypted their doubly-encrypted secret part 1939, the singly-encrypted secret part 734 would still be encrypted with a symmetric key (SYM2 key) 732 known only by the part distributor 1925. It is understood that FIG. 22 is a simplified illustration and that the part distributor 1925, repository 1927, and part holders 1620 may further include other modules and/or data, e.g., those illustrated in FIGS. 19-20.

Figure 23:
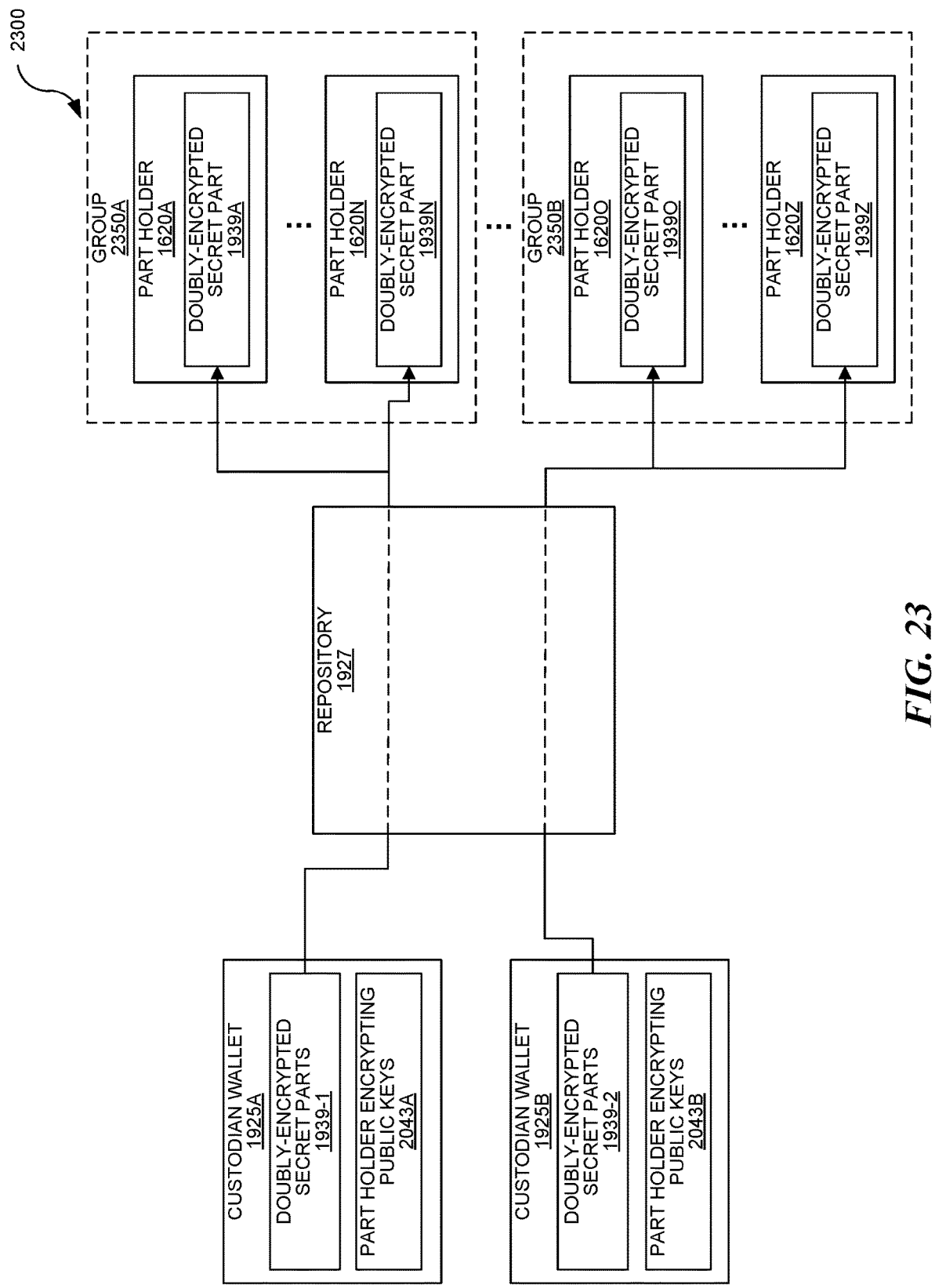
FIG. 23 is a block diagram illustrating an example system/methodology for an online implementation of key exchange having multiple distributors and/or multiple groups of part holders.

FIG. 23 is a block diagram illustrating an example system/methodology 2300 for an online implementation of key exchange having multiple distributors 1925A-B and/or multiple groups 2350A-B of part holders 1620A-Z. In examples, custodian wallets 1925A-B (e.g., online and/or offline) may act as distributors 1925. For example, a first set of doubly-encrypted secret part 1939-1 may be generated for a first custodian wallet 1925A to be provided to a first group 2350A of part holders 1620A-B through the repository 1927 (such as Firestore/Firebase).

Similarly (e.g., at the same time), a second set of doubly-encrypted secret part 1939-2 may be generated for a second custodian wallet 1925B to be provided to a second group 2350B of part holders 1620O-Z through the repository 1927 (such as Firestore/Firebase). In examples, each different part distributors/custodian wallet 1925 stores a different set of doubly-encrypted secret parts 1939 (e.g., generated from a different at least one asset encryption key (secret) 728A-B, set of secret parts 730A-B, set of singly-encrypted secret parts 734A-B, and symmetric keys 732A-B). Furthermore, each distributors/custodian wallet 1925 may utilize a different set of part holder keypairs (each including part holder encrypting public keys 2043 and part holder decrypting private keys 2047) and different distributor encrypting public keys 2036 and distributor decrypting public keys 2040. In examples, the part holder groups 2350A-B may or may not overlap. It is understood that FIG. 23 is a simplified illustration and that the part distributor 1925, repository 1927, and part holders 1620 may further include other modules and/or data, e.g., those illustrated in FIGS. 19-20.

Figure 24A:
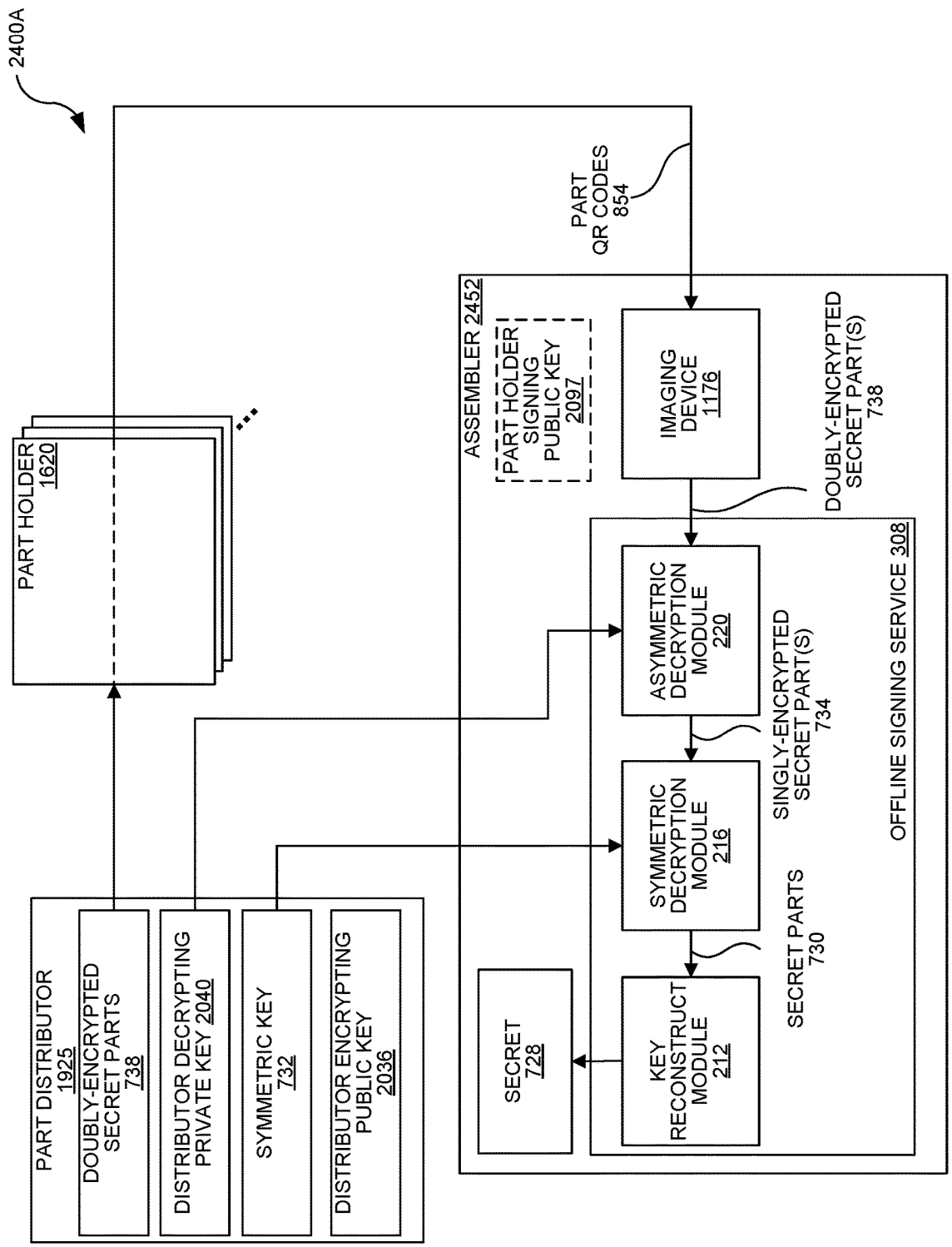
FIG. 24A is a block diagram illustrating an example system/methodology for returning parts to an offline signing service for reconstituting a secret.

FIG. 24A is a block diagram illustrating an example system/methodology 2400A for returning parts to an offline signing service 308 for reconstituting a secret 728. The example system/methodology 2400A may operate to securely distribute doubly-encrypted secret parts 738 of an asset encryption key (secret) 728 to N part holders 1620 and, when requested, reconstruct the asset encryption key (secret) 728, e.g., in order to access/utilize an asset key. In examples, doubly-encrypted secret pats 738 from at least M of the N part holders 1620 are required in order to reconstruct the asset encryption key (secret) 728.

In the system 2400A of FIG. 24A, each doubly-encrypted secret part 738 is encrypted at the part distributor 1925 as follows: (1) symmetric encryption using a symmetric key 732 to produce a singly-encrypted secret part 734; followed by (2) asymmetric encryption with the distributor encrypting public key 2036 to produce a doubly-encrypted secret part 738.

During the first stage of encryption at the part distributor 1925, Shamir metadata may optionally be added to the singly-encrypted secret parts 734. The Shamir metadata may provide instructions and/or requirements for reconstituting the secret 728 from the unprotected secret parts 730, e.g., that M of N secret parts 730 are required to reconstitute the secret 728. It should be noted that Shamir splitting and reconstruction is not limited to an M of N configuration. For example, Shamir reconstruction can require M1 of N1 AND M2 of N2. In other words, Boolean logic (more complex than M of N) can be used to have different groups of part holders 1620 with different thresholds, e.g. to reconstitute a secret 728, Shamir splitting could be performed such that 3 of 5 executives or 40 of 50 staff or 2 of 2 backup copies are required for reconstruction. Shamir metadata for a particular part (encrypted or not) may also indicate which part holder 1620 the part is intended for.

Optionally, a unique message authentication code (MAC) tag may be added to each doubly-encrypted secret part 738. A MAC tag is information added to a message that allows a receiver of the message (e.g., part holder 1620 and/or assembler 2452) to verify that the message came from the stated sender and has not been altered. In examples, one or both stages of encryption used in the system 2400A may perform encryption and signing together, e.g., using a single function call to a Libsodium SealedBox or CryptoBox library of functions. In examples, the MAC tag may optionally be added by the encryption/signing applied by SealedBox or CryptoBox. A MAC tag may be used instead of, or in addition to, any of the optional signatures (e.g., using Ed25519) described herein.

In examples, the doubly-encrypted secret parts 738 can be distributed to the part holders via QR codes 854 for safekeeping, e.g., via physical printout, secure electronic transmission, and/or portable storage drive. When the secret 728 needs to be reconstructed, the QR codes 854 (representing the different doubly-encrypted secret part 738 may be presented to an imaging device 1176 in or coupled to an assembler 2452 (e.g., a computing device 102 at a secure location). The QR codes 854 may be presented on a physical printout or an electronic display (e.g., the part holder's phone).

The assembler 2452 may or may not be the same as the part distributor 1925, e.g., they may be located in the same physical housing and/or be implemented by the same computing device 102. If the assembler 2452 is physically separate from the part distributor 1925, the assembler 2452 may receive at least the distributor decrypting private key 2040 and the symmetric key 732 from the part distributor 1925, e.g., via secure network communication, scanning printed (or electronically displayed) QR codes, and/or a portable storage drive. If the assembler 2452 is physically separate from the part distributor 1925, they may use separate or identical encrypting keypairs and/or signing keypairs, as discussed herein. In examples, the assembler 2452 is physically separate from the part distributor 1925 when implementing an offline signing service 308 but not when implementing an online signing service 1809, although any suitable configuration may be used. Whether or not they are physically separate, the assembler 2452 and the part distributor 1925 may be referred to as a single "system".

The assembler 2452 may scan QR codes 854 from at least some (e.g., at least M) of the part holders 1620 to produce doubly-encrypted secret parts 738. An asymmetric decryption module 220 may decrypt each received doubly-encrypted secret part 738 with the distributor decrypting private key 2040 to produce a singly-encrypted secret part 734. In examples the distributor decrypting private key 2040 may be used to decrypt doubly-encrypted secret parts 738 from all part holders 1620 but may be known only by the part distributor 1925 (and assembler 2452, if different than the part distributor 1925).

A symmetric decryption module 216 may decrypt the singly-encrypted secret part(s) 734 (using the symmetric key 732) to produce secret parts 730. The offline signing service 308 may determine if enough of the secret parts 730 have been collected to reconstruct the secret 728. This determination may be based on the Shamir metadata in the singly-encrypted secret parts 734. If, according to the Shamir metadata, enough secret parts 730 (e.g., M of N) have not been collected, reconstruction of the secret 728 is not attempted.

If, according to the Shamir metadata, enough secret parts 730 (e.g., M of N) have been collected, a key reconstructing module 212 may assemble multiple of the secret parts 730 to produce an asset encryption key (secret) 728. A single symmetric key 732 may be used to decrypt all the singly-encrypted secret parts 734 or a different symmetric key 732 may be used for each singly-encrypted secret parts 734.

The reconstructed secret 728 may be used to gain access to (e.g., decrypt) the asset key. The asset key may be a private key (e.g., for signing transactions) associated with a custodial account with a large balance, a cryptographic key for decrypting particularly high-value data, etc. Therefore, following reconstruction of the asset encryption key (secret) 728, the asset key may be used to sign a transaction and/or decrypt data.

Figure 24B:
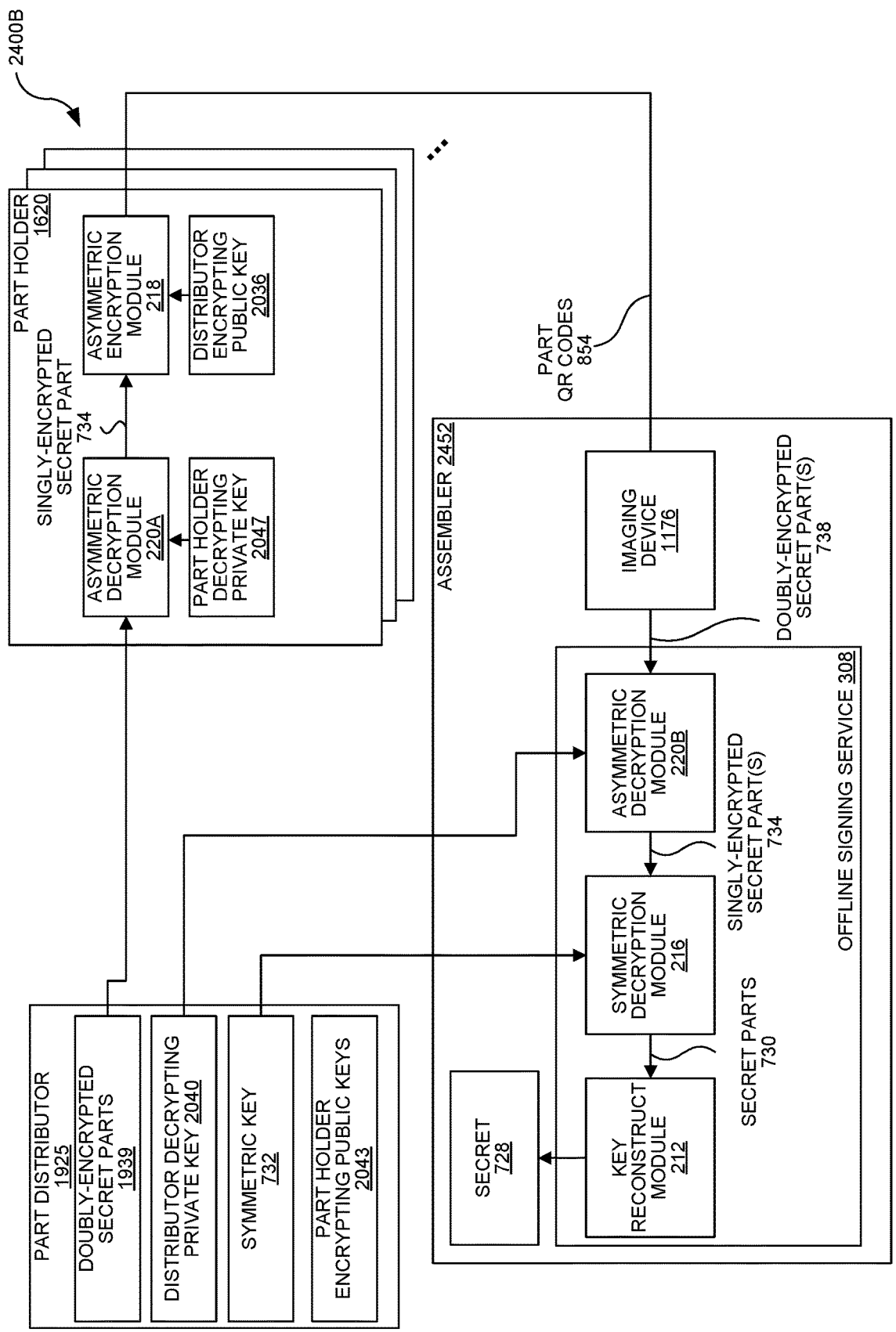
FIG. 24B is a block diagram illustrating another example system/methodology for returning parts to an offline signing service for reconstituting a secret.

FIG. 24B is a block diagram illustrating another example system/methodology 2400B for returning parts to an offline signing service 308 for reconstituting a secret 728. FIG. 24B may include many of the same devices, modules, and data as in FIG. 24A. Unless otherwise noted, the devices, modules, and data in FIG. 24B operate in a similar manner to the devices, modules, and data in FIG. 24A.

Like the system 2400A of FIG. 24A, the secret parts 730 may first be encrypted symmetrically using the symmetric key 732. However, unlike the system 2400A of FIG. 24A, the asymmetric encryption used thereafter to produce each doubly-encrypted secret part 1939 (in the system 2400B of FIG. 24B) may use the part holder encrypting public key 2043 of the part holder 1620 for which the doubly-encrypted secret part 1939 is intended. During the symmetric encryption at the part distributor 1925, Shamir metadata may optionally be added to the singly-encrypted secret parts 734 (before asymmetric encryption into the doubly-encrypted secret parts 1939). Optionally, a message authentication code (MAC) tag may be added to the doubly-encrypted secret parts 1939 during one or both stages of encryption (and optional signing) in the system 2400B.

As before, the doubly-encrypted secret parts 1939 (encrypted with the part holders' public keys 2043) can be printed out and distributed to the part holders 1620 as QR codes, transmitted electronically, and/or transmitted via a portable storage drive. After receiving the doubly-encrypted secret parts 1939, each part holder 1620 may decrypt their doubly-encrypted secret part 1939 with their respective part holder decrypting private key 2047 (corresponding to the part holder encrypting public key 2043 used to encrypt the doubly-encrypted secret part 1939) using a first asymmetric decryption module 220A. Each part holder private key 2047 may be unique to (and known only by) the respective part holder 1620. The resulting singly-encrypted secret part 734 may then be re-encrypted with the distributor encrypting public key 2036 (in the asymmetric encryption module 218). Therefore, each part holder 1620 may receive a doubly-encrypted secret part 1939 (encrypted with its part holder encrypting public key 2043) and produce a QR code 854 representing a doubly-encrypted secret part 738 (encrypted with the distributor encrypting public key 2036).

The QR code 854 may be displayed to an imaging device 1176 in or coupled to the assembler 2452 (e.g., a computing device 102 at a secure location). The assembler 2452 may or may not be the same as the part distributor 1925, e.g., they may be located in the same physical housing and/or be implemented by the same computing device 102. If the assembler 2452 is physically separate from the part distributor 1925, the assembler 2452 may receive at least the distributor decrypting private key 2040 and the symmetric key 732 from the part distributor 1925, e.g., via secure network communication, scanning printed (or electronically displayed) QR codes, and/or a portable storage drive. Optionally communication from the part holders 1620 to the assembler 2452 may also occur through the repository 1927.

The assembler 2452 can scan a QR code 854 from at least some (e.g., at least M) of the part holders 1620 to produce at least one doubly-encrypted secret part 738. In the offline signing service 308, a second asymmetric decryption module 220B may decrypt each received doubly-encrypted secret part 738 with the distributor decrypting private key 2040 to produce a singly-encrypted secret part 734. In examples, the distributor decrypting private key 2040 may be used to decrypt doubly-encrypted secret parts 738 from all part holders 1620 but may be known only by the distributor 1925 (and assembler 2452, if different than the distributor 1925).

A symmetric decryption module 216 may decrypt the singly-encrypted secret part(s) 734 (using the symmetric key 732) into secret parts 730. The offline signing service 308 may determine if enough of the secret parts 730 have been collected to reconstruct the secret 728. This determination may be based on the Shamir metadata in the singly-encrypted secret parts 734. If, according to the Shamir metadata, enough secret parts 730 (e.g., M of N) have not been collected, reconstruction of the secret 728 is not attempted.

If, according to the Shamir metadata, enough secret parts 730 (e.g., M of N) have been collected, a key reconstructing module 212 may assemble multiple of the secret parts 730 to produce an asset encryption key (secret) 728. A single symmetric key 732 may be used to decrypt all the singly-encrypted secret parts 734 or a different symmetric key 732 may be used for each singly-encrypted secret parts 734.

The reconstructed secret 728 may be used to gain access to (e.g., decrypt) the asset key. The asset key may be a private key (e.g., for signing transactions) associated with a custodial account with a large balance, a cryptographic key for decrypting particularly high-value data, etc. Therefore, following reconstruction of the asset encryption key (secret) 728, the asset key may be used to sign a transaction and/or decrypt data.

Figure 24C:
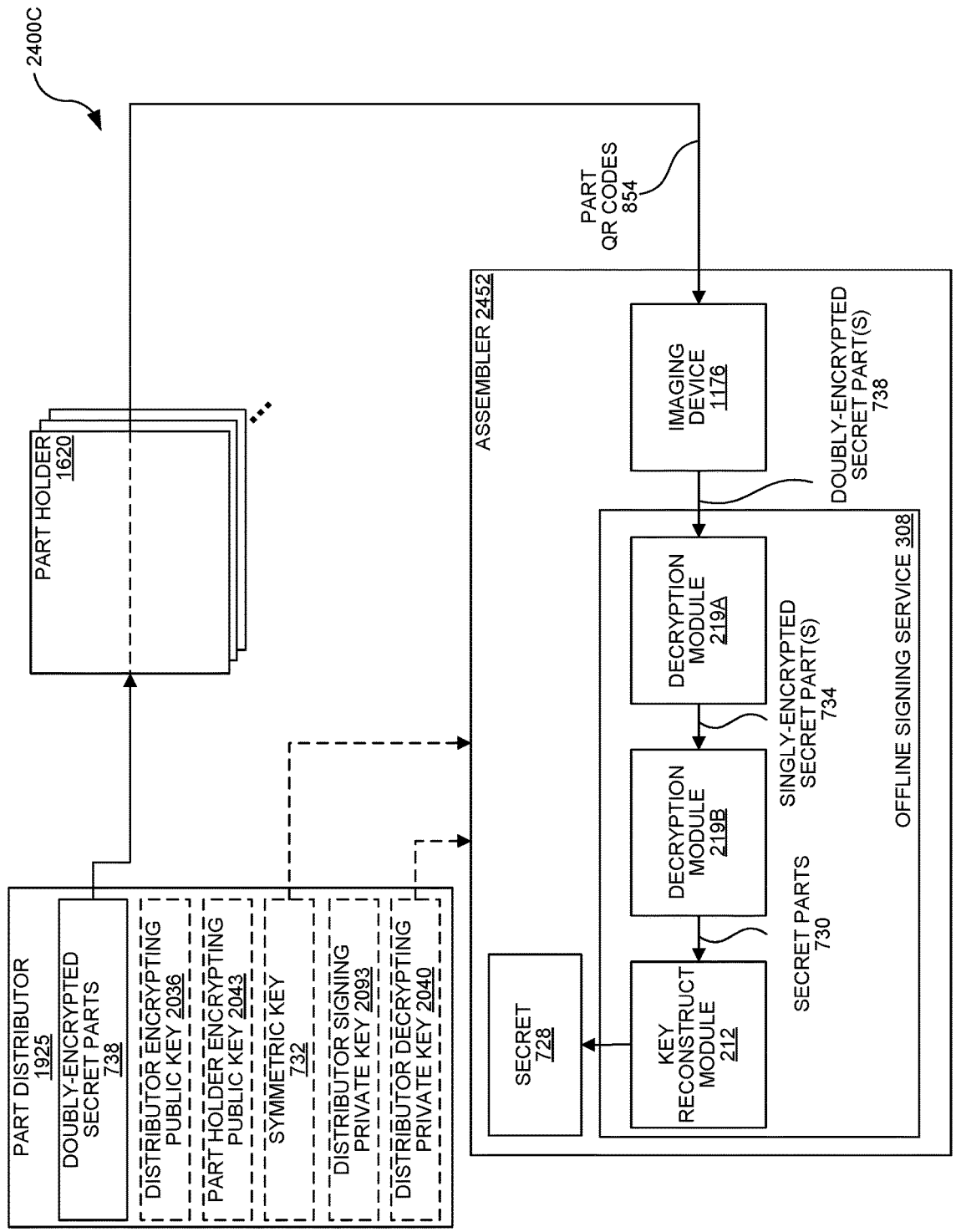
FIG. 24C is a block diagram illustrating another example system/methodology for returning parts to an offline signing service for reconstituting a secret.

FIG. 24C is a block diagram illustrating another example system/methodology 2400C for returning parts to an offline signing service 308 for reconstituting a secret 728. FIG. 24C may include many of the same devices, modules, and data as in FIG. 24A. Unless otherwise noted, the devices, modules, and data in FIG. 24C operate in a similar manner to the devices, modules, and data in FIG. 24A.

In the system 2400C of FIG. 24C, the secret parts 730 are encrypted into the doubly-encrypted secret parts 738 using two stages of encryption, each stage being symmetric or asymmetric. For example, the doubly-encrypted secret parts 738 may be generated using: (1) a first symmetric stage using the symmetric key 732 and a second asymmetric stage using the distributor encrypting public key 2036 or a part holder encrypting public key 2043; (2) a first symmetric stage using the symmetric key 732 and a second symmetric stage using the symmetric key 732 again (or a different symmetric key); (3) a first asymmetric stage using the distributor encrypting public key 2036 or the part holder encrypting public key 2043 and a second symmetric stage using the symmetric key 732; or (4) a first asymmetric stage using the distributor encrypting public key 2036 or the part holder encrypting public key 2043 and a second asymmetric stage using the distributor encrypting public key 2036 or the part holder encrypting public key 2043. During generation of the doubly-encrypted secret parts 738, the part distributor 1925 may optionally add Shamir metadata to the singly-encrypted secret parts 734 (during the first stage of encryption) or the doubly-encrypted secret parts 738 (during the second stage of encryption). Optionally, a message authentication code (MAC) tag may be added to the doubly-encrypted secret parts 1939 during one or both stages of encryption (and optional signing) in the system 2400C.

The QR codes 854 (representing the doubly-encrypted secret parts 738) are distributed to the part holders 1620 and, when secret 728 reconstruction is desired, at least some of the QR codes 854 are presented to the imaging device in or coupled to the assembler 2452. Once a doubly-encrypted secret part 738 is determined from each QR code 854 presented at the imaging device 1176, a first decryption module 219A may produce a singly-encrypted secret part 734 from each doubly-encrypted secret part 738. The first decryption module 219A may be a symmetric decryption module 216 (that uses a symmetric key 732) or an asymmetric decryption module 220 (that uses an asymmetric key, such as the distributor decrypting private key 2040 or a part holder decrypting private key 2047).

A second decryption module 219B may decrypt each singly-encrypted secret part(s) 734 into secret parts 730. The second decryption module 219B may be a symmetric decryption module 216 (that uses a symmetric key, such as a symmetric key 732) or an asymmetric decryption module 220 (that uses an asymmetric key, such as the distributor decrypting private key 2040 or a part holder decrypting private key 2047).

The offline signing service 308 may determine if enough of the secret parts 730 have been collected to reconstruct the secret 728. This determination may be based on the Shamir metadata in the singly-encrypted secret parts 734. If, according to the Shamir metadata, enough secret parts 730 (e.g., M of N) have not been collected, reconstruction of the secret 728 is not attempted.

If, according to the Shamir metadata, enough secret parts 730 (e.g., M of N) have been collected, a key reconstructing module 212 may assemble multiple of the secret parts 730 to produce an asset encryption key (secret) 728. A single symmetric key 732 may be used to decrypt all the singly-encrypted secret parts 734 or a different symmetric key 732 may be used for each singly-encrypted secret parts 734.

The reconstructed secret 728 may be used to gain access to (e.g., decrypt) the asset key. The asset key may be a private key (e.g., for signing transactions) associated with a custodial account with a large balance, a cryptographic key for decrypting particularly high-value data, etc. Therefore, following reconstruction of the asset encryption key (secret) 728, the asset key may be used to sign a transaction and/or decrypt data.

Optionally, in any of FIGS. 24A-C, any transmitted parts may be signed (in addition to encrypted) using a signing private key belonging to the transmitter, after which the receiver may verify the signature using a signing public key belonging to the transmitter. Furthermore, timestamps may optionally be added during any of the encryption described in FIGS. 24A-C indicating the time at which the encryption took place. Timestamps may be used to determine whether various parts (encoded or not) are still viable or whether they should be discarded as too old.

Figure 25A:
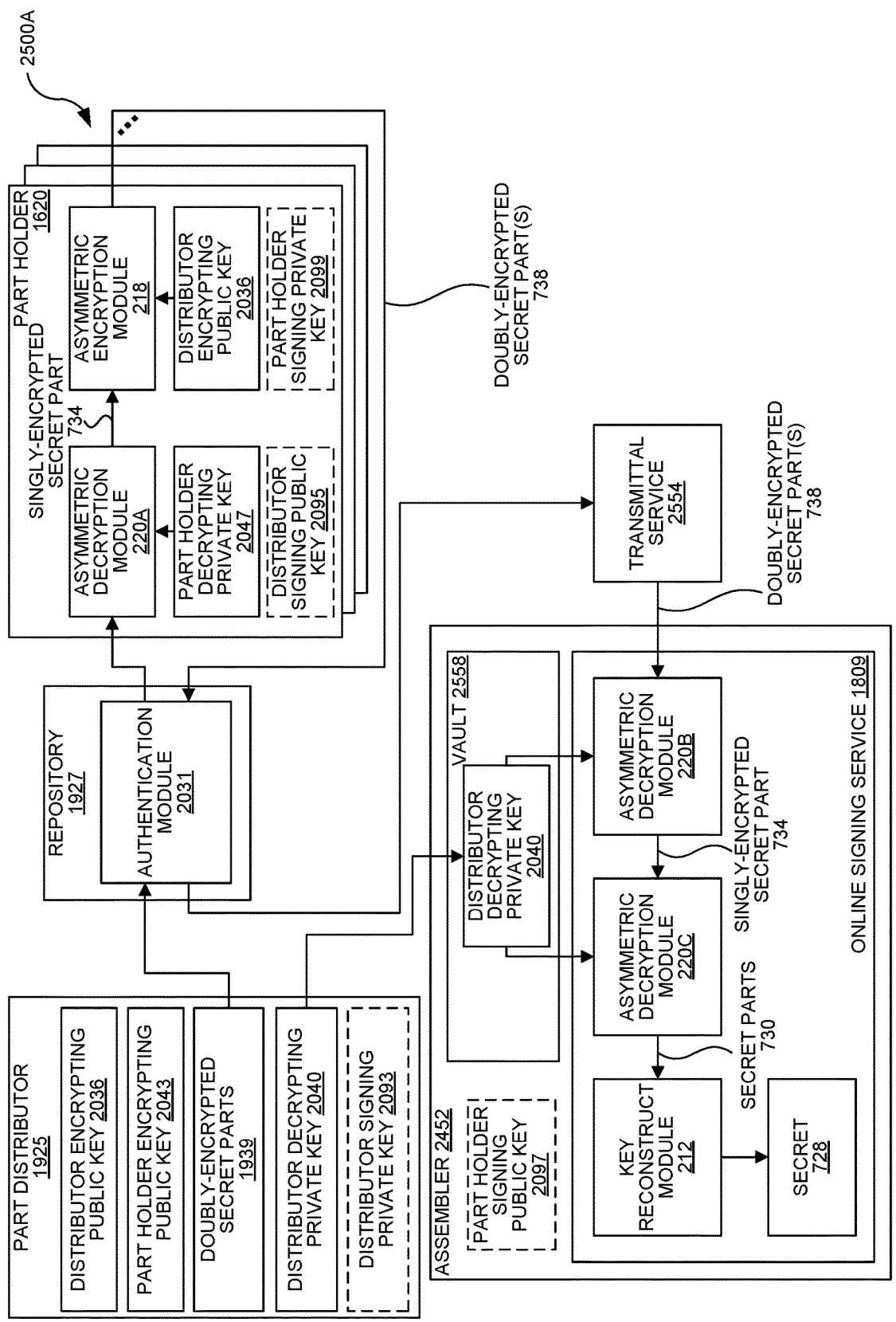
FIG. 25A is a block diagram illustrating an example system/methodology for returning parts to an online signing service for reconstituting a secret.

FIG. 25A is a block diagram illustrating an example system/methodology 2500A for returning parts to an online signing service 1809 (e.g., implemented in an assembler 2452) for reconstituting a secret 728. The doubly-encrypted secret parts 1939 may be generated by the part distributor 1925 by first asymmetrically encrypting each secret part 730 using the distributor encrypting public key 2036 to produce singly-encrypted secret parts 734. Second, each singly-encrypted secret part 734 may be asymmetrically encrypted with a part holder encrypting public key 2043 (belonging to a respective part holder 1620 for which the part is intended) to produce doubly-encrypted secret parts 1939.

Therefore, the doubly-encrypted secret parts 1939 are generated in the system 2500A of FIG. 25A using two stages of asymmetric encryption, where the first stage uses the distributor encrypting public key 2036, and the second stage uses the respective part holder encrypting public key 2043. During the first stage of encryption at the part distributor 1925, a first signature may optionally be applied to the singly-encrypted secret parts 734 using a distributor signing private key 2093. During the second stage of encryption at the part distributor 1925, a second signature may optionally be applied to the doubly-encrypted secret parts 1939, using the distributor signing private key 2093.

During the first stage of encryption at the part distributor 1925, Shamir metadata may also optionally be added to the singly-encrypted secret parts 734. The Shamir metadata may provide instructions and/or requirements for reconstituting the secret 728 from the unprotected secret parts 730, e.g., that M of N secret parts 730 are required to reconstitute the secret 728. It should be noted that Shamir splitting and reconstruction is not limited to an M of N configuration. For example, Shamir reconstruction can require M1 of N1 AND M2 of N2. In other words, Boolean logic (more complex than M of N) can be used to have different groups of part holders 1620 with different thresholds, e.g. to reconstitute a secret 728, Shamir splitting could be performed such that 3 of 5 executives or 40 of 50 staff or 2 of 2 backup copies are required for reconstruction. Shamir metadata for a particular part (encrypted or not) may also indicate which part holder 1620 the part is intended for. Optionally, a message authentication code (MAC) tag may be added to the doubly-encrypted secret parts 1939 during one or both stages of encryption (and optional signing) in the system 2500A.

The doubly-encrypted secret parts 1939 can be distributed to the repository 1927 (such as Firestore/Firebase) via any suitable method, e.g., via secure electronic communication, printing out QR codes that are displayed to the repository 1927, electronically displaying QR codes to the repository 1927, etc.

Each part holder 1620 may retrieve, from the repository 1927, a respective doubly-encrypted secret part 1939 that was intended for it, e.g., in response to user input at the part holder 1620. Following retrieval, if the second signature was applied during the second stage of asymmetric encryption at the part distributor 1925, each part holder 1620 may optionally verify the second signature on its doubly-encrypted secret part 1939 using the distributor signing public key 2095. In examples, the part holder 1620 may discard its doubly-encrypted secret part 1939 if the second signature cannot be verified. Each part holder 1620 may then asymmetrically decrypt (using a first asymmetric decryption module 220A) it's doubly-encrypted secret part 1939 into a singly-encrypted secret part 734. The singly-encrypted secret part 734 at this stage is a secret part 730 with one layer of asymmetric encryption (not symmetric encryption) and optional first signature.

Each part holder 1620 may re-encrypt its singly-encrypted secret part 734 (in an asymmetric encryption module 218) using the distributor encrypting public key 2036 (and optionally add a third signature using its part holder signing private key 2099) to produce a doubly-encrypted secret part 738. Optionally, the part holder 1620 may also add a timestamp, indicating when the asymmetric re-encryption was performed at the part holder 1620, to the resulting doubly-encrypted secret part 738. Each part holder 1620 can transmit its resulting doubly-encrypted secret part 738 to the repository 1927 or directly to the online signing service 1809.

In examples, each part holder 1620 (e.g., implementing a serverless function) can transmit using publish/subscribe (pubsub) asynchronous messaging where it publishes its resulting doubly-encrypted secret part 738 to the repository

1927 and writes it to a new pubsub topic. In such a configuration, the online signing service 1809 may consume messages from the pubsub topic, e.g., using a transmittal service 2554. However, the part holders 1620 may use any suitable method to transmit their doubly-encrypted secret parts 738 to the online signing service 1809, with or without one or more intermediary devices and/or services.

Upon receiving each doubly-encrypted secret part 738, the online signing service 1809 may optionally verify, using the part holder signing public key 2097, the third signature on the doubly-encrypted secret part 738 (determined from the QR code 854) belongs to the part holder 1620 that sent it. In examples, the online signing service 1809 may discard a doubly-encrypted secret part 1939 if the third signature cannot be verified. In other words, in some configurations, the online signing service 1809 may decrypt a doubly-encrypted secret part 738 only if a third signature on the doubly-encrypted secret part 738 matches the part holder 1620 that sent it, e.g., via the repository 1927.

The online signing service 1809 may decrypt the doubly-encrypted secret part 738 (using a second asymmetric decryption module 220B) into a singly-encrypted secret part 734 using the distributor decrypting private key 2040. This may include the online signing service 1809 optionally verifying that the timestamp (added to the singly-encrypted part 734 at the part holder 1620) is recent, e.g., is not older than a pre-determined time threshold. In some configurations, the online signing service 1809 may discard the singly-encrypted secret part 734 if the timestamp is older than the pre-determined time threshold.

The online signing service 1809 may optionally verify that the first signature (applied at the part distributor 1925) on the singly-encrypted secret part 734 belongs to the part distributor 1925. A third asymmetric decryption module 220C may then decrypt the singly-encrypted secret part 734 into a secret part 730 using the distributor decrypting private key 2040. In examples, the assembler 2452 may implement a vault 2558 using secure memory in order to store sensitive data, such as the distributor decrypting private key 2040 used by the asymmetric decryption modules 220B-C.

The online signing service 1809 may also optionally verify that the part holder 1620 that sent the now-decrypted secret part 730 matches the expected part holder 1620 by looking at the Shamir metadata. In examples, the online signing service 1809 may attempt reconstruction of the secret 728 only if the part holder 1620 that sent the now-decrypted secret part 730 matches the expected part holder 1620.

The online signing service 1809 may also determine whether enough secret parts 730 have been collected to reconstitute the secret 728 (also referred to as the asset encryption key 728). If the online signing service 1809 determines that enough secret parts 730 have been collected (e.g., M of N) as specified by the Shamir metadata, a key reconstruction module 212 may reconstitute the secret 728. The reconstructed secret 728 may be used to gain access to (e.g., decrypt) the asset key. The asset key may be a private key (e.g., for signing transactions) associated with a custodial account with a large balance, a cryptographic key for decrypting particularly high-value data, etc. Therefore, following reconstruction of the asset encryption key (secret) 728, the asset key may be used to sign a transaction and/or decrypt data.

In some configurations, the part distributor 1925 and/or the online signing service 1809 may rotate (e.g., create new versions of and distribute) the relevant keys used in the system 2500A, as described above. In examples, the at least one processor may create a new set of: (1) secret/asset encryption key/SYM1 key 728; (2) symmetric key 732 (SYM2); (3) distributor decrypting private key 2040 and distributor encrypting public key 2036; and/or (4) distributor signing private key 2093 and distributor signing public key 2095. In examples, the at least one key is rotated periodically, e.g., every day, every week, every month, every year, etc.

Following the creation of the new key(s): new secret parts 730 are created from the new secret/asset encryption key/SYM1 key 728; the new secret parts 730 are encrypted with two stages (e.g., two asymmetric encryption stages, as described above) and optionally signed at each stage using the distributor signing private key 2093; and the resulting doubly-encrypted secret parts 1939 are sent to (e.g., written to) the repository 1927. It should be noted that the repository 1927 may store the old (pre-rotation) doubly-encrypted secret parts 1939 and the new (post-rotation) doubly-encrypted secret parts 1939 for a period of time.

The part holders 1620 may be notified of the new doubly-encrypted secret parts 1939 available at the repository 1620, e.g., via text message, e-mail, push notification, automated telephone call, other in-application messaging, etc. An application on each part holder 1620 may identify and download the new doubly-encrypted secret parts 1939 for the respective part holder 1620, after which the part holder 1620 may decrypt and re-encrypt (with the distributor encrypting public key 2036) as described above.

It should be noted that a particular part holder may store its old (pre-rotation) doubly-encrypted secret part 1939 and its new (post-rotation) doubly-encrypted secret part 1939 for a period of time, if the part holder 1620 was designated as a part holder 1620 during the previous and new distribution of doubly-encrypted secret parts 1939. It should also be noted that new and/or different part holders 1620 may be designated during key rotation. Accordingly, a newly-designated part holder 1620 may receive its first doubly-encrypted secret part 1939 during a key rotation. Conversely, a previously-designated part holder 1620 that is no longer a designated part holder 1620 post-rotation may possess an old (pre-rotation) doubly-encrypted secret part 1939 but not receive a new (post-rotation) doubly-encrypted secret part 1939 during key rotation.

The online signing service 1809 may receive a plurality of old (pre-rotation) doubly-encrypted secret parts 738 that are decrypted into respective secret parts 730, e.g., enough to reconstitute the old secret/asset encryption key/SYM1 key 728. This may require M of N or N of N old secret parts 730, e.g., as specified by Shamir metadata in the old parts. The online signing service 1809 may also receive a plurality of new (post-rotation) doubly-encrypted secret parts 738 that are decrypted into respective secret parts 730, e.g., enough to reconstitute the new secret/asset encryption key/SYM1 key 728. This may require M of N or N of N new secret parts 730, e.g., as specified by Shamir metadata in the new parts.

In examples, the secret 728 is used to gain access to (e.g., decrypt) an asset key, where the asset key is a private key (e.g., for signing transactions) associated with a custodial account with a large balance, a cryptographic key for decrypting particularly high-value data, etc. Therefore, following reconstruction, the old secret 728 may be used decrypt the asset key (after which the asset key is optionally used to sign a transaction and/or decrypt data) and the new secret 728 is used to re-encrypt the asset key.

Periodic key rotation will ensure that: (1) part holder 1620 workflow is exercised—no one loses their device or loses access; and (2) the designated group of part holders 1620 can change over time because key rotation provides a periodic opportunity to onboard new part holders 1620 and remove obsolete part holders 1620.

Figure 25B:
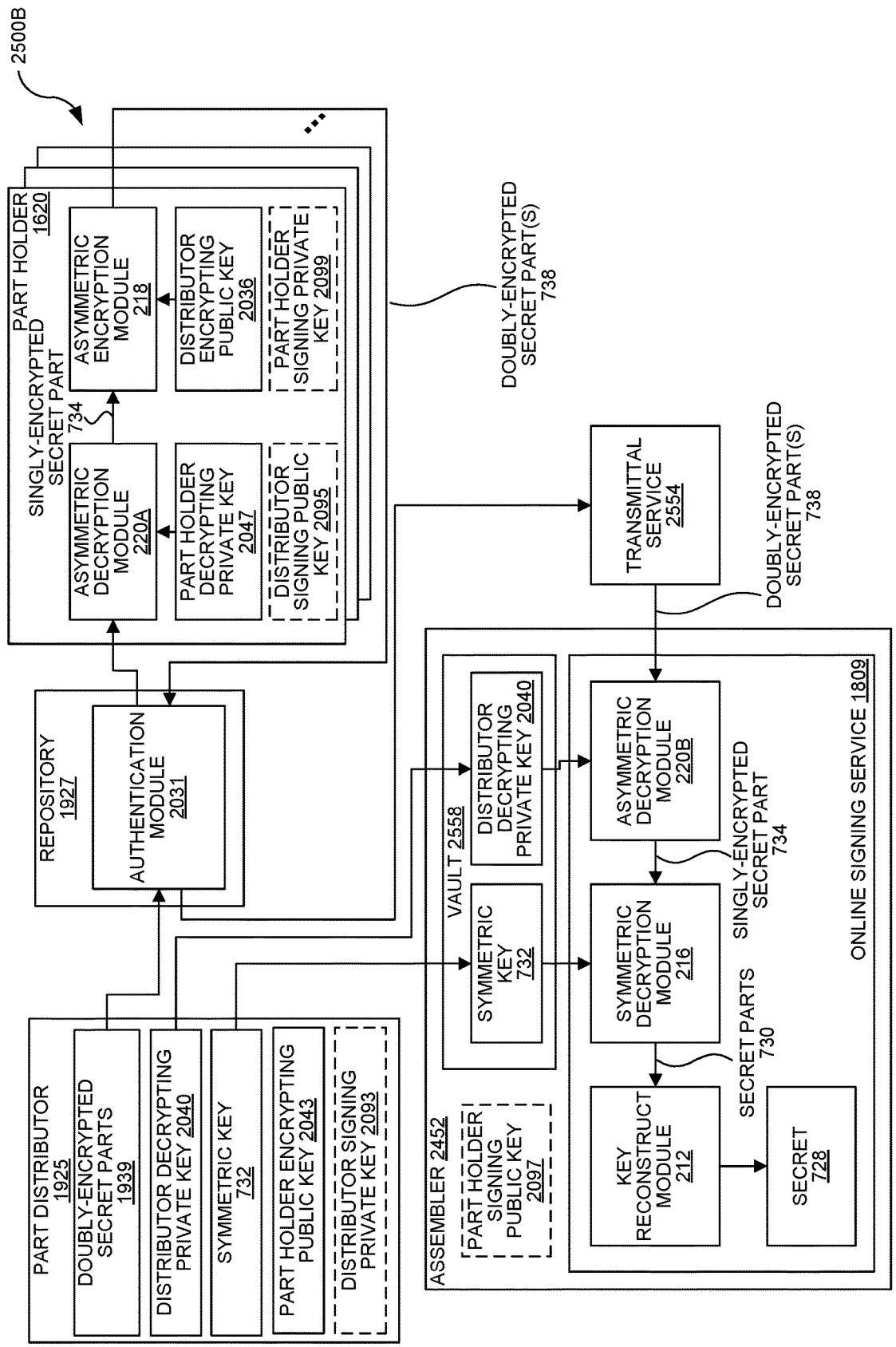
FIG. 25B is a block diagram illustrating another example system/methodology for returning parts to an online signing service for reconstituting a secret.

FIG. 25B is a block diagram illustrating another example system/methodology 2500B for returning parts to an online signing service 1809 (e.g., implemented in an assembler 2452) for reconstituting a secret 728. FIG. 25B may include many of the same devices, modules, and data as in FIG. 25A. Unless otherwise noted, the devices, modules, and data in FIG. 25B operate in a similar manner to the devices, modules, and data in FIG. 25A.

In the system 2500B of FIG. 25B, the doubly-encrypted secret parts 1939 may be generated by the part distributor 1925 by first symmetrically encrypting each secret part 730 using the symmetric key 732 to produce singly-encrypted secret parts 734. Second, each singly-encrypted secret part 734 may be asymmetrically encrypted with a part holder encrypting public key 2043 (belonging to a respective part holder 1620 for which the part is intended) to produce doubly-encrypted secret parts 1939.

Therefore, in contrast to the system 2500A in FIG. 25A, the doubly-encrypted secret parts 1939 are generated in the system 2500B of FIG. 25B using a first stage of symmetric encryption (using the symmetric key 732) and a second stage of asymmetric encryption (using the respective part holder encrypting public key 2043). During the first stage of encryption at the part distributor 1925, a first signature may optionally be applied to the singly-encrypted secret parts 734 using a distributor signing private key 2093. During the second stage of encryption at the part distributor 1925, a second signature may optionally be applied to the doubly-encrypted secret parts 1939, using the distributor signing private key 2093. The doubly-encrypted secret part 1939 may be stored on the repository 1927 for asynchronous retrieval by the part holders 1620.

During the first stage of encryption at the part distributor 1925, Shamir metadata may also optionally be added to the singly-encrypted secret parts 734. The Shamir metadata may provide instructions and/or requirements for reconstituting the secret 728 from the unprotected secret parts 730, e.g., that M of N secret parts 730 are required to reconstitute the secret 728. It should be noted that Shamir splitting and reconstruction is not limited to an M of N configuration. For example, Shamir reconstruction can require M1 of N1 AND M2 of N2. In other words, Boolean logic (more complex than M of N) can be used to have different groups of part holders 1620 with different thresholds, e.g. to reconstitute a secret 728, Shamir splitting could be performed such that 3 of 5 executives or 40 of 50 staff or 2 of 2 backup copies are required for reconstruction. Shamir metadata for a particular part (encrypted or not) may also indicate which part holder 1620 the part is intended for. Optionally, a message authentication code (MAC) tag may be added to the doubly-encrypted secret parts 1939 during one or both stages of encryption (and optional signing) in the system 2500B.

The doubly-encrypted secret parts 1939 can be distributed to the repository 1927 (such as Firestore/Firebase) via any suitable method, e.g., via secure electronic communication, printing out QR codes that are displayed to the repository 1927, electronically displaying QR codes to the repository 1927, etc.

Each part holder 1620 may retrieve, from the repository 1927, a respective doubly-encrypted secret part 1939 that was intended for it, e.g., in response to user input at the part holder 1620. Following retrieval, if the second signature was applied during the second stage of asymmetric encryption at the part distributor 1925, each part holder 1620 may optionally verify the second signature on its doubly-encrypted secret part 1939 using the distributor signing public key 2095. In examples, the part holder 1620 may discard its doubly-encrypted secret part 1939 if the second signature cannot be verified. Each part holder 1620 may then asymmetrically decrypt (using a first asymmetric decryption module 220A) it's doubly-encrypted secret part 1939 into a singly-encrypted secret part 734. The singly-encrypted secret part 734 at this stage is a secret part 730 with one layer of symmetric encryption and optional first signature.

The part holder 1620 may re-encrypt singly-encrypted secret part 734 (in an asymmetric encryption module 218) using the distributor encrypting public key 2036 (and optionally add a third signature using its part holder signing private key 2099) to produce a doubly-encrypted secret part 738. Optionally, the part holder 1620 may also add a timestamp, indicating when the asymmetric re-encryption was performed at the part holder 1620, to the resulting doubly-encrypted secret part 738. Each part holder 1620 can transmit its resulting doubly-encrypted secret part 738 to the repository 1927 or directly to the online signing service 1809. In examples, each part holder 1620 (e.g., implementing a serverless function) can transmit using publish/subscribe (pubsub) asynchronous messaging where it publishes its resulting doubly-encrypted secret part 738 to the repository 1927 and writes it to a new pubsub topic. In such a configuration, the online signing service 1809 may consume messages from the pubsub topic, e.g., using a transmittal service 2554. However, the part holders 1620 may use any suitable method to transmit their doubly-encrypted secret parts 738 to the online signing service 1809, with or without one or more intermediary devices and/or services.

Upon receiving each doubly-encrypted secret part 738, the online signing service 1809 may optionally verify, using the part holder signing public key 2097, that the third signature on the doubly-encrypted secret part 738 (determined from the QR code 854) belongs to the part holder 1620 that sent it. In examples, the online signing service 1809 may discard a doubly-encrypted secret part 738 if the third signature cannot be verified. In other words, in some configurations, the online signing service 1809 may decrypt a doubly-encrypted secret part 738 only if a third signature on the doubly-encrypted secret part 738 matches the part holder 1620 that sent it, e.g., via the repository 1927.

The online signing service 1809 may decrypt the doubly-encrypted secret part 738 (using a second asymmetric decryption module 220B) into a singly-encrypted secret part 734 using the distributor decrypting private key 2040. This may include the online signing service 1809 optionally verifying that the timestamp (added to the singly-encrypted part 734 at the part holder 1620) is recent, e.g., is not older than a pre-determined time threshold. In some configurations, the online signing service 1809 may discard the singly-encrypted secret part 734 if the timestamp is older than the pre-determined time threshold. In examples, the assembler 2452 may implement a vault 2558 using secure memory in order to store sensitive data, such as the symmetric key 732 and/or the distributor decrypting private key 2040.

The online signing service 1809 may optionally verify that the first signature (applied at the part distributor 1925) on the singly-encrypted secret part 734 belongs to the part distributor 1925. A symmetric decryption module 216 may then decrypt the singly-encrypted secret part 734 into a secret part 730 using the symmetric key 732.

The online signing service 1809 may also optionally verify that the part holder 1620 that sent the now-decrypted secret part 730 matches the expected part holder 1620 by looking at the Shamir metadata. In examples, the online signing service 1809 may attempt reconstruction of the secret 728 only if the part holder 1620 that sent the now-decrypted secret part 730 matches the expected part holder 1620.

The online signing service 1809 may also determine whether enough secret parts 730 have been collected to reconstitute the secret 728 (also referred to as the asset encryption key 728). If the online signing service 1809 determines that enough secret parts 730 have been collected (e.g., M of N) as specified by the Shamir metadata, a key reconstruction module 212 may reconstitute the secret 728. The reconstructed secret 728 may be used to gain access to (e.g., decrypt) the asset key. The asset key may be a private key (e.g., for signing transactions) associated with a custodial account with a large balance, a cryptographic key for decrypting particularly high-value data, etc. Therefore, following reconstruction of the asset encryption key (secret) 728, the asset key may be used to sign a transaction and/or decrypt data.

In some configurations, the part distributor 1925 and/or the online signing service 1809 may rotate (e.g., create new versions of and distribute) the relevant keys used in the system 2500B, as described above.

Figure 25C:
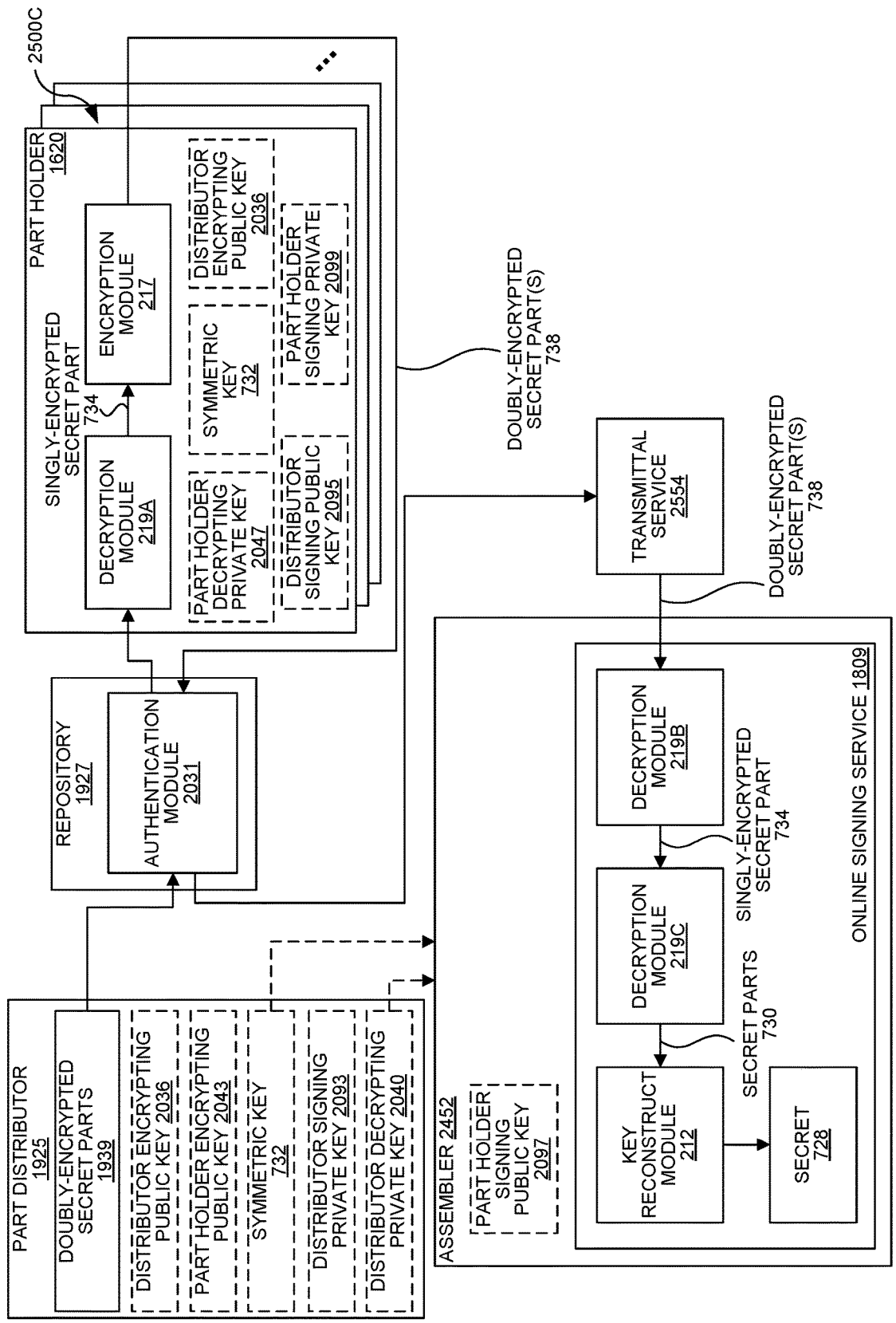
FIG. 25C is a block diagram illustrating another example system/methodology for returning parts to an online signing service for reconstituting a secret.

FIG. 25C is a block diagram illustrating another example system/methodology 2500C for returning parts to an online signing service 1809 (e.g., implemented in an assembler 2452) for reconstituting a secret 728. FIG. 25C may include many of the same devices, modules, and data as in FIG. 25A. Unless otherwise noted, the devices, modules, and data in FIG. 25C operate in a similar manner to the devices, modules, and data in FIG. 25A.

In the system 2500C of FIG. 25C, the secret parts 730 are encrypted into the doubly-encrypted secret parts 1939 using two stages of encryption, each stage being symmetric or asymmetric. For example, the doubly-encrypted secret parts 1939 may be generated using: (1) a first symmetric stage using the symmetric key 732 and a second asymmetric stage using the distributor encrypting public key 2036 or a part holder encrypting public key 2043; (2) a first symmetric stage using the symmetric key 732 and a second symmetric stage using the symmetric key 732 again (or a different symmetric key); (3) a first asymmetric stage using the distributor encrypting public key 2036 or the part holder encrypting public key 2043 and a second symmetric stage using the symmetric key 732; or (4) a first asymmetric stage using the distributor encrypting public key 2036 or the part holder encrypting public key 2043 and a second asymmetric stage using the distributor encrypting public key 2036 or the part holder encrypting public key 2043. During generation of the doubly-encrypted secret parts 1939, the part distributor 1925 may optionally add Shamir metadata to the singly-encrypted secret parts 734 (during the first stage of encryption) or the doubly-encrypted secret parts 1938 (during the second stage of encryption).

During the first stage of encryption at the part distributor 1925, a first signature may optionally be applied to the singly-encrypted secret parts 734 using a distributor signing private key 2093. During the second stage of encryption at the part distributor 1925, a second signature may optionally be applied to the doubly-encrypted secret parts 1939, using the distributor signing private key 2093. Optionally, a message authentication code (MAC) tag may be added to the doubly-encrypted secret parts 1939 during one or both stages of encryption (and optional signing) in the system 2500C.

The doubly-encrypted secret part 1939 may be stored on the repository 1927 for asynchronous retrieval by the part holders 1620. The doubly-encrypted secret parts 1939 can be distributed to the repository 1927 (such as Firestore/Firebase) via any suitable method, e.g., via secure electronic communication, printing out QR codes that are displayed to the repository 1927, electronically displaying QR codes to the repository 1927.

Each part holder 1620 may retrieve, from the repository 1927, a respective doubly-encrypted secret part 1939 that was intended for it, e.g., in response to user input at the part holder 1620. Following retrieval, if the second signature was applied during the second stage of asymmetric encryption at the part distributor 1925, each part holder 1620 may optionally verify the second signature on its doubly-encrypted secret part 1939 using the distributor signing public key 2095. In examples, the part holder 1620 may discard its doubly-encrypted secret part 1939 if the second signature cannot be verified. Each part holder 1620 may then asymmetrically decrypt (using a first asymmetric decryption module 220A) it's doubly-encrypted secret part 1939 into a singly-encrypted secret part 734. The singly-encrypted secret part 734 at this stage is a secret part 730 with one layer of symmetric encryption and optional first signature.

Following retrieval, a decryption module 219A in the part holder 1620 may decrypt the doubly-encrypted secret part 1939 into a singly-encrypted secret part 734. The first decryption module 219A may be a symmetric decryption module 216 (that uses a symmetric key, such as a symmetric key 732) or an asymmetric decryption module 220 (that uses an asymmetric key, such as the distributor decrypting private key 2040 or a part holder decrypting private key 2047).

An encryption module 217 may then re-encrypt the singly-encrypted secret part 734 into a doubly-encrypted secret part 738. The encryption module 217 may be a symmetric encryption module 214 (that uses a symmetric key, such as a symmetric key 732) or an asymmetric encryption module 218 (that uses an asymmetric key, such as the distributor encrypting public key 2036 or a part holder encrypting public key 2043).

The part holder 1620 may optionally add a third signature using its part holder signing private key 2099. Optionally, the part holder 1620 may also add a timestamp, indicating when the asymmetric re-encryption was performed at the part holder 1620, to the resulting doubly-encrypted secret part 738. Each part holder 1620 can transmit its resulting doubly-encrypted secret part 738 to the repository 1927 or directly to the online signing service 1809. In examples, each part holder 1620 (e.g., implementing a serverless function) can transmit using publish/subscribe (pubsub) asynchronous messaging where it publishes its resulting doubly-encrypted secret part 738 to the repository 1927 and writes it to a new pubsub topic. In such a configuration, the online signing service 1809 may consume messages from the pubsub topic, e.g., using a transmittal service 2554. However, the part holders 1620 may use any suitable method to transmit their doubly-encrypted secret parts 738 to the online signing service 1809, with or without one or more intermediary devices and/or services.

Upon receiving each doubly-encrypted secret part 738, the online signing service 1809 may optionally verify, using the part holder signing public key 2097, that the third signature on the doubly-encrypted secret part 738 (determined from the QR code 854) belongs to the part holder 1620 that sent it. In examples, the online signing service 1809 may discard a doubly-encrypted secret part 738 if the third signature cannot be verified. In other words, in some configurations, the online signing service 1809 may decrypt a doubly-encrypted secret part 738 only if a third signature on the doubly-encrypted secret part 738 matches the part holder 1620 that sent it, e.g., via the repository 1927.

The online signing service 1809 may decrypt the doubly-encrypted secret part 738 (using a second decryption module 219B) into a singly-encrypted secret part 734. The second decryption module 219B may be a symmetric decryption module 216 (that uses the symmetric key 732) or an asymmetric decryption module 220 (that uses an asymmetric key, such as the distributor decrypting private key 2040 or a part holder decrypting private key 2047). The online signing service 1809 may also optionally verify that the timestamp (added to the singly-encrypted part 734 at the part holder 1620) is recent, e.g., is not older than a pre-determined time threshold. In some configurations, the online signing service 1809 may discard the singly-encrypted secret part 734 if the timestamp is older than the pre-determined time threshold.

The online signing service 1809 may optionally verify that the first signature (applied at the part distributor 1925) on the singly-encrypted secret part 734 belongs to the part distributor 1925. If so (or if the optional verification is not performed), a third decryption module 219C may also decrypt each singly-encrypted secret part(s) 734 into secret parts 730. The third decryption module 219C may be a symmetric decryption module 216 (that uses a symmetric key, such as a symmetric key 732) or an asymmetric decryption module 220 (that uses an asymmetric key, such as the distributor decrypting private key 2040 or a part holder decrypting private key 2047).

The online signing service 1809 may also optionally verify that the part holder 1620 that sent the now-decrypted secret part 730 matches the expected part holder 1620 by looking at the Shamir metadata. In examples, the online signing service 1809 may attempt reconstruction of the secret 728 only if the part holder 1620 that sent the now-decrypted secret part 730 matches the expected part holder 1620.

The online signing service 1809 may determine if enough of the secret parts 730 have been collected to reconstruct the secret 728. This determination may be based on the Shamir metadata to the singly-encrypted secret parts 734. If, according to the Shamir metadata, enough secret parts 730 (e.g., M of N) have not been collected, reconstruction of the secret 728 is not attempted. If, according to the Shamir metadata, enough secret parts 730 (e.g., M of N) have been collected, a key reconstructing module 212 may assemble multiple of the secret parts 730 to produce an asset encryption key (secret) 728. A single symmetric key 732 may be used to decrypt all the singly-encrypted secret parts 734 or a different symmetric key 732 may be used for each singly-encrypted secret parts 734.

The reconstructed secret 728 may be used to gain access to (e.g., decrypt) the asset key. The asset key may be a private key (e.g., for signing transactions) associated with a custodial account with a large balance, a cryptographic key for decrypting particularly high-value data, etc. Therefore, following reconstruction of the asset encryption key (secret) 728, the asset key may be used to sign a transaction and/or decrypt data.

In some configurations, the part distributor 1925 and/or the online signing service 1809 may rotate (e.g., create new versions of and distribute) the relevant keys used in the system 2500C, as described above.

Figure 26:
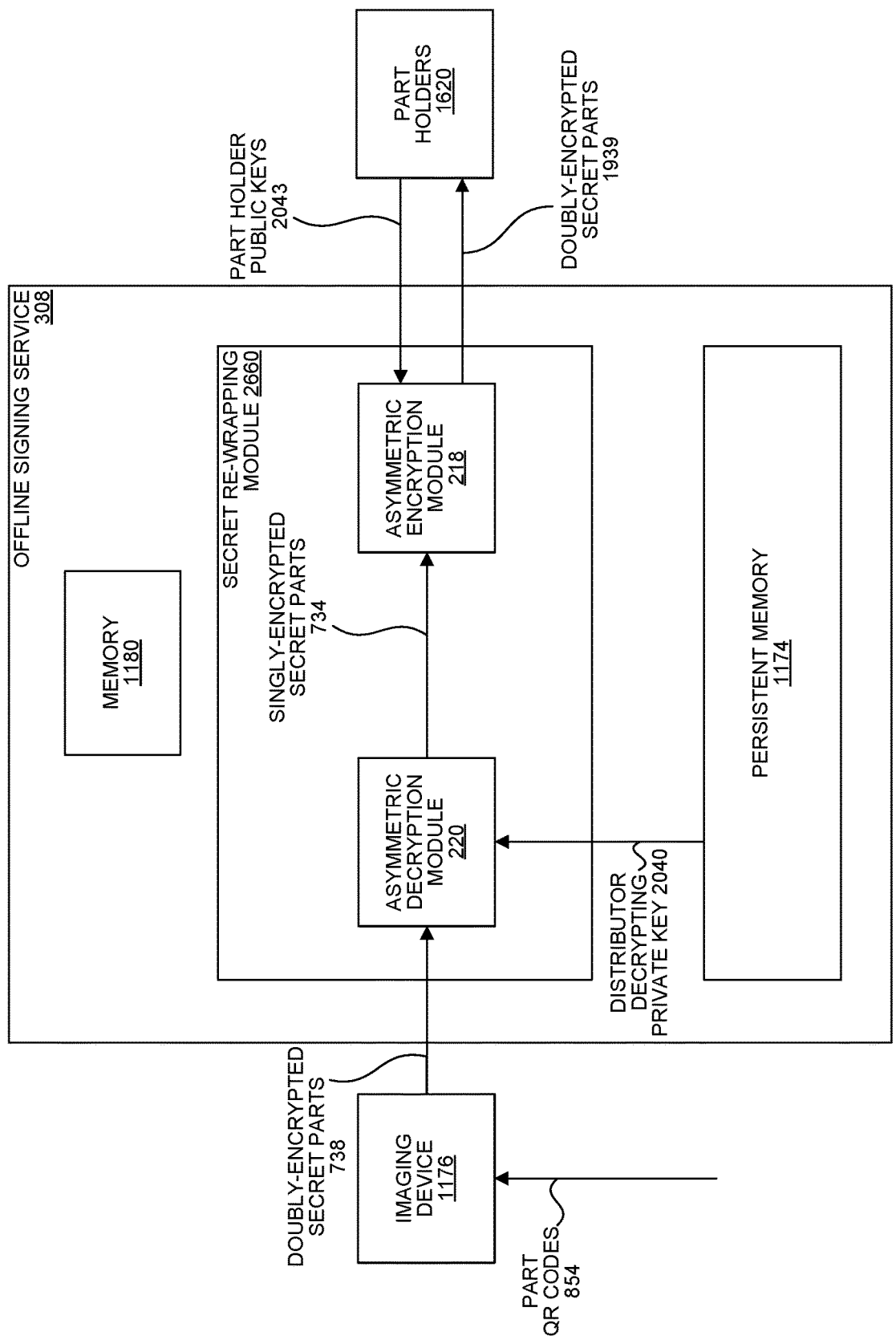
FIG. 26 is a block diagram illustrating an example system/methodology for re-wrapping Shamir parts for an offline signing service.

FIG. 26 is a block diagram illustrating an example system/methodology 3200 for re-wrapping Shamir parts for an offline signing service 308. While the encrypted parts may be initially generated using a distributor encrypting public key 2036 for the outer layer of encryption, it may be desirable to re-encrypt each part with a part holder encrypting public key 2043 specific to each part holder 1620. For example, the example system/methodology 3200 may convert doubly-encrypted secret parts 738 (encrypted with the distributor encrypting public key 2036 of the distributor 1925) into doubly-encrypted secret parts 1939 (encrypted with part holders' public keys 2043) using an asymmetric encryption module 218. In examples, the doubly-encrypted secret parts 738 may be generated by the offline signing service 308, while the doubly-encrypted secret parts 1939 may be distributed to the part holders 1620.

In examples, the doubly-encrypted parts 738 for each part holder 1620 can be provided to the secure air-gapped laptop via QR code 854. A secret re-wrapping module 2660 can decrypt the doubly-encrypted parts 738 (using an asymmetric decryption module 220) with the distributor decrypting private key 2040 into singly-encrypted secret parts 734. Each singly-encrypted secret parts 734 is then re-encrypted (in an asymmetric encryption module 218) with a respective part holder's public key 2043 into a respective doubly-encrypted secret part 1939.

It should be noted that re-wrapping the secret parts (from doubly-encrypted secret parts 738 to doubly-encrypted secret parts 1939) may alternatively include generating new secret parts (instead of re-wrapping the old ones). In such a configuration (not shown), rather than the asymmetric decryption in module 220, a new secret 728 is generated, split into new secret parts 730, encrypted using the symmetric key (SYM2 key) 732, and encrypted again using the part holder encrypting public keys 2043 before being distributed to the part holders 1620.

In examples, it is desirable to rotate (e.g., create new versions of and distribute) keys. In examples, both the online signing service 1809 and the offline signing service 308 allow for key rotation. For example, any of the following may be updated/rotated: (1) the distributor encrypting public key 2036 and/or distributor decrypting private key 2040 used by the offline signing service 308/distributor 1925; (2) the public key 937 and/or private key 941 of the online signing service 1809; (3) the symmetric key 732; and/or (4) the asset encryption key (secret) 728. In examples, it may also be desirable to re-distribute parts when part holders 1620 leave a company or lose their mobile device. In examples, it may be desirable to change how the asset encryption key (secret) 728 is split up (such as different M of N split or different tiers), such that the secret parts 730 themselves would be re-generated.

In examples, the asset encryption key (secret) 728 is a symmetric secret used to encrypt the secrets protected by the signing service(s). In examples, this secret only exists in memory within the signing-service(s) and parts of it are distributed to many part holders 1620 via Shamir secret sharing. In examples, the symmetric key 732 is a symmetric key (or set of keys) that is used to encrypt the secret parts 730 before they are passed along to the part holders 1620. In examples, each Shamir part holder 1620 has a keypair (encrypting public key 2043 and decrypting private key 2047) that is unique to them and the decrypting private key 2047 only exists on the part holder's 1620 mobile device. In examples, the part distributor 1925 platform also has its own keypair (distributor encrypting public key 2036 and distributor decrypting private key 2040). In examples, these two sets of keypairs are used to encrypt messages between the part holders 1620 and the part distributor 1925 platform—only the intended recipient can un-encrypt the message, and senders can be authenticated via signatures.

In examples, the systems/methodologies described herein aid in protecting against attacks/attempts and accessing the assets protected by the various keys/secrets. In examples, users login to the repository (such as Firebase) from their mobile app by using an account (such as a Google account) such that there will be no additional password to be remembered or lost, and it will be less likely someone will delegate their responsibilities to someone else. In examples, an attack would need to be performed against multiple entities. The part holders cannot collude (or M of N of them hacked) because even if enough pieces are gathered, all the attacker gets is a payload encrypted by the symmetric key. If the symmetric key is compromised, it is not a huge loss—it is only used to decrypt the Shamir parts. The Shamir parts could be re-gathered and encrypted with a new symmetric key and re-distributed to the part holder. If someone gained access to Firebase database with all the encrypted parts, the attacker could read the parts, but not decrypt the parts since they are encrypted for specific recipient public keys. The attacker would also need to hack the holder's phones to get the private keys for the part holders. Because an attacker who hacked the repository (Firestore/Firebase database) could delete the parts, a backup of the repository (Firestore/Firebase database) should be performed.

Figure 27A:
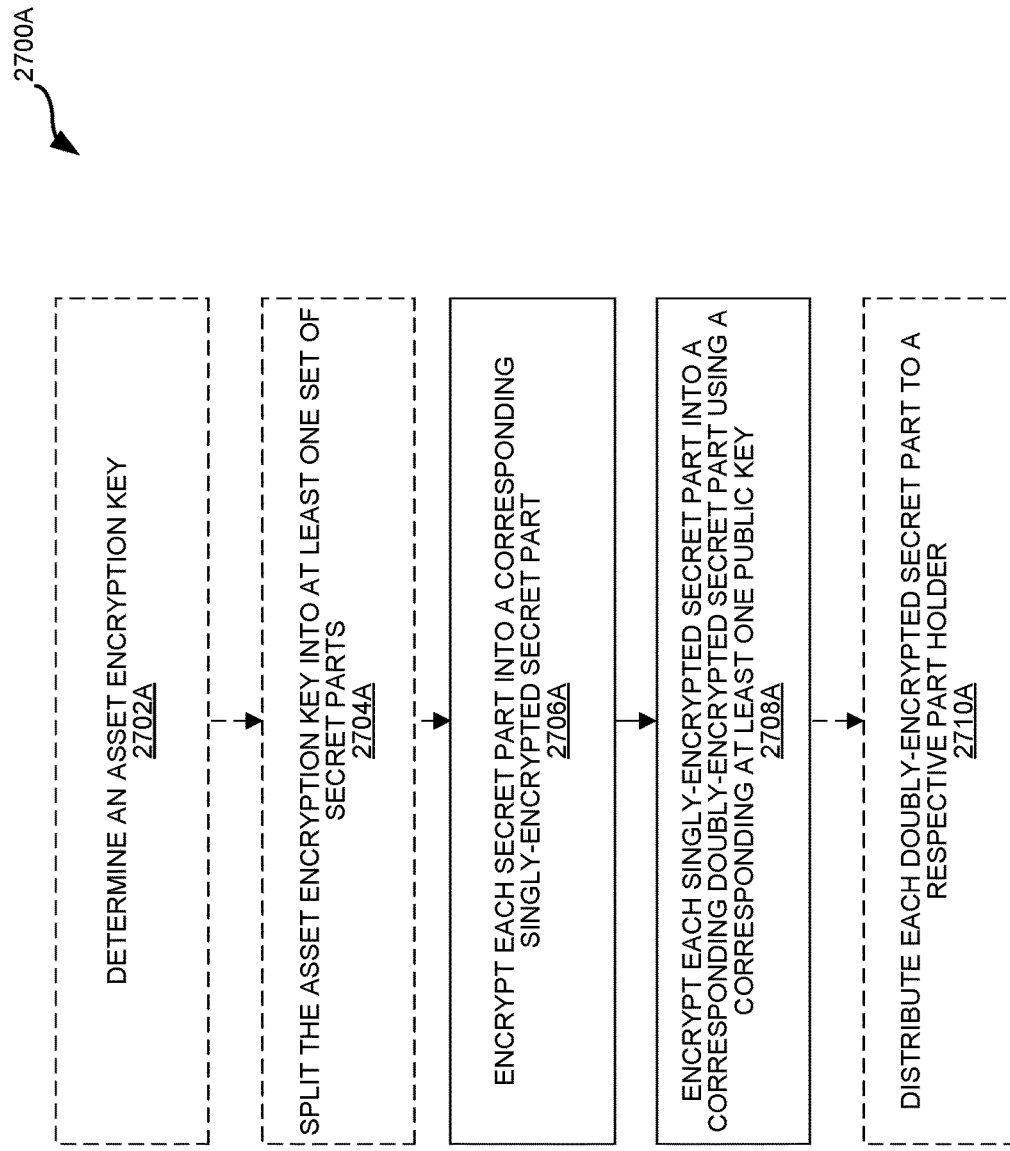
FIG. 27A is a flow diagram illustrating a method for securely distributing secret parts to a plurality of part holders.

FIG. 27A is a flow diagram illustrating a method 2700A for securely distributing secret parts 730 to a plurality of part holders 1620. The method 2700A may be performed by a computing device 102 with at least one processor, e.g., a computing device 102 implementing a part distributor 1925.

The method 2700A may begin at optional step 2702A where the at least one processor determines an asset encryption key 728 (also referred to as the SYM1 key or, simply, a "secret"). The asset encryption key (secret) 728 may be generated by the computing device 102 and may be a symmetric key, e.g., an Advanced Encryption Standard (AES) key. In examples, the asset encryption key (secret) 728 can then be used to encrypt or decrypt one or more private keys for blockchain address(es), account(s), and/or wallet(s).

The method 2700A may proceed at optional step 2704A where the at least one processor splits the asset encryption key (secret) 728 into at least one set of secret parts 730. This may include using polynomial interpolation and/or Shamir secret sharing. Each set of secret parts 730 may include a plurality of secret parts 730.

The method 2700A may proceed at step 2706A where the at least one processor encrypts each secret part 730 into a corresponding singly-encrypted secret part 734. In examples, the encryption in step 2706A is asymmetric encrypting using a distributor encrypting public key 2036 (or a part holder encrypting public key 2043) to produce singly-encrypted secret parts 734, e.g., using an asymmetric encryption module 218.

Alternatively, the encryption in step 2706A is symmetric encrypting using at least one corresponding symmetric key (SYM2) 732, e.g., using a symmetric encryption module 214. For example, the same symmetric key 732 is used to encrypt each secret part 730 of a particular secret 728. Alternatively, a different symmetric key 732 is used to encrypt each secret part 730 of a particular secret 728.

A first signature may optionally be applied during step 2706A, e.g., using a distributor signing private key 2093. Shamir metadata may optionally be encrypted as part of each singly-encrypted secret part 734. The Shamir metadata may provide instructions and/or requirements for reconstituting the secret 728 from the unprotected secret parts 730, e.g., that M of N secret parts 730 are required to reconstitute the secret 728. Shamir metadata for a particular part (encrypted or not) may also indicate which part holder 1620 the part is intended for.

The method 2700A may proceed at step 2708A where the at least one processor encrypts each singly-encrypted secret part 734 into a corresponding doubly-encrypted secret part using a corresponding at least one public key. In examples, the public key(s) belong to a distributor public/private keypair or a corresponding part holder public/private keypair. In examples, each singly-encrypted secret part 734 may be encrypted using the same distributor encrypting public key 2036 to produce doubly-encrypted secret parts 738. Alternatively, each singly-encrypted secret part 734 may be encrypted using a different public key 2043 of a respective part holder 1620 to produce doubly-encrypted secret parts 1939.

A second signature may optionally be applied during step 2708A, e.g., using a distributor signing private key 2093.

The method 2700A may proceed at optional step 2710A where the at least one processor distributes each doubly-encrypted secret part to a respective part holder 1939. In examples, the doubly-encrypted secret part are distributed to the respective part holders 1620 by printing a QR code of the doubly-encrypted secret part or loading the doubly-encrypted secret part onto a portable storage drive that is given to the respective part holder 1620.

Figure 27B:
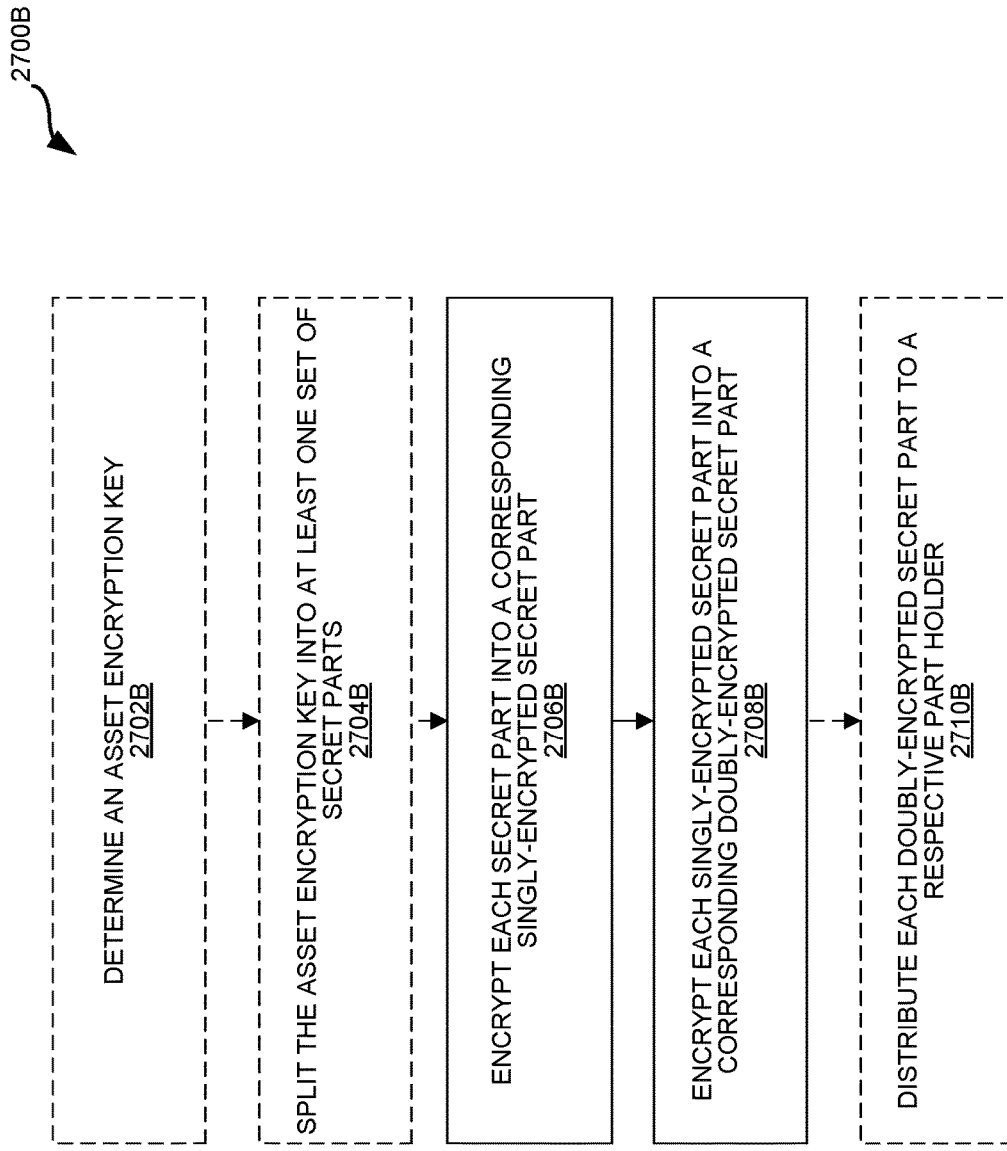
FIG. 27B is a flow diagram illustrating another method for securely distributing secret parts to a plurality of part holders.

FIG. 27B is a flow diagram illustrating another method 2700B for securely reconstructing an asset encryption key (secret) 728. The method 2800A may be performed by a computing device 102 with at least one processor, e.g., a computing device 102 implementing a part distributor 1925.

The method 2700B may begin at optional step 2702B where the at least one processor determines an asset encryption key 728 (also referred to as the SYM1 key or, simply, a "secret"). The asset encryption key (secret) 728 may be generated by the computing device 102 and may be a symmetric key, e.g., an Advanced Encryption Standard (AES) key. In examples, the asset encryption key (secret) 728 can then be used to encrypt or decrypt one or more private keys for blockchain address(es), account(s), and/or wallet(s).

The method 2700B may proceed at optional step 2704B where the at least one processor splits the asset encryption key (secret) 728 into at least one set of secret parts 730. This may include using polynomial interpolation and/or Shamir secret sharing. Each set of secret parts 730 may include a plurality of secret parts 730.

The method 2700B may proceed at step 2706B where the at least one processor encrypts each secret part 730 into a corresponding singly-encrypted secret part 734. In examples, the encryption in step 2706B is asymmetric encrypting using a distributor encrypting public key 2036 (or a part holder encrypting public key 2043) to produce singly-encrypted secret parts 734, e.g., using an asymmetric encryption module 218.

Alternatively, the encryption in step 2706B is symmetric encrypting using at least one corresponding symmetric key (SYM2) 732, e.g., using a symmetric encryption module 214. For example, the same symmetric key 732 is used to encrypt each secret part 730 of a particular secret 728. Alternatively, a different symmetric key 732 is used to encrypt each secret part 730 of a particular secret 728.

A first signature may optionally be applied during step 2706B, e.g., using a distributor signing private key 2093. Shamir metadata may optionally be encrypted as part of each singly-encrypted secret part 734. The Shamir metadata may provide instructions and/or requirements for reconstituting the secret 728 from the unprotected secret parts 730, e.g., that M of N secret parts 730 are required to reconstitute the secret 728. Shamir metadata for a particular part (encrypted or not) may also indicate which part holder 1620 the part is intended for.

The method 2700B may proceed at step 2708B where the at least one processor encrypts each singly-encrypted secret part 734 into a corresponding doubly-encrypted secret part. In examples, the encryption in step 2708B is asymmetric encrypting. In examples, each singly-encrypted secret part 734 may be encrypted using a distributor encrypting public key 2036 to produce doubly-encrypted secret parts 738. Alternatively, each singly-encrypted secret part 734 may be encrypted using a different public key 2043 of a respective part holder 1620 to produce doubly-encrypted secret parts 1939.

Alternatively, the encryption in step 2708B may be symmetric encrypting using at least one corresponding symmetric key (SYM2) 732, e.g., using a symmetric encryption module 214. For example, the same symmetric key 732 is used to encrypt each secret part 730 of a particular secret 728. Alternatively, a different symmetric key 732 is used to encrypt each secret part 730 of a particular secret 728.

A second signature may optionally be applied during step 2708B, e.g., using a distributor signing private key 2093.

The method 2700B may proceed at optional step 2710B where the at least one processor distributes each doubly-encrypted secret part to a respective part holder 1939. In examples, the doubly-encrypted secret part are distributed to the respective part holders 1620 by printing a QR code of the doubly-encrypted secret part or loading the doubly-encrypted secret part onto a portable storage drive that is given to the respective part holder 1620.

Figure 28:
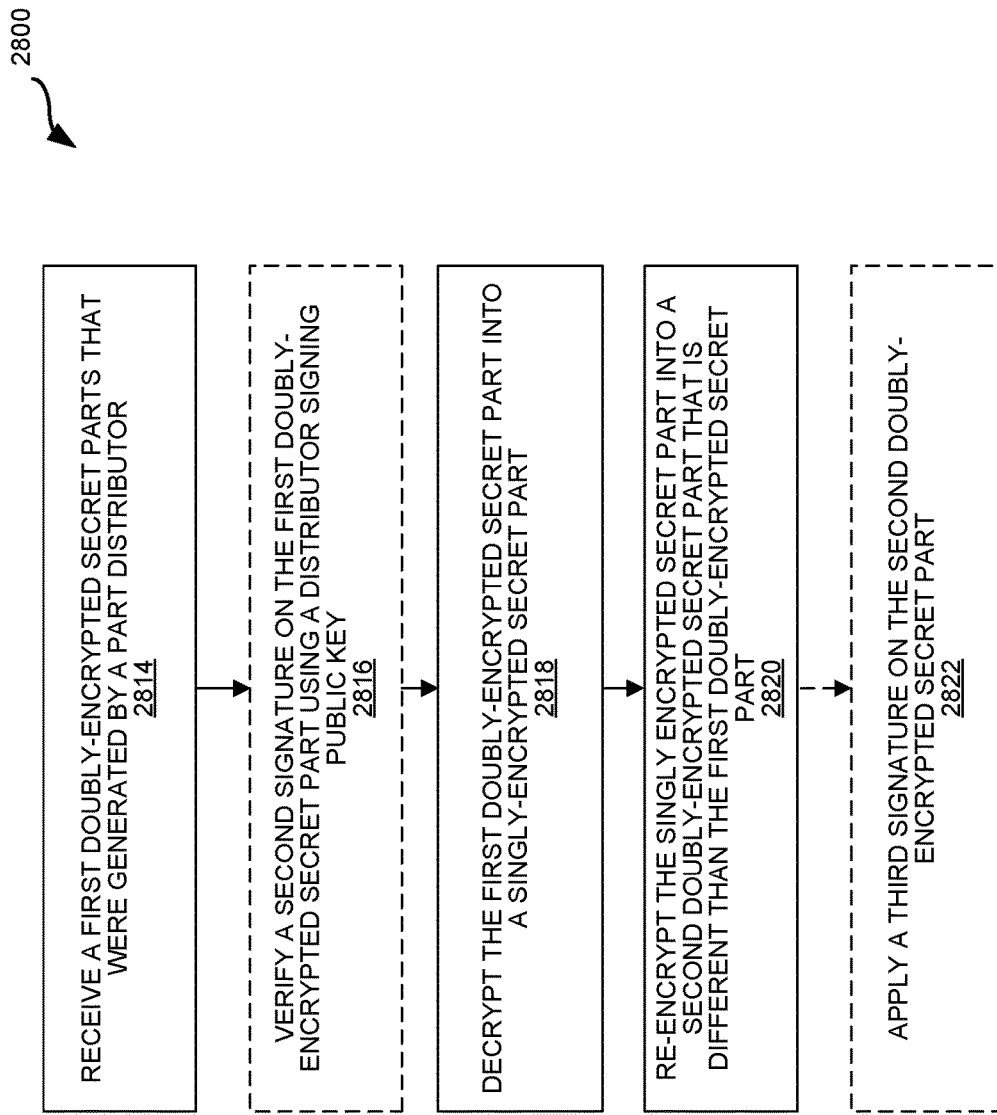
FIG. 28 is a flow diagram illustrating a method for re-encrypting a doubly-encrypted secret part.

FIG. 28 is a flow diagram illustrating a method 2800 for re-encrypting a doubly-encrypted secret part 1939. The method 2800 of FIG. 28 may be performed sequentially to or independently from the method 2700A of FIG. 27A or the method 2700B of FIG. 27B. The method 2800 may be performed by a part holder 1620 computing device with at least one processor, e.g., a smartphone.

The method 2800 may begin at step 2814 where the at least one processor receives a first doubly-encrypted secret part 1939 that were generated by a part distributor 1925. In examples, the first doubly-encrypted secret part 1939 is unique among a plurality N of doubly-encrypted secret parts 1939, at least M of which need to be collected and decrypted in order to reconstitute a secret 728. In examples, the first doubly-encrypted secret part 1939 may be generated and distributed using the method 2700A of FIG. 27A or the method 2700B of FIG. 27B.

In examples, the first doubly-encrypted secret part 1939 is distributed to the part holder 1620 via a repository 1927 and the part holder 1620 may perform some authentication with the repository 1927 before it gains access to the first doubly-encrypted secret part 1939. Alternatively, the first doubly-encrypted secret part 1939 may be distributed to the part holder 1620 via a QR code that is physically printed or electronically displayed to the part holder 1620.

The method 2800 may proceed at optional step 2816 where the at least one processor may verify a second signature on the first doubly-encrypted secret part 1939 using a distributor signing public key 2095. In examples, the first doubly-encrypted secret part 1939 may be discarded (and not decrypted in step 2818 below) if the second signature cannot be verified.

The method 2800 may proceed at step 2818 where the at least one processor decrypts the first doubly-encrypted secret part 1939 into a singly-encrypted secret part 734. In other words, step 2816 includes decrypting only one of two layers of encryption on the first doubly-encrypted secret part 1939. If the second stage of encryption on the first doubly-encrypted secret part 1939 was asymmetric encryption, the decryption in step 2816 may be an asymmetric decryption using an asymmetric key, such as the distributor decrypting private key 2040 or a part holder decrypting private key 2047). If the second stage of encryption on the first doubly-encrypted secret part 1939 was symmetric encryption, the decryption in step 2816 may be symmetric decryption using a symmetric key, such as a symmetric key 732.

The method 2800 may proceed at step 2820 where the at least one processor re-encrypts the singly-encrypted secret part 734 into a second doubly-encrypted secret part 738 that is different than the first doubly-encrypted secret part 1939. In examples, step 2818 performs asymmetric decryption using a part holder decrypting private key 2047 and step 2820 applies asymmetric encryption using a distributor encrypting public key 2036.

The method 2800 may proceed at optional step 2822 where the at least one processor adds a third signature using its part holder signing private key 2099. Optionally, the part holder 1620 may also add a timestamp, indicating when the asymmetric re-encryption was performed at the part holder 1620, to the resulting second doubly-encrypted secret part 738. The second doubly-encrypted secret parts 738 may be transmitted to an assembler 2452, e.g., via repository 1927, secure electronic communication, physically printed (or electronically displayed) QR codes, etc.

FIG. 29A is a flow diagram illustrating a method 2900A for securely reconstructing an asset encryption key (secret) 728. In examples, the method 2900A of FIG. 29A may be performed after the method 2700A of FIG. 27A and, optionally, the method 2800 of FIG. 28. Alternatively, the method 2900A of FIG. 29A may be performed independently of the method 2700A of FIG. 27A and the method 2800 of FIG. 28. The method 2900A may be performed by a computing device 102 with at least one processor, e.g., a computing device 102 implementing an offline signing service 308 and/or an online signing service 1809.

The method 2900A may begin at step 2926A where the at least one processor receives a plurality of doubly-encrypted secret parts that were encrypted using at least a public key belonging to a public/private keypair. In examples, each doubly-encrypted secret part 1939 may be generated as described in the method 2700A of FIG. 27A. For example, a doubly-encrypted secret part 1939 is generated by (1) the part distributor 1925 asymmetrically encrypting a secret part 730 using a symmetric key 732 to produce a singly-encrypted secret part 732; and (2) the part distributor 1925 asymmetrically encrypting the singly-encrypted secret part 734 using a distributor encrypting public key 2036.

Alternatively, each doubly-encrypted secret part 1939 may be generated as described in the method 2700A of FIG. 27A and the method 2800 of FIG. 28. For example, a doubly-encrypted secret part 1939 may be generated by (1) the part distributor 1925 asymmetrically encrypting a secret part 730 using a distributor encrypting public key 2036 to produce a singly-encrypted secret part 734; (2) the part distributor 1925 asymmetrically encrypting the singly-encrypted secret part 734 with a part holder encrypting public key 2043 to produce a doubly-encrypted secret part 1939; (3) a part holder 1925 asymmetrically decrypting the doubly-encrypted secret part 1939 (into a singly-encrypted secret part 734) using a part holder decrypting private key 2047; and (4) the part holder 1620 asymmetrically encrypting the singly-encrypted secret part 734 into a doubly-encrypted secret part 738 using the distributor encrypting public key 2036.

Optionally, upon receiving each doubly-encrypted secret part 738, the at least one processor may verify, using the part holder signing public key 2097, that the third signature on the doubly-encrypted secret part 738 (determined from the QR code 854) belongs to the part holder 1620 that sent it.

The method 2900A may proceed at step 2928A where the at least one processor (at the offline signing service 308 or online signing service 1809) decrypts each of the plurality of doubly-encrypted secret parts 738 into a corresponding singly-encrypted secret part 734 using a private key belonging to the public/private keypair. In examples, the distributor decrypting private key 2040 is used to decrypt the doubly-encrypted secret parts 738 into singly-encrypted secret parts 734. Optionally, the at least one processor may verify that a timestamp (added at the part holder 1620) is recent, e.g., is not older than a pre-determined time threshold. In some configurations, the at least one processor may discard the singly-encrypted secret part 734 if the timestamp is older than the pre-determined time threshold.

The method 2900A may proceed at step 2930A where the at least one processor decrypts each corresponding singly-encrypted secret part 734 into a corresponding secret part 730. Step 2930A may use asymmetric decryption or symmetric decryption, depending on whether the first stage of encryption (e.g., at the part distributor 1925) was asymmetric or symmetric, respectively. If step 2930A uses symmetric decryption, a symmetric (e.g., Advanced Encryption Standard (AES)) symmetric key 732 may be used to decrypt all singly-encrypted secret parts 734 of a particular secret 728. Alternatively, a different symmetric key 732 is used to encrypt each singly-encrypted secret part 734 of a particular secret 728.

If step 2930A uses asymmetric decryption, the distributor decrypting private key 2040 may be used again to decrypt the singly-encrypted secret parts 734 into corresponding secret parts 730. Optionally, the at least one processor may verify that a first signature (applied at the part distributor 1925) on the singly-encrypted secret part 734 belongs to the part distributor 1925 before or after step 2930A is performed.

The at least one processor may optionally verify that the part holder 1620 that sent each now-decrypted secret part 730 matches the expected part holder 1620 by looking at Shamir metadata. In examples, the online signing service 1809 may attempt reconstruction of the secret 728 only if the part holder 1620 that sent each now-decrypted secret part 730 matches the expected part holder 1620.

The method 2900A may proceed at step 2932A where the at least one processor reconstructs an asset encryption key (secret) 728 from a quantity of the secret parts 734. In examples, the asset encryption key (secret) 728 is a symmetric (e.g., Advanced Encryption Standard (AES)) key that can then be used to encrypt or decrypt one or more asset keys for different blockchain addresses, accounts, and/or wallets. In examples, the asset encryption key (secret) 728 is reconstructed from a subset of the total number of secret parts 734 previously created from the asset encryption key (secret) 728, e.g., where 1<=M<=N (and 1<M<N in some configurations). The at least one processor may determine whether enough secret parts 734 have been collected to reconstruct the asset encryption key (secret) 728 based on the Shamir metadata.

The method 2900A may proceed at optional step 2934A where the at least one processor performs an action using the reconstructed encryption key 728. In examples, the asset encryption key (secret) 728 may be used to gain access to an asset key (or multiple asset keys). If the asset key is a blockchain (e.g., Ethereum, Bitcoin) private key (for a wallet address or smart contract on the blockchain 416), the asset encryption key is used to encrypt/decrypt the blockchain private key. In examples, the asset encryption key is used to sign a sweeping transaction during customer wallet recover or generate a transaction address for a high-balance account. Alternatively, the asset key may be a non-cryptographic-key string, such as a password or 15-word seed mnemonic phrase for a cryptocurrency wallet. Therefore, the action may include encrypting or decrypting a private blockchain key or other password-like data to access a cryptocurrency address/wallet/account or a smart contract on a blockchain 416.

The method 2900A may proceed at optional step 2936A where the at least one processor rotates (e.g., create a new version of and distribute) at least one key, as described above. In examples, the at least one processor may create a new set of: (1) secret/asset encryption key/SYM1 key 728; (2) symmetric key 732 (SYM2); (3) distributor decrypting private key 2040 and distributor encrypting public key 2036; and/or (4) distributor signing private key 2093 and distributor signing public key 2095. In examples, the at least one key is rotated (and distributed, if needed) periodically, e.g., every day, every week, every month, every year, etc.

Figure 29B:
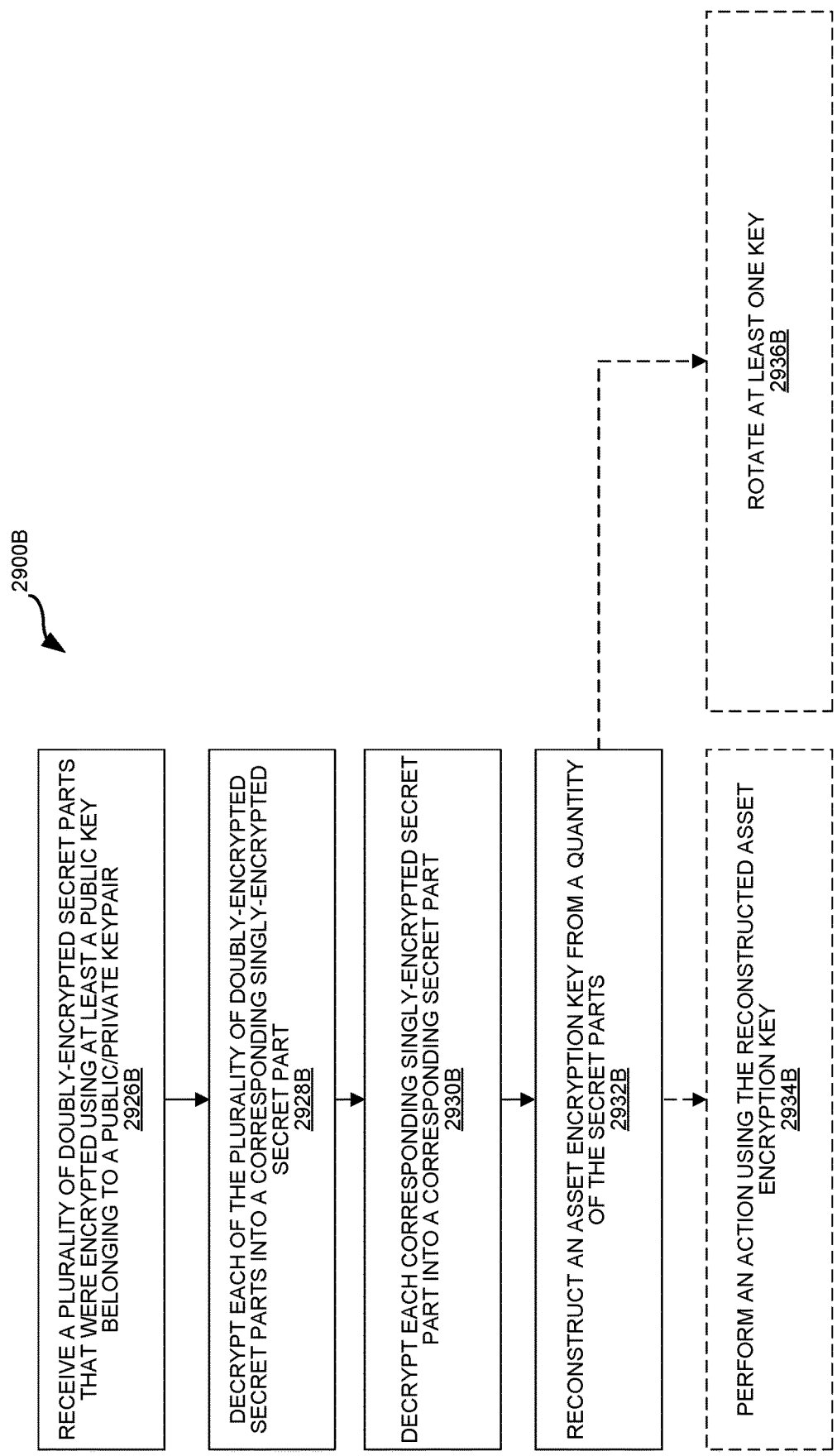
FIG. 29B is a flow diagram illustrating another method for securely reconstructing an asset encryption key.

FIG. 29B is a flow diagram illustrating another method 2900A for securely reconstructing an asset encryption key (secret) 728. The method 2900B of FIG. 29B may include many of the same as the steps in the method 2900A of FIG. 29A. Unless otherwise noted, the steps method 2900B of FIG. 29B are the same as the steps in the method 2900A of FIG. 29A.

In contrast to step 2928A in the method 2900A of FIG. 29A, in step 2928B the decryption is not limited to asymmetric decryption using a private key. In a first example, the at least one processor (at the offline signing service 308 or online signing service 1809) asymmetrically decrypts each of the plurality of doubly-encrypted secret parts 738 into a corresponding singly-encrypted secret part 734 using a distributor decrypting private key 2040. In a second example, the at least one processor (at the offline signing service 308 or online signing service 1809) symmetrically decrypts each of the plurality of doubly-encrypted secret parts 738 into a corresponding singly-encrypted secret part 734 using a symmetric key 732.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 30:
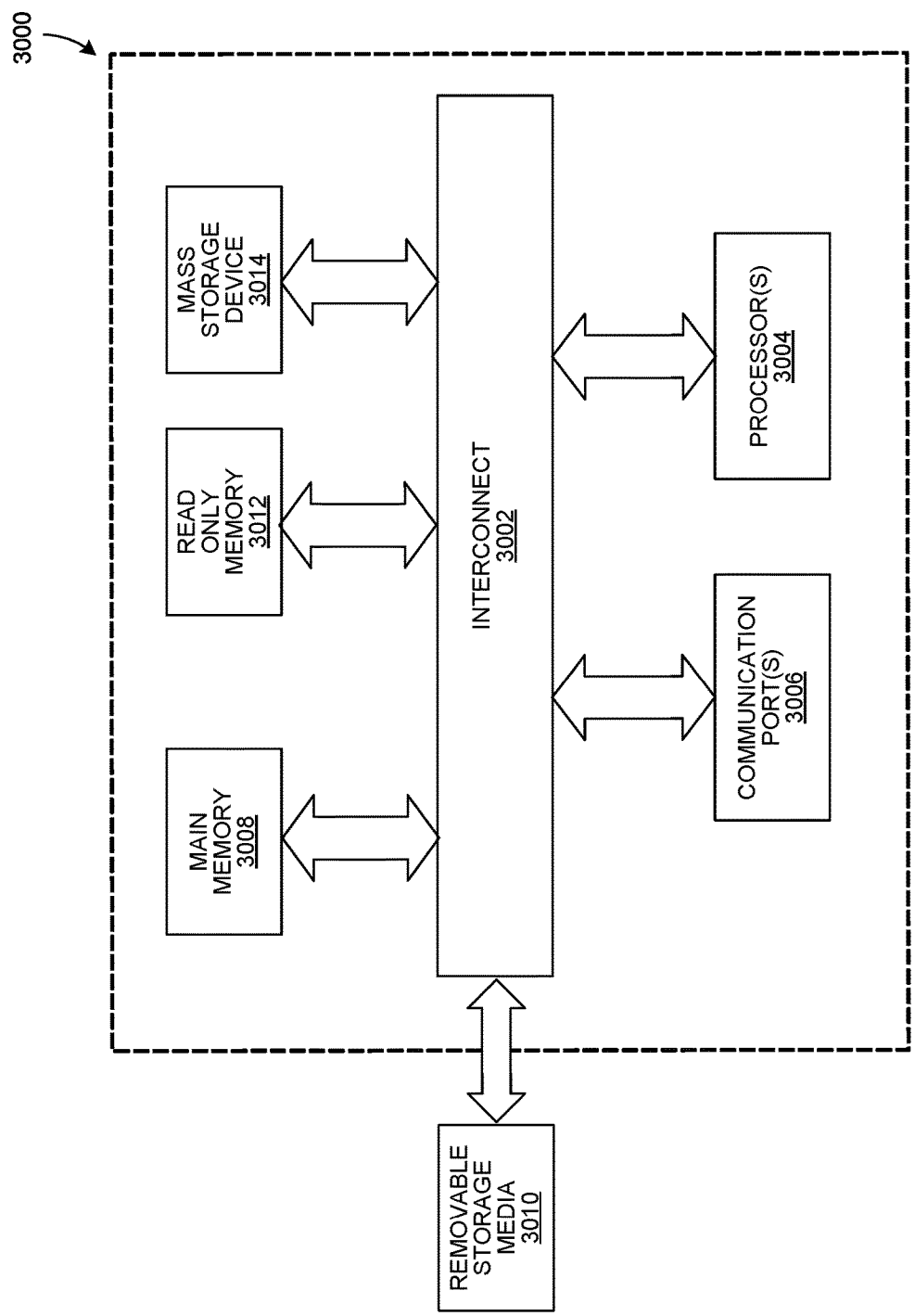
FIG. 30 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 30 is an example of a computer system 3000 with which embodiments of the present disclosure may be utilized. For example, the computer system 3000 may implement a computing device 102 and/or computing device 104 described above. According to the present example, the computer system 3000 includes an interconnect 3002, at least one processor 3004, at least one communication port 3006, at least one main memory 3008, at least one removable storage media 3010, at least one read only memory 3012, and at least one mass storage device 3014.

The at least one processor 3004 can be any known processor. The at least one communication port 3006 can be or include, for example, any of an RS-232 port for use with a modem-based dialup connection, a 10/100 Ethernet port, or a Gigabit port using copper or fiber. The nature of the at least one communication port 3006 may be chosen depending on a network such a Local Area Network (LAN), Wide Area Network (WAN), or any network to which the computer system 3000 connects. The at least one main memory 3008 can be Random Access Memory (RAM), or any other dynamic storage device(s) commonly known in the art. The at least one read only memory 3012 can be any static storage device(s) such as Programmable Read Only Memory (PROM) chips for storing static information such as instructions for the at least one processor 3004.

The at least one mass storage device 3014 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 3002 can be or include one or more buses, bridges, controllers, adapters, and/or point-to-point connections. Interconnect 3002 communicatively couples the at least one processor 3004 with the other memory, storage, and communication blocks. Interconnect 3002 can be a PCI/PCI-X or SCSI based system bus depending on the storage devices used. The at least one removable storage media 3010 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments. The embodiments, structure, methods, etc. described herein, including those below and above, can be combined together in various ways.

Terminology

Brief definitions of terms, abbreviations, and phrases used throughout this application are given below.

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for securely splitting, distributing, and/or reconstructing keys. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a system comprising: at least one processor; at least one memory communicatively coupled to the at least one processor; and wherein the at least one processor is configured to: encrypt each secret part of at least one set of secret parts into a corresponding singly-encrypted secret part; encrypt each corresponding singly-encrypted secret part into a corresponding doubly-encrypted secret part using a corresponding at least one public key, each public key belonging to a corresponding one of at least one public/private keypair; wherein at least a subset of the secret parts of the at least one set of secret parts are used to reconstruct a secret.

Example 2 includes the system of Example 1, wherein each secret part is encrypted into a corresponding singly-encrypted secret part using at least one corresponding symmetric key.

Example 3 includes the system of Example 2, wherein the at least one corresponding symmetric key for a first secret part and a second secret part is identical.

Example 4 includes the system of any of Examples 2-3, wherein the at least one corresponding symmetric key for a first secret part and a second secret part is distinct.

Example 5 includes the system of any of Examples 1-4, wherein each secret part is encrypted into a corresponding singly-encrypted secret part using the corresponding at least one public key belonging to the corresponding one of the at least one public/private keypair.

Example 6 includes the system of any of Examples 1-5, wherein the at least one public key is a single public key used to encrypt all the singly-encrypted secret parts, the single public key belonging to a single public/private keypair; and wherein the at least one private key is a single private key belonging to the single public/private keypair.

Example 7 includes the system of any of Examples 1-6, wherein the at least one processor is further configured to: decrypt at least one of the doubly-encrypted secret parts into at least one of the singly-encrypted secret parts using a corresponding at least one private key, each belonging to a corresponding one of the at least one public/private keypair; and re-encrypt each of the at least one singly-encrypted secret part using a corresponding second public key, the second public key belonging to a second public/private keypair.

Example 8 includes the system of any of Examples 1-7, wherein the at least one processor is configured to encrypt each secret part by exclusive ORing (XORing) each secret part with the at least one corresponding symmetric key to produce the corresponding singly-encrypted secret part.

Example 9 includes the system of any of Examples 1-8, wherein each doubly-encrypted secret part is encrypted using both at least one symmetric key and the public key corresponding belonging to the corresponding one of the at least one public/private keypair.

Example 10 includes the system of any of Examples 1-9, wherein each doubly-encrypted secret part is encrypted twice using the public key corresponding belonging to the corresponding one of the at least one public/private keypair.

Example 11 includes the system of any of Examples 1-10, wherein each doubly-encrypted secret part is encrypted using both at least one symmetric key and the corresponding part holder public key belonging to a corresponding part holder public/private keypair.

Example 12 includes the system of any of Examples 1-11, wherein the at least one processor is further configured to: receive a plurality of the doubly-encrypted secret parts; decrypt each of the plurality of doubly-encrypted secret parts into the corresponding singly-encrypted secret part using a corresponding private key belonging to the corresponding one of the at least one public/private keypair; decrypt each corresponding singly-encrypted secret part into the corresponding secret part; and reconstruct a secret from a quantity of the corresponding secret parts, wherein the quantity is a subset of a total number of secret parts previously created from the secret.

Example 13 includes the system of Example 12, wherein each doubly-encrypted secret part is distributed to a respective part holder; and wherein the plurality of doubly-encrypted secret parts are received from a plurality of the part holders.

Example 14 includes the system of any of Examples 1-13, wherein the at least one processor is further configured to: reconstruct a secret from a plurality of the secret parts, wherein the secret is a symmetric encryption key; and perform an action with the asset encryption key.

Example 15 includes the system of Example 14, wherein the action comprises at least one of the following actions using the reconstructed secret: encrypting data; decrypting data; generating a transaction address; and signing a transaction.

Example 16 includes a system comprising: at least one processor; at least one memory communicatively coupled to the at least one processor; and wherein the at least one processor is configured to: receive a plurality of doubly-encrypted secret parts that were encrypted using at least a public key belonging to a public/private keypair; decrypt each of the plurality of doubly-encrypted secret parts into a corresponding singly-encrypted secret part using a private key belonging to the public/private keypair; decrypt each corresponding singly-encrypted secret part into a corresponding secret part; and wherein a secret is reconstructed from a quantity of corresponding secret parts that is a subset of a total number of secret parts previously created from the secret.

Example 17 includes the system of Example 16, wherein each doubly-encrypted secret part was encrypted into a corresponding singly-encrypted secret part using at least one corresponding symmetric key.

Example 18 includes the system of Example 17, wherein the at least one symmetric key for a first secret part and a second secret part is identical.

Example 19 includes the system of any of Examples 17-18, wherein the at least one symmetric key for at a first secret part and a second secret part is distinct.

Example 20 includes the system of any of Examples 16-19, wherein each doubly-encrypted secret part was encrypted using two stages, comprising: a first stage during which a corresponding secret part was encrypted into a corresponding singly-encrypted secret part using a symmetric key or the public key belonging to the public/private keypair; and a second stage during which the singly-encrypted secret part was encrypted into the respective doubly-encrypted secret part using a public key belonging to a corresponding public/private keypair.

Example 21 includes the system of any of Examples 16-20, wherein the at least one processor is further configured to perform at least one of the following actions using the reconstructed secret: encrypting data; decrypting data; generating a transaction address; and signing a transaction.

Example 22 includes the system of any of Examples 16-21, wherein the at least one processor is configured to decrypt each corresponding singly-encrypted secret part by exclusive ORing (XORing) each corresponding singly-encrypted secret part with the at least one corresponding symmetric key to produce the corresponding secret part.

Example 23 includes the system of any of Examples 16-22, wherein the plurality of doubly-encrypted secret parts are received from a plurality of part holders.

Example 24 includes a method for securely distributing secret parts to a plurality of part holders, comprising: encrypting each secret part of at least one set of secret parts into a corresponding singly-encrypted secret part using at least one symmetric key or a corresponding one of at least one public key, each public key belonging to a corresponding one of at least one public/private keypair; encrypting each corresponding singly-encrypted secret part into a corresponding doubly-encrypted secret part using the corresponding at least one public key belonging to the corresponding public/private keypair; distributing each doubly-encrypted secret part to a respective part holder; wherein at least a subset of the secret parts of the at least one set of secret parts are used to reconstruct a secret.

What is claimed is:

1. A system comprising:
   at least one processor; and
   at least one memory communicatively coupled to the at least one processor;
   wherein the at least one processor is configured to:
      receive a plurality of doubly-encrypted secret parts that were encrypted using at least a public key belonging to a public/private keypair;
      decrypt each of the plurality of doubly-encrypted secret parts into a corresponding singly-encrypted secret part using a private key belonging to the public/private keypair;
      decrypt each corresponding singly-encrypted secret part into a corresponding secret part;
      wherein a secret is reconstructed from a quantity of corresponding secret parts that is a subset of a total number of secret parts previously created from the secret; and
      rotate at least one of the public key and the private key by:
         replacing the public key with a new public key;
         replacing the private key with a new private key; or
         replacing the public key with the new public key and the private key with the new private key.

2. The system of claim 1, wherein each doubly-encrypted secret part was encrypted into the corresponding singly-encrypted secret part using at least one corresponding symmetric key.

3. The system of claim 2, wherein at least one first corresponding symmetric key for a first secret part is identical to at least one second corresponding symmetric key for a second secret part.

4. The system of claim 2, wherein at least one first corresponding symmetric key for a first secret part is distinct from at least one second corresponding symmetric key for a second secret part.

5. The system of claim 1, wherein the plurality of doubly-encrypted secret parts were encrypted using two stages, comprising:
   a first stage during which each corresponding secret part was encrypted into the corresponding singly-encrypted secret part using a symmetric key or a second public key belonging to a second public/private keypair; and
   a second stage during which each corresponding singly-encrypted secret part was encrypted into a respective doubly-encrypted secret part of the plurality of doubly-encrypted secret parts using the public key belonging to the public/private keypair.

6. The system of claim 1, wherein the at least one processor is further configured to perform at least one of the following actions using the secret:
   encrypting first data;
   decrypting second data;
   generating a transaction address; or
   signing a transaction.

7. The system of claim 1, wherein the at least one processor is configured to decrypt each corresponding singly-encrypted secret part by exclusive ORing (XORing) each corresponding singly-encrypted secret part with at least one corresponding symmetric key to produce the corresponding secret part.

8. The system of claim 1, wherein the plurality of doubly-encrypted secret parts are received from a plurality of part holders.

9. The system of claim 1, wherein, for each of the plurality of doubly-encrypted secret parts, the at least one processor is further configured to verify a respective signature associated with each of the plurality of doubly-encrypted secret parts.

10. The system of claim 1, wherein the at least one processor is further configured to verify that a respective timestamp associated with each of the plurality of doubly-encrypted secret parts is not older than a predetermined time threshold.

11. A method for reconstructing an asset encryption key, comprising:
   by at least one computing device:
      receiving a plurality of doubly-encrypted secret parts that were encrypted using at least a public key belonging to a public/private keypair;
      decrypting each of the plurality of doubly-encrypted secret parts into a corresponding singly-encrypted secret part using a private key belonging to the public/private keypair;

decrypting each corresponding singly-encrypted secret part into a corresponding secret part;

wherein a secret is reconstructed from a quantity of corresponding secret parts that is a subset of a total number of secret parts previously created from the secret; and rotating at least one of the public key and the private key by:
- replacing the public key with a new public key;
- replacing the private key with a new private key; or
- replacing the public key with the new public key and the private key with the new private key.

12. The method of claim 11, wherein each doubly-encrypted secret part was encrypted into the corresponding singly-encrypted secret part using at least one corresponding symmetric key.

13. The method of claim 12, wherein at least one first corresponding symmetric key for a first secret part is identical to at least one second corresponding symmetric key for a second secret part.

14. The method of claim 12, wherein at least one first corresponding symmetric key for a first secret part is distinct from at least one second corresponding symmetric key for a second secret part.

15. The method of claim 11, wherein the plurality of doubly-encrypted secret parts were encrypted using two stages, comprising:

a first stage during which each corresponding secret part was encrypted into the corresponding singly-encrypted secret part using a symmetric key or a second public key belonging to a second public/private keypair; and a second stage during which each corresponding singly-encrypted secret part was encrypted into a respective doubly-encrypted secret part of the plurality of doubly-encrypted secret parts using the public key belonging to the public/private keypair.

16. The method of claim 11, further comprising performing at least one of the following actions using the secret:
- encrypting first data;
- decrypting second data;
- generating a transaction address; or
- signing a transaction.

17. The method of claim 11, further comprising decrypting each corresponding singly-encrypted secret part by exclusive ORing (XORing) each corresponding singly-encrypted secret part with at least one corresponding symmetric key to produce the corresponding secret part.

18. The method of claim 11, wherein the plurality of doubly-encrypted secret parts are received from a plurality of part holders.

19. The method of claim 11, further comprising verifying a respective signature associated with each of the plurality of doubly-encrypted secret parts.

20. The method of claim 11, further comprising verifying that a respective timestamp associated with each of the plurality of doubly-encrypted secret parts is not older than a predetermined time threshold.

* * * * *